(12) United States Patent
Golodetz et al.

(10) Patent No.: US 11,649,367 B2
(45) Date of Patent: May 16, 2023

(54) AQUEOUS PIGMENT DISPERSIONS

(71) Applicant: LANDA LABS (2012) LTD., Rehovot (IL)

(72) Inventors: Galia Golodetz, Rehovot (IL); Benzion Landa, Nes Ziona (IL); Sagi Abramovich, Ra'anana (IL); Dan Avital, Mazkeret Batya (IL); Jose Kuperwasser, Ashdod (IL); Omer Ashkenazi, Kfar Gibton (IL)

(73) Assignee: LANDA LABS (2012) LTD., Rehovot (IL)

( * ) Notice: Subject to any disclaimer, the term of this patent is extended or adjusted under 35 U.S.C. 154(b) by 0 days.

(21) Appl. No.: 17/949,996

(22) Filed: Sep. 21, 2022

(65) Prior Publication Data
US 2023/0049112 A1 Feb. 16, 2023

Related U.S. Application Data

(62) Division of application No. 16/303,171, filed as application No. PCT/IB2017/053162 on May 30, 2017, now Pat. No. 11,479,687.
(Continued)

(51) Int. Cl.
| | | |
|---|---|---|
| C09D 17/00 | (2006.01) | |
| C08K 5/098 | (2006.01) | |
| C08K 5/42 | (2006.01) | |
| C08L 33/08 | (2006.01) | |
| C08L 33/14 | (2006.01) | |
| C08L 53/00 | (2006.01) | |
| C08L 71/02 | (2006.01) | |
| C09B 67/04 | (2006.01) | |
| C09B 67/46 | (2006.01) | |

(52) U.S. Cl.
CPC ............ *C09D 17/001* (2013.01); *C08K 5/098* (2013.01); *C08K 5/42* (2013.01); *C08L 33/08* (2013.01); *C08L 33/14* (2013.01); *C08L 53/00* (2013.01); *C08L 71/02* (2013.01); *C09B 67/0002* (2013.01); *C09B 67/009* (2013.01); *C08K 2201/005* (2013.01)

(58) Field of Classification Search
None
See application file for complete search history.

(56) References Cited

U.S. PATENT DOCUMENTS

| | | |
|---|---|---|
| 2,637,711 A | 5/1953 | Auer |
| 4,204,876 A | 5/1980 | Bowden |
| (Continued) | | |

FOREIGN PATENT DOCUMENTS

| | | | |
|---|---|---|---|
| CN | 1718275 A | * | 1/2006 |
| CN | 101845122 B | | 7/2012 |
| (Continued) | | | |

OTHER PUBLICATIONS

CN-1718275-A. English translation (Year: 2006).*
(Continued)

*Primary Examiner* — Stefanie J Cohen
(74) *Attorney, Agent, or Firm* — Momentum IP; Marc Van Dyke

(57) ABSTRACT

There are disclosed aqueous pigment dispersions containing dispersant-improving-agents, and methods of preparing and using the same.

9 Claims, 5 Drawing Sheets

Related U.S. Application Data

(60) Provisional application No. 62/343,111, filed on May 30, 2016.

(56) References Cited

U.S. PATENT DOCUMENTS

| | | | | |
|---|---|---|---|---|
| 4,877,451 | A | * | 10/1989 | Winnik .................. C09C 1/309 |
| | | | | 106/490 |
| 5,833,744 | A | | 11/1998 | Breton et al. |
| 6,262,152 | B1 | | 7/2001 | Fryd et al. |
| 7,034,065 | B2 | | 4/2006 | Wang et al. |
| 7,314,276 | B2 | | 1/2008 | Koike et al. |
| 7,318,864 | B2 | | 1/2008 | Reisacher et al. |
| 7,959,280 | B2 | | 6/2011 | Koike et al. |
| 11,479,687 | B2 | | 10/2022 | Golodetz et al. |
| 2011/0041715 | A1 | * | 2/2011 | Bower .................. C09D 11/10 |
| | | | | 524/565 |
| 2018/0208787 | A1 | | 7/2018 | Tateishi et al. |

FOREIGN PATENT DOCUMENTS

| | | |
|---|---|---|
| EP | 1178089 A2 | 2/2002 |
| JP | 2002526259 A | 8/2002 |
| JP | 2003147235 A | 5/2003 |
| JP | 2009248468 A | 10/2009 |
| WO | 0020520 A1 | 4/2000 |
| WO | 2016047588 A1 | 3/2016 |

OTHER PUBLICATIONS

Machine Translation of JP2003147235 to Asatake A. et al. (applicant: Konishiroku Photo); published May 21, 2003.

Machine Translation of 2009248468 to Furukawa T. (applicant: Kyocera Mita); published Oct. 29, 2009.

Machine Translation of WO2016/047588 to Nagaya Y. et al. (applicant: Fujifilm Corp); published Mar. 31, 2016.

JP 2002526259 Machine Translation (by Google Translate)—published Aug. 20, 2002.

Machine translation of CN 101845122B (applicant: Chengdu Dawei Chemical Technology Co Ltd); published Jul. 25, 2012.

* cited by examiner

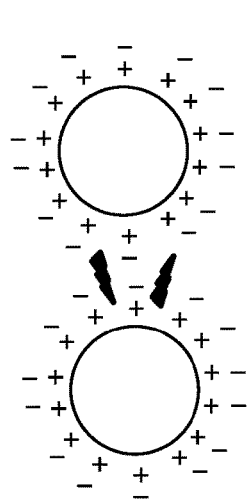
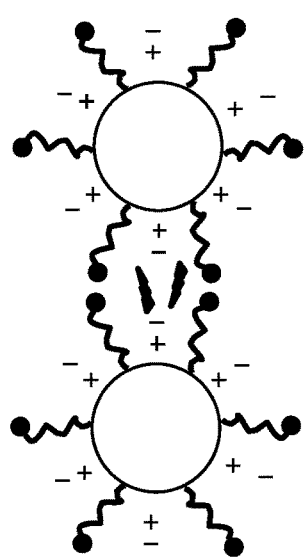
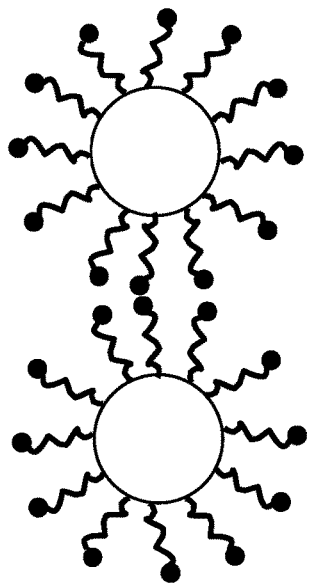
Fig. 1A  Fig. 1B  Fig. 1C
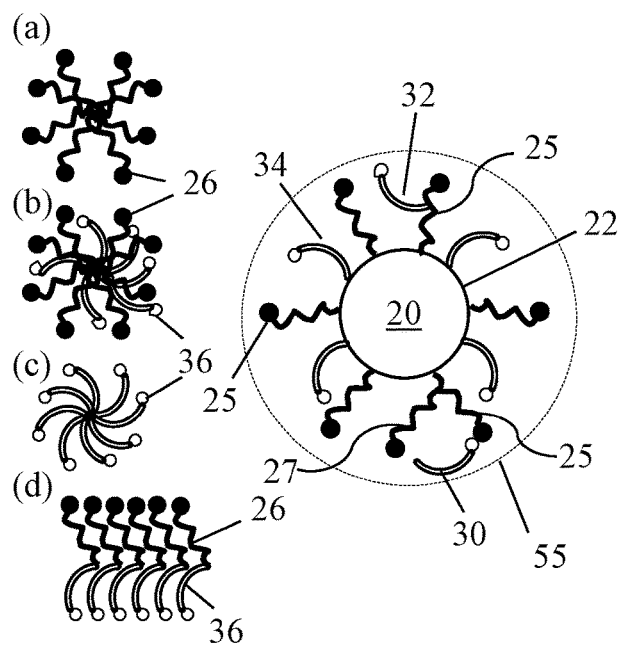
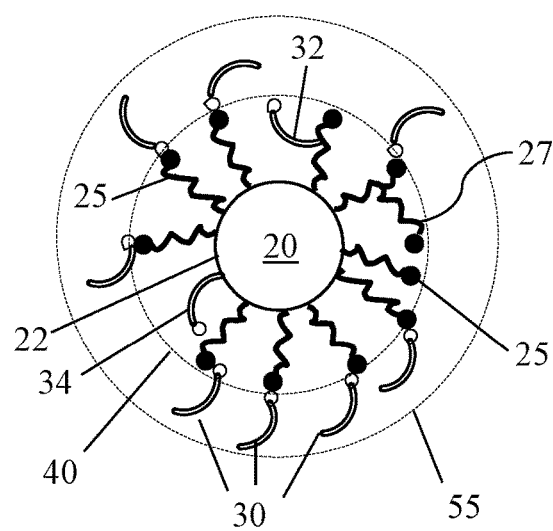
Fig. 2A  Fig. 2B

AQUEOUS PIGMENT DISPERSIONS

This application is a division of U.S. patent application Ser. No. 16/303,171, now U.S. Pat. No. 11,479,687 which draws priority from U.S. Provisional Patent application Ser. No. 62/343,111, filed on May 30, 2016, which is incorporated by reference for all purposes as if fully set forth herein.

PCT/IB2017/053162, filed on May 30, 2017, is incorporated by reference for all purposes as if fully set forth herein. U.S. Provisional Patent Application Ser. No. 62/343,111, filed on May 30, 2016, is incorporated by reference for all purposes as if fully set forth herein.

FIELD

The present disclosure relates to aqueous pigment dispersions, and to methods of preparing and using the same.

BACKGROUND

Compositions comprising small particles in a carrier medium are common in many industries. For example, pigments are widely used in the printing, coating and paint industries, as well as in some cosmetics. Often, the particles, such as pigments, are insoluble in the medium in which they are carried, and consequently compositions containing pigments or other particles are typically heterogeneous mixtures in which the particles are dispersed in a carrier. Depending on the size of the dispersed material, such compositions may be referred to as suspensions (in which the particles are usually larger than one micrometer, which may eventually sediment if left undisturbed) or colloidal dispersions, which are generally characterized by particles in the sub-micron range that typically do not sediment. The shelf-life of dispersions can be extended by physical means (e.g., agitation) or chemical means (e.g., with the use of certain excipients).

Control of the stability of particle-containing compositions is important in the manufacture of many products, such as pigment-containing compositions like paints, inks and coatings. Depending on the chemical nature, size distribution, and concentration of the particles, as well as on the properties of the media (e.g., ionic strength, pH, etc.), particles may undergo phase separation, for instance by flocculation, aggregation or precipitation. In some cases, particle-containing compositions may additionally or alternatively undergo phase transition, in which case the relatively fluid composition may turn into a gel-like structure. Such sol-gel transitions, also termed gelation, may under certain circumstances spontaneously occur at ambient temperature or be triggered or accelerated at elevated temperatures. Such phase separations or transitions are typically deleterious to the intended use of the particle-containing compositions, especially when irreversible. For example, in the case of pigments, such transitions may, for instance, affect the operability of the pigmented compositions (e.g., clogging nozzles of inkjet print heads or otherwise affecting their intended operation).

One way to counteract such stability problems is by adding dispersants or surface active agents to the particle-containing compositions. Though addition of suitable dispersants can give rise to stabilized particle-containing dispersions, often such agents only delay or reduce the inherent instability of the compositions. Moreover, dispersants are often required in amounts that may generate new formulatory challenges. For example, it may be necessary to reduce the concentration of the particles, which typically confer on the composition important aspects of its activity, so as to avoid including amounts of dispersants that would be excessive and detrimental to the composition. In coloring compositions, such reduction in the amount of "active particles" of pigments can be deleterious to the desired coloring effect, whereas an increase in dispersant concentration may negatively affect their performance. For pigment dispersions used for preparing jettable ink compositions, by way of example, such increased dispersant concentration may result in the clogging of the inkjet printing heads, or appreciably increasing the clogging frequency. Incorporation of dispersants is also associated with increased manufacturing costs, due primarily to the cost of the dispersants themselves.

SUMMARY

According to the teachings of the present invention there is provided an aqueous dispersion whose particulate population includes dispersant-laden particles, the dispersion comprising: (a) an aqueous carrier medium; (b) pigment core particles; (c) a dispersant; and (d) a salt of at least one of a fatty acid or a substituted fatty acid, each nominal unit of said salt having a cation and a hydrophobic carbon chain having an anionic moiety associated therewith; said salt having at least one of the following structural features: (i) a standard critical micelle concentration (CMC), at 25° C. and at a pH of 7, is at most 500 millimoles/liter (mM/l); (ii) a pH dependent CMC, at 25° C. and at a pH of the aqueous dispersion, is at most 500 mM/l; said salt having at least one of: (i) a Griffin hydrophilic-lipophilic balance (G-HLB) number of at least 3.8; (ii) a Davies hydrophilic-lipophilic balance (D-HLB) number of at least 9.5; wherein dispersant molecules of said dispersant surround, and are associated with, an outer surface of said pigment core particles to form a dispersant envelope; wherein individual hydrophobic carbon chains of said salt are associated with said dispersant molecules in said dispersant envelope; the dispersant-laden particles being dispersed within said aqueous carrier medium; wherein the particulate population has a median size on a volume basis ($Dv_{50}$) within a range of 20 to 400 nm; and wherein the dispersion has at least one of the following structural features: (1) said outer surface of said pigment core particles is enveloped by, and directly associated with, a plurality of molecules including a portion of said dispersant molecules, wherein a ratio of said portion of said dispersant molecules to said plurality of molecules is at least 0.90, at least 0.95, at least 0.97, at least 0.98, at least 0.99, at least 0.995, or 1.00; (2) said outer surface of said pigment core particles is enveloped by, and directly associated with, a plurality of molecules including a portion of said dispersant molecules, wherein a weight ratio of said portion of said dispersant molecules to hydrophobic carbon chains of said salt, within said plurality of molecules, is at least 20, at least 30, at least 50, or at least 100 (3) said outer surface of said pigment core particles is enveloped by, and directly associated with, a plurality of molecules including a portion of said dispersant molecules, wherein a weight ratio of hydrophobic carbon chains of said salt, within said plurality of molecules, to said plurality of molecules, is at most 0.05, at most 0.03, at most 0.02, at most 0.01, at most 0.005, or 0.002; (4) a weight ratio of said salt to said dispersant is at most 0.55:1, at most 0.50:1, at most 0.45:1, at most 0.40:1, at most 0.35:1, at most 0.30:1, at most 0.25:1, at most 0.20:1, or at most 0.15:1, and optionally, at least 0.05:1, at least 0.07:1, at least 0.10:1, or at least 0.12:1; (5) a weight ratio of said salt to said pigment core particles is at most 0.15:1, at most 0.12:1, at most 0.10:1, at most 0.09:1, at most 0.08:1, at most 0.07:1, at most 0.06:1, or at most 0.05:1, and optionally, at least 0.01:1, at least 0.02:1, or at least 0.03:1; (6) a weight ratio of said dispersant molecules in said dispersant envelope to other dispersant molecules of said dispersant is at least 3:1, at least 4:1, at least 5:1, at least 6:1, or at least 8:1, and optionally, at most 100:1, at most 50:1, at most 20:1, at most 15:1, or at most 10:1; (7) a weight ratio of total solids in the dispersant-laden particles to a total of said dispersant and said salt within the aqueous dispersion is at least 0.55:1, at least 0.6:1, at least 0.65:1, at least 0.70:1, at least 0.75:1, or at least 0.8:1, optionally, at most 0.9:1, or at most 0.85:1, at most 20:1, at most 15:1, or at most 10:1; and further optionally, within a range of 0.55:1 to 0.90:1; (8) a first ratio of said salt to a nominal surface area of at least one of: (i) said pigment core particles; (ii) the dispersant-laden particles, is at most 4.0 g per 1000 m$^2$, and optionally, at most 3.5 g, at most 3.0 g, at most 2.8 g, at most 2.5 g, at most 2.2 g, at most 2.0 g, at most 1.8 g, at most 1.6 g, at most 1.4 g, at most 1.2 g, at most 1.0 g, at most 0.8 g, at most 0.6 g, at most 0.4 g per 1000 m$^2$, or at most 0.3 g per 1000 m$^2$; and (9) a second ratio of said dispersant to a nominal surface area of at least one of: (i) said pigment core particles; (ii) the dispersant-laden particles, is at most at most 7.5 g, at most 7.2 g, at most 7.0 g, at most 6.7 g, at most 6.5 g, at most 6.2 g, or at most 6.0 g per 1000 m$^2$.

According to further features in the described preferred embodiments, the ratio of said salt to said nominal surface area of said pigment core particles is at most 2.5 g, at most 2.2 g, at most 2.0 g, at most 1.8 g, at most 1.6 g, at most 1.4 g, at most 1.2 g, or at most 1.0 g per 1000 m$^2$.

According to still further features in the described preferred embodiments, the pigment core particles constitute 2 wt. % to 60 wt. % of the aqueous dispersion, or the dispersant-laden particles constitute 2.5 wt. % to 75 wt. % of the aqueous dispersion.

According to still further features in the described preferred embodiments, at least one of said standard CMC and said pH dependent CMC is at least 0.2 mM/l, at least 0.4 mM/l, at least 0.5 mM/l, at least 0.6 mM/l, at least 0.7 mM/l, at least 0.8 mM/l, at least 1 mM/l, at least 1.5 mM/l, at least 2 mM/l, or at least 3 mM/l.

According to still further features in the described preferred embodiments, at least one of said standard CMC and said pH dependent CMC is within a range of 0.2 to 400 mM/l, 0.4 to 400 mM/l, 0.4 to 100 mM/l, 0.4 to 80 mM/l, 0.4 to 60 mM/l, 0.6 to 80 mM/l, or 0.6 to 60 mM/l.

According to still further features in the described preferred embodiments, the D-HLB number is at least 10, at least 11, at least 12, at least 14, or at least 16, and optionally, at most 45, at most 40, at most 35, at most 32, at most 30, at most 28, at most 26, or at most 24.

According to still further features in the described preferred embodiments, the D-HLB number is within a range of 10 to 45, 10 to 40, 10 to 35, 12 to 45, 12 to 30, 14 to 45, 14 to 30, 16 to 40, 16 to 28, or 16 to 24.

According to still further features in the described preferred embodiments, the G-HLB number is at least 4, at least 4.1, at least 4.2, at least 4.3, at least 4.5, at least 4.7, at least 5, at least 5.5, or at least 6, and optionally, at most 20, at most 15, at most 12, at most 10, at most 9, at most 8, at most 7.5, or at most 7.

According to still further features in the described preferred embodiments, the G-HLB number is within a range of 3.8 to 20, 3.8 to 14, 3.8 to 10, 4.0 to 15, 4.0 to 12, 4.0 to 9.5, 4.0 to 8.5, 4.0 to 7.5, 4.0 to 7.0, or 4.2 to 7.5.

According to still further features in the described preferred embodiments, a weight ratio of said salt to said dispersant is within a range of 0.05:1 to 0.60:1, 0.05:1 to 0.55:1, 0.05:1 to 0.50:1, 0.05:1 to 0.45:1, 0.05:1 to 0.40:1, or 0.07:1 to 0.50:1.

According to still further features in the described preferred embodiments, the zeta potential of said pigment core particles, said dispersant, and said salt is at most 15, at most 10, at most 5, at most 0, at most −5, at most −10, at most −15, at most −20, at most −30, or at most −40, and optionally, at least −100, at least −90, at least −80, or at least −70 electron Volt (eV).

According to still further features in the described preferred embodiments, the fatty acid or substituted fatty acid has a carbon chain length of 6 to 20, 8 to 20, 8 to 18, 10 to 20, or 10 to 18 carbons.

According to still further features in the described preferred embodiments, the salt of said substituted fatty acid is a sulfonate or a sulfate.

According to still further features in the described preferred embodiments, the cation of the salt is a monovalent cation selected from the group consisting of ammonium and an alkali metal, wherein optionally, said alkali metal is sodium or potassium.

According to still further features in the described preferred embodiments, the hydrophobic carbon chain is selected from the group consisting of dioctyl sodium sulfosuccinate, stearate, oleate, palmitate, myristate, hexadecane sulfonate, dodecyl sulfate, dodecanoate, and decanoate.

According to still further features in the described preferred embodiments, at least one of (i) said pigment core particles and (ii) the dispersant-laden particles constitute at least 5 wt. %, at least 7 wt. %, at least 10 wt. %, at least 12 wt. %, at least 15 wt. %, at least 20 wt. %, at least 25 wt. %, at least 35 wt. %, or at least 45 wt. %, of the aqueous dispersion.

According to still further features in the described preferred embodiments, the dispersant is selected from the group of dispersants consisting of polysorbates, nonionic surfactants having a hydrophilic polyethylene oxide chain and an aromatic hydrocarbon hydrophobic group represented by the chemical formula $C_4H_{22}O(C_2H_4O)_n$, wherein n is 8-11, and optionally 9-10, an alkali salt of alkyl naphthalene sulfonic acid, a poly(acrylate/acrylic) block copolymer and an acrylic block copolymer dispersing agent.

According to still further features in the described preferred embodiments, at least one of said poly(acrylate/acrylic) block copolymer and said acrylic block copolymer has at least one pigment affinic group optionally selected from the group consisting of —COOH, —NH$_2$, —OH, sulfonate, acrylate, and epoxy.

According to still further features in the described preferred embodiments, the dispersant molecules of said dispersant are adsorbed onto said outer surface of said pigment core particles.

According to still further features in the described preferred embodiments, the individual hydrophobic carbon chains of said salt are adsorbed onto said dispersant molecules in said dispersant envelope.

According to another aspect of the present invention there is provided a method of forming an aqueous dispersion containing dispersant-laden particles, the method comprising: (a) providing a raw aqueous composition containing a first plurality of pigment core particles having a first median size within a range of 18 to 390 nm, on a volume basis (Dv$_{50}$), an outer surface of said pigment core particles being enveloped by, and associated with, dispersant molecules of a dispersant, to form a dispersant envelope; (b) introducing a dispersant-improving-agent (DIA) to said raw aqueous composition to produce an intermediate aqueous composition, said DIA being a salt of at least one of a fatty acid or a substituted fatty acid, each nominal unit of said salt having a cation and a hydrophobic carbon chain having an anionic moiety associated therewith; said salt having at least one of: (i) a Griffin hydrophilic-lipophilic balance (G-HLB) number of at least 3.8; (ii) a Davies hydrophilic-lipophilic balance (D-HLB) number of at least 9.5; said salt having at least one of the following structural features: (i) a standard critical micelle concentration (CMC) at 25° C. and at a pH of 7 is at most 500 millimoles/liter (mM/1); (ii) a pH dependent CMC at 25° C. and at a pH of the aqueous dispersion of at most 500 mM/l; and (c) treating said intermediate aqueous composition to produce the aqueous dispersion, said treating including agitating said intermediate aqueous composition, wherein a second median size on a volume basis ($Dv_{50}$) of the dispersant-laden particles within the aqueous dispersion is within a range of 20 to 400 nm.

According to still further features in the described preferred embodiments, the providing of the raw aqueous composition includes milling an initial plurality of crude pigment particles, in a presence of said dispersant, to produce said first plurality of pigment particles.

According to still further features in the described preferred embodiments, the treating further includes heating said intermediate aqueous composition to a temperature within a range of 40-90, 50-80, or 50-75° C., for at least 15 minutes, at least 30 minutes, at least 1 hour, or at least 3 hours.

According to still further features in the described preferred embodiments, the treating further includes maturing said intermediate aqueous composition by heating said intermediate aqueous composition for at least 8 hours, at least 12 hours, at least 1 day, at least 3 days, at least 7 days, at least 14 days, or within a range of 8 hours to 90 days, 8 hours to 30 days, 8 hours to 14 days, 1 day to 60 days, or 1 day to 30 days, at a temperature within a range of 40-80, 50-80, or 50-75° C.

According to still further features in the described preferred embodiments, wherein said first median size exceeds said second median size by at most 30 nm, at most 20 nm, at most 10 nm, or at most 5 nm, or wherein said first median size equals said second median size.

According to still further features in the described preferred embodiments, the ratio of said salt to a nominal surface area of said pigment core particles is at most 3.0 g per 1000 m².

According to still further features in the described preferred embodiments, the pigment core particles constitute 2 to 60%, 5 to 60%, 10 to 60%, 12 to 60%, 15 to 60%, 12 to 40%, or 15 to 40%, by weight, of the aqueous dispersion.

According to still further features in the described preferred embodiments, after aging said intermediate aqueous composition between a first time $t_1$ and a second time $t_2$ which is at least 30 days after $t_1$, at a temperature $T_A$ which is not greater than 80° C., at least one of the following (a), (b), (c), (d-i) and (d-ii) is true: (a) at a temperature $T_V$ which is in the range of 20° C. to 25° C. inclusive, the relationship between a viscosity $V_1$ of said intermediate aqueous composition, measured at time $t_1$, and a viscosity $V_2$ of said intermediate aqueous composition, measured at time $t_2$ is such that $0.8V_1 \le V_2 \le 1.2V_1$; (b) at a temperature $T_V$ which is in the range of 20° C. to 25° C. inclusive, said viscosities $V_1$ and $V_2$ are at most 30 mPa·s; (c) at a temperature $T_P$ which is in the range of 20° C. to 25° C. inclusive, the relationship between the median particle size at time $t_1$, $D_{50-t1}$, and the median particle size at time $t_2$, $D_{50-t2}$, is such that $0.8$ $D_{50-t1} \le D_{50-t2} \le 1.2$ $D_{50-t1}$; (d) when compared to a reference composition that is devoid of the dispersant improving agent but otherwise identical to the composition that contains the DIA and which has been maintained under the same conditions, at least one of (i) and (ii) is true: (i) at a temperature $T_V$ which is in the range of 20° C. to 25° C. inclusive, the relationship between a viscosity $V_R$ measured at time $t_2$ for the reference composition and a viscosity $V_2$ of the DIA-containing composition measured at time $t_2$ is such that $V_2 \le 0.8V_R$; (ii) at a temperature T's which is in the range of 20° C. to 25° C. inclusive, the relationship between the quantities $D_{50-t1}$, $D_{50-t2}$, $D_{50-t1-Ref}$, $D_{50-t2-Ref}$ is such that $D_{50-t1} \approx D_{50-t1-Ref} \le D_{50-t2} < D_{50-t2-Ref}$, wherein $D_{50-t1}$ is the median particle size at time $t_1$ of particles of the composition, $D_{50-t2}$ is the median particle size at time $t_2$ of particles of the composition $D_{50-t2}$, $D_{50-t1\_Ref}$ is the median particle size at time $t_1$ of particles of the reference composition, and $D_{50-t1-Ref}$ is the median particle size at time $t_2$ of particles of the reference composition.

According to still further features in the described preferred embodiments, the DIA is present in an amount sufficient to achieve at least one of the following: (a) increase a viscosity stability of the aqueous dispersion relative to the aqueous dispersion without said DIA; (b) decrease an amount of dispersant necessary to form said aqueous dispersion relative to said aqueous dispersion without the DIA.

According to still further features in the described preferred embodiments, the aqueous dispersion is an aqueous dispersion according to any of the above-described features, or according to any of the features described below.

According to still further features in the described preferred embodiments, increasing said stability of the composition is established by determining that the aqueous dispersion meets at least one of the criteria (a), (b), (c), (d-i) and (d-ii).

According to still further features in the described preferred embodiments, the median size ($D_{50}$) of the particles, whether pigment core particles or dispersant-laden particles, is at most 400 nanometers (nm), and at most 350 nm, at most 300 nm, at most 200 nm, at most 100 nm, at most 90 nm, at most 80 nm, at most 70 nm, at most 60 nm, or at most 50 nanometers.

According to still further features in the described preferred embodiments, the median size ($D_{50}$) of the pigment core particles and/or dispersant laden particles is at least 10 nanometers, at least 20 nm, at least 25 nm, at least 30 nm, or at least 40 nm.

According to still further features in the described preferred embodiments, the median size ($D_{V50}$) of at least one of (i) the particulate population and (ii) said pigment core particles is within a range of 20 nm to 250 nm, 20 nm to 200 nm, 20 nm to 150 nm, 20 nm to 120 nm, 20 nm to 100 nm, 20 nm to 90 nm, 10 nm to 300 nm, 20 nm to 200 nm, 30 nm to 100 nm, or 30 nm to 90 nm.

According to still further features in the described preferred embodiments, the median size ($D_{V50}$) of at least one of the particulate population and said pigment core particles is at least 20 or 25 nm, or within a range of 20 to 80 nm, 20 to 60 nm, 20 to 50 nm, 20 to 40 nm, 20 to 35 nm, or 20 to 32 nm.

According to still further features in the described preferred embodiments, the carbon chain of the fatty acid or substituted fatty acid has at least one $CH_2$ unit replaced by benzene.

According to still further features in the described preferred embodiments, the carbon chain is a saturated or unsaturated carbon chain, or is selected from the group consisting of a straight carbon chain and a branched carbon chain.

According to still further features in the described preferred embodiments, the backbone structure of said carbon chain includes a structure selected from the group consisting of a ring structure and an aromatic structure.

According to still further features in the described preferred embodiments, the dispersant is selected from the group consisting of Dispex® Ultra PX 4585, Disperbyk® 190, Triton® X-100, Tween® 20, and Naxaf® HSP.

According to still further features in the described preferred embodiments, various pairs of a particular dispersant coupled with a particular DIA salt, have been found to display particular efficacy in stabilizing aqueous dispersions, the dispersant and the DIA salt forming a combination selected from the group consisting of Disperbyk® 190 and Ammonium Dodecyl Sulfate; Disperbyk® 190 and Dioctyl Sodium Sulfosuccinate; Disperbyk® 190 and Potassium Oleate; Disperbyk® 190 and Sodium 1-Hexadecanesulfonate; Disperbyk® 190 and Sodium Dodecanoate; Disperbyk® 190 and Sodium Dodecyl Sulfate; Disperbyk® 190 and Sodium Myristate; Disperbyk® 190 and Sodium Octanoate; Disperbyk® 190 and Sodium Oleate; Disperbyk® 190 and Sodium Palmitate; Disperbyk® 190 and Sodium Stearate; Dispex® Ultra PX 4585 and Potassium Dodecanoate; Dispex® Ultra PX 4585 and Potassium Myristate; Dispex® Ultra PX 4585 and Potassium Oleate; Dispex® Ultra PX 4585 and Sodium Dodecanoate; Dispex® Ultra PX 4585 and Sodium Dodecyl Benzene Sulfonate; Dispex® Ultra PX 4585 and Sodium Dodecyl Sulfate; Dispex® Ultra PX 4585 and Sodium Octanoate; Dispex® Ultra PX 4585 and Sodium Oleate; Naxaf® HSP and Sodium Dodecyl Sulfate; Triton® X-100 and Ammonium Dodecyl Sulfate; Triton® X-100 and Potassium Myristate; Triton® X-100 and Sodium Dodecanoate; Triton® X-100 and Sodium Dodecyl Sulfate; Triton® X-100 and Sodium Myristate; Triton® X-100 and Sodium Octanoate; Triton® X-100 and Sodium Oleate; Triton® X-100 and Sodium Palmitate; Triton® X-100 and Sodium 1 Hexadecane Sulfonate; Triton® X-100 and Sodium Stearate; Triton® X-100 and Dioctyl Sodium Sulfosuccinate; Tween® 20 and Potassium Myristate, wherein Triton® X-100 is at least one octylphenol ethoxylate, wherein Tween® 20 is a polysorbate, Naxaf® HSP is an alkali salt of alkyl naphthalene sulfonic acid, Dispex® Ultra PX 4585 is an acrylic block copolymer dispersing agent, and Disperbyk® 190 is a poly (acrylate/acrylic) block copolymer dispersing agent.

According to another aspect of the present invention there is provided a dispersion composition comprising an aqueous carrier medium, particles of a desired material, a dispersant for said particles, and a dispersant improving agent (DIA), the composition being such that, after aging between a first time $t_1$ and a second time $t_2$ which is at least 30 days after $t_1$, at a temperature $T_A$ which is not greater than 80° C., at least one of the following (a), (b), (c), (d-i) and (d-ii) is true: (a) at a temperature $T_V$ which is in the range of 20° C. to 25° C. inclusive, the relationship between a viscosity $V_1$ measured at time $t_1$ and a viscosity $V_2$ measured at time $t_2$ is such that $0.8V_1 \leq V_2 \leq 1.2V_1$; (b) at a temperature $T_V$ which is in the range of 20° C. to 25° C. inclusive, a viscosity $V_1$ measured at time $t_1 \leq 30$ mPa·s and a viscosity $V_2$ measured at time $t_2 \leq 30$ mPa·s; (c) at a temperature $T_{PS}$ which is in the range of 20° C. to 25° C. inclusive, the relationship between the median particle size at time $t_1$, $D_{50-t1}$, and the median particle size at time $t_2$, $D_{50-t2}$, is such that $0.8 D_{50-t1} \leq D_{50-t2} \leq 1.2 D_{50-t1}$; (d) when compared to a reference composition that is devoid of the dispersant improving agent but otherwise identical to the composition that contains the DIA and which has been maintained under the same conditions, at least one of (i) and (ii) is true: (i) at a temperature $T_V$ which is in the range of 20° C. to 25° C. inclusive, the relationship between a viscosity $V_R$ measured at time $t_2$ for the reference composition and a viscosity $V_2$ of the DIA-containing composition measured at time $t_2$ is such that $V_2 \leq 0.8V_R$; (ii) at a temperature $T_{PS}$ which is in the range of 20° C. to 25° C. inclusive, the relationship between the values $D_{50-t1}$, $D_{50-t2}$, $D_{50-t1-Ref}$, $D_{50-t2-Ref}$, wherein $D_{50-t1}$ is the median particle size at time $t_1$ of particles of the composition, $D_{50-t2}$ is the median particle size at time $t_2$ of particles of the composition, $D_{50-t1-Ref}$ is the median particle size at time $t_1$ of particles of the reference composition, and $D_{50-t2-Ref}$ is the median particle size at time $t_2$ of particles of the reference composition, is such that $D_{50-t1} \approx D_{50-t1-Ref} \leq D_{50-t2} < D_{50-t2-Ref}$, the relationship being further optionally such that $D_{50-t2} \leq 0.8 \, D_{50-t2-Ref}$.

As detailed below, such viscosities or particle sizes are measured at ambient temperature, the measuring conditions of the viscometer or of the particle size analyzer adapted to the relevant range of viscosities or particle sizes, shapes and cumulative distributions, as the case may be. In some embodiments, $t_1$ and $t_2$ are within 30 and 360 days of one another, or within 30 and 270 days, or between 30 and 180 days, or between 30 and 90 days, or between 30 and 60 days.

In some embodiments, the temperature of aging is such that $20° C. \leq T_A \leq 80° C.$. In some embodiments, $T_A \leq 60° C.$. In some embodiments, $T_A$ equals 60° C. In some embodiments, $20° C. \leq T_A \leq 60° C.$. In some embodiments, $20° C. \leq T_A \leq 25° C.$. In some embodiments, $T_A$ equals 25° C. In some embodiments, $25° C. \leq T_A \leq 30° C.$ In some embodiments, the duration of aging is such that the difference between the time $t_2$ and time $t_1$ is 30 days. In some embodiments, the duration of aging is such that the difference between the time $t_2$ and time $t_1$ is at least 30 days. In some embodiments, the difference between the time $t_2$ and time $t_1$ is 45 days. In some embodiments, the difference between the time $t_2$ and time $t_1$ is at least 45 days. In some embodiments, the difference between the time $t_2$ and time $t_1$ is 60 days. In some embodiments, the difference between the time $t_2$ and time $t_1$ is at least 60 days.

In some embodiments, the difference between the time to at which the composition is prepared and time $t_1$ is at most 10 days. In some embodiments, $t_1 - t_0 \leq 5$ days. In some embodiments, $t_1 - t_0 \leq 3$ days. In some embodiments, $t_1 - t_0 \leq 1$ day.

In some embodiments, the molecules of DIA (or DIA molecules) are salts of a linear or branched fatty acid or substituted fatty acid. The DIA molecules consist of a cation salt and a hydrophobic carbon chain having an anionic moiety associated therewith. As it is readily understood that such salts may promptly dissociate in a suitable carrier into the cation salt and the anionic-hydrocarbon chain, the term DIA molecule also encompasses the dissociated molecule.

In some embodiments, at least a fraction of the DIA molecules is in molecular association with the dispersant.

Pigment particles before association with dispersant molecules and/or with DIA molecules may be referred herein as core particles, core pigment particles or pigment core particles. Once such core particles are associated at least with dispersant molecules, they may be referred to as dispersant-laden particles.

In some embodiments, the median size of the aforesaid particulate populations is assessed and/or provided on a volume basis, so that the term $D_{50}$ as used in previous paragraphs in connection with particle size lower thresholds, upper limits or ranges is to be interpreted as referring to $D_{V50}$.

In some embodiments, the pigment particles may be of organic or inorganic pigments, and may comprise cyan, blue, magenta, red, yellow, black, green, orange, white, violet, fluorescent, metallic or metallic effect particles or mixtures thereof.

For compositions providing for a cyan or blue coloration, the pigment particles can be at least one of Pigment Blue 1, Pigment Blue 2, Pigment Blue 3, Pigment Blue 15, Pigment Blue 15:3. Pigment Blue 15:4. Pigment Blue 16, Pigment Blue 22, Pigment Blue 60, for example. Such pigments may be referred to as PB1, PB2, PB3, and so on.

For compositions providing for a magenta or red coloration, the pigment particles can be at least one of Pigment Red 2, Pigment Red 3, Pigment Red 4, Pigment Red 5, Pigment Red 7, Pigment Red 8, Pigment Red 12. Pigment Red 13, Pigment Red 21, Pigment Red 22, Pigment Red 23. Pigment Red 31, Pigment Red 48(Ca), Pigment Red 48(Mn), Pigment Red 49:1, Pigment Red 49:2, Pigment Red 53:1, Pigment Red 57(Ca), Pigment Red 57:1, Pigment Pigment Red 63:1, Pigment Red 81, Red 112, Pigment Red 122, Pigment Red 123, Pigment Red 144, Pigment Red 146, Pigment Red 168, Pigment Red 184, Pigment Red 185, Pigment Red 202, Pigment Violet 19 and Pigment Violet 23, for example. Such pigments may be referred to as PR2, PR3, PR4, and so on.

For compositions providing for a yellow coloration, the pigment particles can be at least one of Pigment Yellow 1, Pigment Yellow 3, Pigment Yellow 12, Pigment Yellow 13, Pigment Yellow 14, Pigment Yellow 17, Pigment Yellow 55, Pigment Yellow 62, Pigment Yellow 65, Pigment Yellow 73, Pigment Yellow 74, Pigment Yellow 81, Pigment Yellow 83, Pigment Yellow 97, Pigment Yellow 110, Pigment Yellow 127. Pigment Yellow 138, Pigment Yellow 139, Pigment Yellow 147, Pigment Yellow 150. Pigment Yellow 151, Pigment Yellow 154, Pigment Yellow 155, Pigment Yellow 168, Pigment Yellow 174, Pigment Yellow 176, Pigment Yellow 180, Pigment Yellow 183 and Pigment Yellow 191, for example. Such pigments may be referred to as PY1, PY3, PY12, and so on.

For compositions providing for a black coloration, the pigment particles can be at least one of a carbon black species, such as furnace black, lamp black, acetylene black and channel black, also known as Pigment Black 1, Pigment Black 6, Pigment Black 7, Pigment Black 8, Pigment Black 9, Pigment Black 10, Pigment Black 11, Pigment Black 12, Pigment Black 13, Pigment Black 14, Pigment Black 17, Pigment Black 18, Pigment Black 19, Pigment Black 22, Pigment Black 23, Pigment Black 24, Pigment Black 25, Pigment Black 26, Pigment Black 27, Pigment Black 28, Pigment Black 29, Pigment Black 30, Pigment Black 31, Pigment Black 32, Pigment Black 33, Pigment Black 34 and Pigment Black 35, for example. Such pigments may be referred to as PBk1, PBk6, PBk7, and so on.

For compositions providing for a green coloration, the pigment particles can be at least one of Pigment Green 1, Pigment Green 2, Pigment Green 4, Pigment Green 7, Pigment Green 8, Pigment Green 10, Pigment Green 13, Pigment Green 14. Pigment Green 15, Pigment Green 16, Pigment Green 17, Pigment Green 18, Pigment Green 19, Pigment Green 22, Pigment Green 23, Pigment Green 24, Pigment Green 26, Pigment Green 36, Pigment Green 38, Pigment Green 39, Pigment Green 41, Pigment Green 42, Pigment Green 45, Pigment Green 48, Pigment Green 50, Pigment Green 51, Pigment Green 55 and Pigment Green 56, for example. Such pigments may be referred to as PG1, PG2, PG4, and so on.

For compositions providing for an orange coloration, the pigment particles can be at least one of Pigment Orange 1, Pigment Orange 2, Pigment Orange 3, Pigment Orange 5, Pigment Orange 13, Pigment Orange 16, Pigment Orange 17, Pigment Orange 20, Pigment Orange 21, Pigment Orange 23, Pigment Orange 34, Pigment Orange 36, Pigment Orange 38, Pigment Orange 41, Pigment Orange 43, Pigment Orange 45, Pigment Orange 48, Pigment Orange 64 and Pigment Orange 73, for example. Such pigments may be referred to as PO1, PO2, PO3, and so on.

For compositions providing for a white coloration, the pigment particles can be at least one of Pigment White 1, Pigment White 2, Pigment White 3, Pigment White 4, Pigment White 5, Pigment White 6, Pigment White 6:1, Pigment White 7, Pigment White 8, Pigment White 10, Pigment White 11, Pigment White 12, Pigment White 13, Pigment White 14, Pigment White 15. Pigment White 16, Pigment White 17, Pigment White 18, Pigment White 18:1, Pigment White 19, Pigment White 20, Pigment White 21, Pigment White 22, Pigment White 23, Pigment White 24, Pigment White 25, Pigment White 26, Pigment White 27, Pigment White 28, Pigment White 30, Pigment White 32 and Pigment White 33, for example. Such pigments may be referred to as PW1, PW2, PW3, and so on.

It will be appreciated that the pigment selection may depend on the desired coloration, as well as on the intended use. For instance, for compositions intended for cosmetic use, the pigment particles are to be of a cosmetically approved grade; for compositions intended for dermatological use, the pigment particles are to be of a dermatologically approved grade; and for compositions intended for pharmaceutical use, the pigment particles are to be of a pharmaceutically approved grade. Additionally, pigments are generally selected to be compatible and/or chemically inert with any other ingredient included in the composition, such considerations being well known to the persons skilled in the preparation of the respective compositions. It will be understood that similar concerns are to be considered for the selection of the dispersant and of the DIA.

In some embodiments, the pigment particles are selected from the group consisting of Pigment Red 185, Pigment Red 122, Pigment Blue 15:3, Pigment Black 7, Pigment Green 7, and Pigment White 6.

It will be appreciated that to persons skilled in the art of formulating aqueous colloidal dispersions, the selection of dispersants suitable for a particular pigment or other submicron particulate product may be based on readily available literature, including recommendations of the manufacturer of the particulate product, and/or the manufacturer of the dispersant, other commercial literature, patent literature, and academic and professional publications. Suitable dispersants for various aqueous colloidal dispersions include acrylic block copolymer dispersing agents, including in particular high molecular weight (MW) block copolymers, block copolymer dispersing agents with pigment affinic groups, including in particular high MW block copolymers, non-ionic surfactants, or anionic surfactants. Low molecular weight dispersants, such as octylphenol ethoxylates (e.g., Triton® X-100) and polysorbates (e.g., Tween® 20), which are non-ionic surfactants, and polymeric naphthalene sulfonate condensates (e.g., NAXAF® HSP), which may serve as an anionic surfactant, can also be employed as dispersants according to the present teachings.

As used herein in the specification and in the claims section that follows, the term "pigment affinic groups" and the like, is meant to include the following functional groups and moieties: —COOH, —NH₂, —OH, sulfonate, acrylate, and epoxy.

In cases in which such literature is unavailable to recommend the use of a particular dispersant with a particular particulate product, the skilled formulator could choose a dispersant known to have efficacy over a broad range of sub-micron particulate species.

Commercial examples of such broad-spectrum dispersants include Dispex® Ultra PX 4585 (previously EFKA 4585), Disperbyk® 190, Triton® X-100, Tween® 20 and NAXAF® HSP.

Some routine experimentation may be necessary in some cases, particularly to optimize concentrations.

In some embodiments, the ratio of pigment to dispersant by weight is from 1:3 to 20:1. In some embodiments, the ratio of pigment to dispersant by weight is from 5:1 to 20:1.

The DIA is a salt of a fatty acid or a salt of a substituted fatty acid. In some embodiments, the fatty acid or substituted fatty acid has a carbon chain length of 6 to 30 or 6 to 20 carbons. In some embodiments, the fatty acid or substituted fatty acid has a carbon chain length of 8 to 18 carbons. In some embodiments, the carbon chain is a saturated carbon chain (e.g., as for the octanoate (caprylate), nonanoate, decanoate (caprate), undecanoate, dodecanoate (laurate), tridecanoate, tetradecanoate (myristate), pentadecanoate, hexa-decanoate (palmitate), heptadecanoate and octadecanoate (stearate) salts in the carboxylate series of compounds). In some embodiments, the carbon chain is an unsaturated carbon chain (e.g., as for the oleate salts in the carboxylate series of compounds). In some embodiments, the substituted fatty acid is a sulfonic fatty acid (e.g., sodium dodecyl sulfate, sodium dodecyl sulfonate, or dioctyl sodium sulfosuccinate, the sulfate or sulfonate group replacing the corresponding carboxylate group of sodium dodecanoate.

The carbon chain can be linear or branched, and may include cyclic structures or aromatic rings. In some embodiments, the carbon chain of the fatty acid or substituted fatty acid has at least one CH₂ unit replaced by benzene (e.g., sodium dodecyl benzene sulfonate). From a steric perspective, the benzene group may preferably be disposed distally to the anionic moiety of the fatty acid or substituted fatty acid.

With regard to steric effects, the inventors believe that the disposition of any large branches or rings (including aromatic structures) is more preferred towards the end of the substituted fatty acid anion that is distal to the COO⁻ or substituted carboxylate COO⁻ moiety. Without wishing to be limited by theory, the inventors believe that such large branches or rings, when disposed adjacent to the COO⁻ or substituted carboxylate COO⁻ moiety, sterically hinder the COO⁻ or substituted carboxylate COO⁻ moiety from associating with the dispersant molecules enveloping the pigment particles, thereby reducing the efficacy of the DIA.

In some embodiments, the fatty acid or substituted fatty acid is selected from the group consisting of nonadecanoic acid, stearic acid, oleic acid, heptadecanoic acid, palmitic acid, pentadecanoic acid, myristic acid, tridecanoic acid, dodecanoic acid, undecanoic acid, decanoic acid, nonanoic acid, octanoic acid, dioctyl sulfosuccininc acid, hexadecane sulfonic acid, tetradecane sulfonic acid, dodecyl sulfonic acid, and dodecylbenzene sulfonic acid.

In some embodiments, the counter-ion of the salt is selected so that the fatty acid salt is soluble in the aqueous dispersion that results from dispersing the particles in the aqueous carrier medium. Such solubility can be preliminarily estimated based on the water solubility of the fatty acid salt, whether or not further substituted, water soluble salts being preferred (e.g., having a solubility in deionized water of at least 10 mg/ml). The counter-ion of the salt can be selected from the group of alkali metals. Sodium and potassium salts were found particularly advantageous for the dispersions of the present disclosure. As a counter-ion, ammonium was found to behave in a similar fashion to the equivalent sodium salt.

In some embodiments, the salt of a fatty acid or the salt of a substituted fatty acid is selected from the group consisting of sodium nonadecanoate, potassium nonadecanoate, ammonium nonadecanoate, sodium stearate, potassium stearate, ammonium stearate, sodium oleate, potassium oleate, ammonium oleate, sodium heptadecanoate, potassium heptadecanoate, ammonium heptadecanoate, dioctyl sodium sulfosuccinate (AOT), dioctyl potassium sulfosuccinate, dioctyl ammonium sulfosuccinate, sodium hexadecane sulfonate, potassium hexadecane sulfonate, ammonium hexadecane sulfonate, sodium palmitate, potassium palmitate, ammonium palmitate, sodium pentadecanoate, potassium pentadecanoate, ammonium pentadecanoate, sodium myristate, potassium myristate, ammonium myristate, sodium dodecyl sulfate (SDS), potassium dodecyl sulfate, ammonium dodecyl sulfate, potassium dodecylbenzene sulfonate, sodium dodecylbenzene sulfonate (SDBS), potassium dodecylbenzene sulfonate, sodium tridecanoate, potassium tridecanoate, ammonium tridecanoate, sodium dodecanoate (also known as sodium laurate), potassium dodecanoate (also known as potassium laurate), ammonium dodecanoate, sodium undecanoate, potassium undecanoate, ammonium undecanoate, sodium decanoate, potassium decanoate, ammonium decanoate, sodium nonanoate, potassium nonanoate, ammonium nonanoate, sodium octanoate, potassium octanoate and ammonium octanoate.

In some embodiments, the dispersant improving agent (DIA) is present in an amount which when expressed as a weight (wt.) ratio (weight of DIA per weight of dispersant) can be between 5:1 and 1:300, or between 4:1 and 1:50, or between 1:2 and 1:30.

In some embodiments, the dispersant improving agent (DIA) is present in an amount which constitutes 0.1 to 20% by weight of the particles. In some embodiments, the DIA is present in an amount which constitutes up to 1% by weight of the particles, up to 2% by weight of the particles, up to 3% by weight of the particles, up to 4% by weight of the particles, up to 5% by weight of the particles, up to 6% by weight of the particles, up to 7% by weight of the particles, up to 8% by weight of the particles, up to 9% by weight of the particles, up to 10% by weight of the particles, up to 11% by weight of the particles, up to 12% by weight of the particles, up to 13% by weight of the particles, up to 14% by weight of the particles, up to 15% weight by of the pigment, up to 16% by weight of the particles, up to 17% by weight of the particles, up to 18% by weight of the particles, up to 19% by weight of the particles, or up to 20% by weight of the particles. In some embodiments, the particles are pigment particles.

In some embodiments, the pigment particles constitute not more than 30 wt. %, not more than 28 wt. %, not more than 26 wt. %, not more than 24 wt. %, not more than 22 wt. %, not more than 20 wt. %, not more than 19 wt. %, not more than 18 wt. %, not more than 17 wt. %, not more than 16 wt. %, not more than 15 wt. %, not more than 14 wt. %, not more than 13 wt. %, not more than 12 wt. %, not more than 11 wt.

%, not more than 10 wt. %, not more than 9 wt. %, not more than 8 wt. %, not more than 7 wt. %, not more than 6 wt. %, not more than 5 wt. %, not more than 4 wt. %, not more than 3 wt. %, not more than 2 wt. %, or not more than 1 wt. % of the composition.

In some embodiments, the pigment particles constitute at least 0.1 wt. %, 1 wt. %, at least 2 wt. %, at least 3 wt. %, at least 4 wt. %, at least 5 wt. %, at least 6 wt. %, at least 7 wt. %, at least 8 wt. %, at least 9 wt. %, at least 10 wt. %, at least 11 wt. %, at least 12 wt. %, at least 13 wt. %, at least 14 wt. %, at least 15 wt. %, at least 16 wt. %, at least 17 wt. %, at least 18 wt. %, at least 19 wt. % or at least 20 wt. % of the composition. In some embodiments, the pigment particles constitute 0.1 wt. % to 10 wt. % of the composition. In some embodiments, the pigment particles constitute 0.1 wt. % to 5 wt. % of the composition.

In some embodiments, after an aging period of at least one day at a temperature of from 20° C. to 80° C. inclusive, the composition has a lower viscosity than an otherwise identical reference composition lacking the DIA and stored under the same conditions. In some embodiments, the aging period is at least 2 days, 3 days, 4 days, 5 days, 6 days, 7 days, 8 days, 9 days, 10 days, 11 days, 12 days, 13 days, 14 days, 15 day, 20 days, 25 days, or 30 days. In some embodiments, the aging temperature is at least 25, 30, 35, 40, 45, 50, 55, or 60° C. In some embodiments, the aging temperature is not more than 70, 60, 55, 50, 45, 40, 35 or 30° C. It will be appreciated that measurements performed over a relatively short period of time at a relatively high temperature can be equivalent to measurements resulting from a relatively longer period of time at a relatively lower temperature. For example, it is generally assumed that a sample incubated for a period of a month at a temperature of 60° C. may predict the behavior of a same sample incubated for a period of a year at ambient temperature. For this reason accelerated stability studies are often performed at elevated temperature, as long as the temperature is not otherwise deleterious to the stability of the composition. For instance, the temperature needs be below the boiling point of the carrier and take into consideration any such temperature threshold irreversibly affecting the composition and/or the relation between its constituents and the like readily appreciated major changes. In some embodiments, the temperature is at most 80, 75, 70, or 65° C.

In some embodiments, the viscosity is not more than 90%, not more than 80%, not more than 70%, not more than 60%, not more than 50%, not more than 40%, not more than 30%, not more than 20%, not more than 10%, not more than 1%, not more than 0.1%, not more than 0.01%, or not more than 0.001% of the viscosity of the reference composition after the storage period. The viscosity may be provided interchangeably in centipoise (cP) or in equivalent millipascal-second (mPa·s).

In some embodiments, after a storage period of at least 30 days (i.e. $t_2-t_1=30$ days) at a temperature of at least 20° C., the value of at least one of $D_{10}$, $D_{50}$ and $D_{90}$ of the particles in the composition at $t_2$ (viz. $D_{10\text{-}t2}$, $D_{50\text{-}t2}$ and $D_{90\text{-}t2}$, respectively) is not more than 20% larger relative to the initial $D_{10}$, $D_{50}$ or $D_{90}$ of the particles (viz. $D_{10\text{-}t1}$, $D_{50\text{-}t1}$ and $D_{90\text{-}t1}$, respectively). In some embodiments, the storage period is at least 45 days, at least 60 days, at least 75 days, at least 90 days, at least 120 days, at least 150 days, at least 180 days, at least 210 days, at least 240 days, at least 270 days, at least 300 days, at least 330 days, or at least 365 days, and so on. In some embodiments, the temperature is at least 25, 30, 35, 40, 45, 50, 55, or 60° C. In some embodiments, the temperature is at most 80, 75, 70, or 65° C. In some embodiments, the change in $D_{10}$, $D_{50}$ or $D_{90}$ is not more than 19%, 18%, 17%, 16%, 15%, 14%, 13%, 12%, 11%, 10%, 9%, 8%, 7%, 6%, 5%, 4%, 3%, 2% or 1% over the storage period. In some embodiments, the change is a change in $D_{50}$. In some embodiments, the change is a change in $D_{10}$. In some embodiments, the change is a change in $D_{90}$.

Compositions prepared according to the present disclosure can be used in a variety of industries, including in cases where the coloring effect of a pigmented dispersion is beneficial. Such uses include the preparation of ink compositions, paint compositions, coating compositions (e.g., industrial and decorative coatings), and the preparation of more personal care oriented products such as cosmetic compositions, dermatological compositions and pharmacological compositions, to name a few.

Compositions having a relatively stable viscosity over time are desirable in all industries. However some applications are more sensitive to such issues, in particular when the compositions are to be used with relatively complex or delicate equipment or for any other demanding reason (e.g., proper dosing in cosmetics). For example, nozzles of ink jet print heads are often sensitive and so it may be preferable for ink compositions used in such print heads to reproducibly have a viscosity not exceeding 30 mPa·s following an incubation of at least 30 days at 60° C. In some cases, compositions in accordance with embodiments of the invention have a viscosity of no more than 25 mPa·s, no more than 20 mPa·s, no more than 15 mPa·s, or no more than 10 mPa·s, under such conditions. Such ranges of viscosities which can be maintained by the compositions of the present disclosure can be desired for inkjet inks, but need not be construed as limiting for other types of inks. Paint compositions, coating compositions and cosmetic compositions can have higher working viscosities, and still benefit from such viscosities being stable over time according to the present teachings.

The particulate dispersions disclosed herein can also serve in applications where coloring effects are not essential or even secondary. For example, Pigment White can be incorporated for instance into cosmetic compositions to serve as a UV-blocker. Likewise, while Carbon Black pigment particles can serve to color all aforementioned compositions, including cosmetic compositions, where such particles can serve for the preparation of mascara, eye liners and the like, or can be used as a filler, for instance to provide mechanical properties to elastomers.

BRIEF DESCRIPTION OF THE DRAWINGS

Embodiments of the invention will now be described, by way of example, with reference to the accompanying drawings, in which:

FIGS. 1A-1C schematically depict various types of mechanisms and structures in particle dispersions, wherein FIG. 1A illustrates a solely electrostatic repulsion mechanism and structure; FIG. 1C illustrates a solely steric hindrance mechanism and structure, and FIG. 1B provides a combined electrostatic and steric mechanism and structure;

FIG. 2A illustrates a first arrangement of dispersant molecules (full black serpentines having a dark dot polar head) and DIA molecules (white "arcs", with the anionic moiety depicted as an empty circle) on a pigment core particle;

FIG. 2B illustrates a second arrangement of the dispersant molecules and DIA molecules on a pigment core particle, in which virtually all of the direct associations with the outer surface of the pigment core particle are with dispersant molecules;

DETAILED DESCRIPTION

Figure 3:
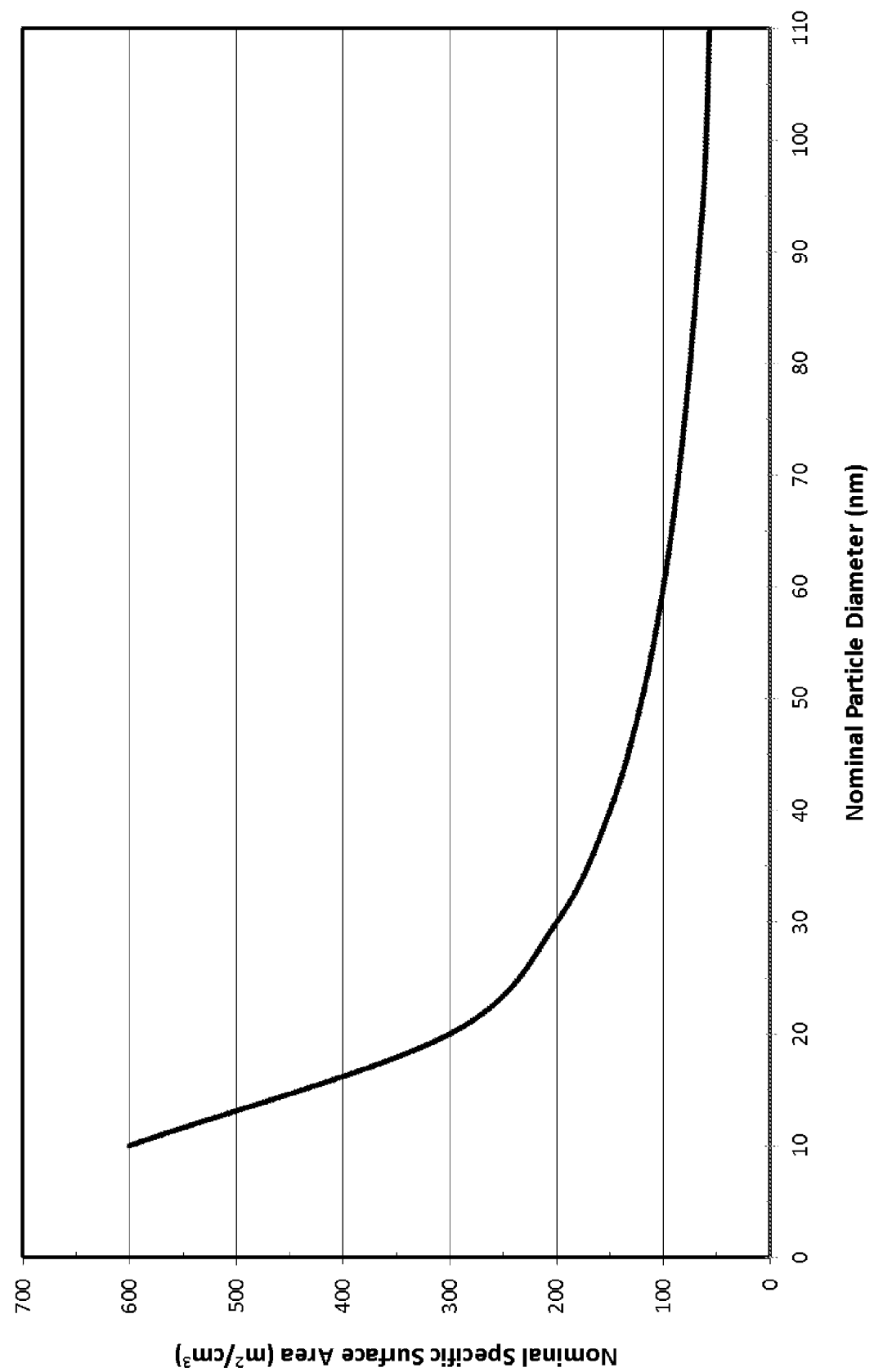
FIG. 3 provides a graphical representation of the nominal (volume) specific surface area of pigment particles as a function of the nominal particle size ($D_{V50}$) assuming that the pigment particles are all perfect spheres having the nominal particle diameter ($D_{V50}$)

As noted, dispersants are commonly used to obtain dispersions of pigments or other particles in a carrier having improved properties vis-á-vis dispersions lacking dispersants, but even with the inclusion of dispersants, maintaining the dispersion is often a challenge, due to processes such as agglomeration, flocculation, sedimentation, precipitation, and, at the other extreme, gelation. Additionally, the inclusion of dispersants increases the cost of manufacturing the particle-containing compositions. The present inventors have found that the addition of a dispersion improving agent (DIA) can improve the performance of such compositions in one or more ways: (a) reducing the amount of dispersant required to obtain a particle-containing composition having desired properties; (b) decreasing the amount of dispersant required to maintain a particle-containing composition below a particular viscosity under defined conditions for a given period of time; (c) decreasing the viscosity of a particle-containing composition over time under defined conditions relative to behavior of such a composition lacking the DIA for the same time under the same conditions.

As will be appreciated by those skilled in the art, different materials function as dispersants for different particulate material, such as pigments, in different media. Typically, dispersant are either low molecular weight (e.g., <1000) surfactants (ionic [cationic, anionic, zwitterionic)], nonionic, or both), which are not necessarily polymeric; or they are high molecular weight polymers suitably functionalized for particle dispersion. The examples described herein utilize various types of dispersants (high molecular weight polymeric surfactants, relatively low molecular weight nonionic surfactants and a so called low molecular weight polymeric naphthalene sulfonate anionic surfactant) commonly used with pigments.

The DIAs used in embodiments of the present invention may be any material that improves the performance of the dispersant with respect to the pigment or other particles in the carrier medium. Such improving of performance may constitute, for example, decreasing the amount of dispersant necessary to obtain an acceptably stable particle-containing composition; and/or it may constitute, for example, prolonging the stability of the composition relative to an otherwise identical composition that lacks the DIA. Depending on the circumstances, such improved stability may be measured as a function of viscosity of the composition, it being known that the viscosity of many pigment-containing compositions has a tendency to increase over time, particularly at higher temperatures. In some extreme cases, this may result in the composition becoming a gel. Thus far, it has been found that the best DIAs for the pigment/dispersion combinations tested are generally fatty acid salts or derivatives of such, such as sulfonic acid salt equivalents of such fatty acid salts. These fatty acid salts generally range from about 6 to 30 carbon atoms, and while typically they possess linear saturated carbon chains, they may have some degree of unsaturation and/or branching. A list, including the DIAs tested and reference molecules, appears in Table 2 hereinbelow.

The particles with which the presently claimed invention is employed preferably have a $D_{50}$ of not more than 400 nanometers (nm). "$D_{50}$" refers to the median size of the particles, i.e. the size at which 50% of the particles by number or, if determining on the basis of volume, by cumulative volume, are of smaller size than $D_{50}$; these two quantities are referred to respectively as $D_{N50}$ and $D_{V50}$. Similarly, $D_{10}$ refers the situation in which 10% of the particles by number or, if determining on the basis of volume, by cumulative volume, are of smaller size than $D_{10}$, and $D_{90}$ refers the situation in which 90% of the particles by number or, if determining on the basis of volume, by cumulative volume, are of smaller size than $D_{90}$; these four quantities are referred to respectively as $D_{N10}$, $D_{V10}$, $D_{N90}$ and $D_{V90}$. The $D_{50}$ is determined on the basis of hydrodynamic diameter of the particles using dynamic light scattering (DLS). In DLS techniques, the particles are approximated to spheres of equivalent behavior and the size can be provided in terms of hydrodynamic diameter. DLS also allows assessment of the size distribution of a population of particles. Results can be expressed in various terms depending on the basis for the calculation of the distribution, which for example may be the number, the volume, the surface area or the intensity of the particles. An example of an apparatus that can be used to determine $D_{10}$, $D_{50}$ or $D_{90}$ using DLS is the Zen 3600 Zetasizer from Malvern Instruments Ltd. (Malvern, UK). In some embodiments, the size of the particles and their distribution is expressed on a volume basis, in which case $D_{50}$ and $D_{V50}$, for instance, are used interchangeably.

The particles may have any suitable aspect ratio, which is a dimensionless ratio between the smallest dimension of the particle and the largest orthogonal dimension. Particularly with respect to pigments, pigment particles having an almost spherical shape are characterized by an aspect ratio of approximately 1:1 and typically not more than 1:2, whereas flake-like particles can have an aspect ratio (i.e. between the thickness and the longest length of a planar projection of the particle) of at least 1:5 to 1:100 or more. Though not limiting, pigment particles in accordance with embodiments of the invention can have an aspect ratio of about 1:100 or less, of about 1:75 or less, of about 1:50 or less, of about 1:25 or less, of about 1:10 or less, or even of about 1:2 or less.

In accordance with embodiments of the invention, the pigment is first milled with the dispersant, the two materials being mixed together in the relevant proportions and added to the carrier, or mixed together in the relevant proportions in the carrier, and milled, the milling being sufficient to yield a desired size of pigment particles. This initial milled pigment dispersion is often referred to as a concentrated millbase. Depending on the concentration of pigment or other particles sought in the composition, the concentrated millbase can optionally be diluted with the carrier (either adding carrier to the concentrated millbase or adding concentrated millbase to carrier) so as to reach any desired pigment concentration. The resulting stock dispersion may be referred to as the diluted millbase or working millbase stock. The DIA can be added to the concentrated millbase upon completion of the milling, after which the DIA-containing concentrated millbase may be diluted; or the DIA may be added to the diluted millbase.

Alternatively, the DIA may be incorporated in a formulation that includes, in addition to either millbase type, additives suitable for achieving the intended use of the formulation. Such formulations are generally prepared from the millbase either shortly after completion of the milling, or shortly after dilution of the millbase; dilution of the millbase may be effected as part of the preparation of the formulation. The term "fresh formulation" or "freshly prepared formulation" refers to any such formulation prepared within two days of the completion of milling. Formulations beyond this time frame, or for which the time of preparation relative to the completion of milling is unknown, may be termed "stored formulations"; commercially available colloidal dispersions are examples of such stored formulations. Similarly the term "freshly added", when referring to the time at which the DIA is added to the formulation, means that the DIA was added to the formulation within two days of completion of milling. It will be appreciated that the DIA may be incorporated into a freshly-prepared formulation after all other additives have been incorporated therein, or the DIA may be incorporated along with one or more of the additives. It will also be appreciated that the DIA can be incorporated into a stored formulation. Put differently, the stage at which the DIA is added to the milled, dispersant-containing material may not be critical. Both the incorporation of DIA in or into a freshly prepared formulation as well as the addition of DIA to a stored formulation constitute embodiments of the invention.

Irrespective of the timeline of incorporation of the DIA in a pigment:dispersant millbase or derived formulation, the resulting dispersions of particles constitute embodiments of the presently claimed invention.

Additional ingredients may be added as necessary, and the compositions may be diluted to the necessary concentration for a particular use as a paint, coating, ink or the like. For example, to make an ink composition, a polymeric resin may be used as a binder. It will be appreciated that the addition of other ingredients, and/or dilution of an initially more-concentrated composition to a diluted composition, does not remove the resulting composition from the scope of the presently claimed invention; such resulting compositions containing additional ingredients and/or being more dilute constitute embodiments of the presently claimed invention. Pigment-containing compositions in accordance with embodiments of the invention may be used as concentrates for paints, coatings, inks and the like.

As will be explained below in connection with FIGS. 7 and 8, the post-milling inclusion of one or more DIAs in the particle-containing compositions can reduce the amount of dispersant required and/or stabilize the viscosity of the compositions. This can be seen through viscosity measurements, which can be measured at ambient temperature using a viscometer (such as Brookfield DVII+Pro).

The solubility behavior of the fatty acid salts or substituted fatty acid salts in water may be of appreciable importance. Various factors determine this solubility. One such factor is the nature of the fatty acid (or substituted fatty acid) anion or carboxylate anion—its length, shape, amount of branching and so on. The larger and less polar this group is, the less soluble it is in water. The carboxylate functional group is ionic, such that relatively strong ion-dipole bonds may be formed with adjacent water molecules and relatively long carbon chain may be dissolved in aqueous solutions. Surfactants such as soaps (carboxylate soaps) may typically have from twelve to eighteen carbon atoms in the carbon chain.

Another factor is the identity of the positive ion associated with the carboxylate ion. Ammonium salts and alkali metal salts (most commonly—potassium and sodium salts) generally have sufficient solubility in water. Typically, rubidium and cesium salts behave in similar fashion to their potassium and sodium counterpart salts. The counterpart lithium salts may have lower solubility than the other alkali metal salts. Magnesium and calcium salts are generally less soluble.

It is further noted that when the fatty acid group at the end of the chain is substituted with an —$SO_3$ moiety (either sulfate or sulfonate), the polarity tends to increase substantially with respect to the fatty acid analogue. This may sufficiently increase the polar nature of the bond such that their magnesium and calcium salts may exhibit sufficient solubility. Similarly, shorter chains and unsaturated chains may also be sufficiently polar such that their magnesium and calcium salts may exhibit sufficient solubility.

The solubility behavior of the fatty acid salts or substituted fatty acid salts in water may be characterized by the HLB (hydrophilic-lipophilic balance) number, which is described in further detail hereinbelow. This solubility behavior may be further characterized by the critical micelle concentration (CMC), which is also described in further detail hereinbelow.

Although, as elaborated hereinabove, shorter fatty acid ions tend to have improved solubility in water, the inventors have discovered a tradeoff between improved solubility, on one hand, and diminished steric contribution on the other hand. Shorter backbones, particularly backbones having less than 9 (carbon) atoms, less than 8 atoms, less than 7 atoms, or less than 6 atoms, despite their improved solubility, generally contribute less to improving dispersibility, with respect to their slightly longer analogues (e.g., having 10, 12, or 14 backbone atoms).

Perhaps more significantly, the inventors have discovered DIA efficacy to be correlated with the critical micelle concentration (CMC) of the DIA. Generally speaking, the CMC is the concentration of surfactants above which micelles form, such that additional surfactant added to the system (above the CMC) is incorporated in existing, or additional, micelles. The kinetics of such incorporation, or disincorporation, may be exceedingly fast.

Various mechanisms and structures of particle dispersions are known. FIG. 1A schematically illustrates a solely electrostatic repulsion mechanism and structure. FIG. 1C schematically illustrates a solely steric hindrance mechanism and structure. FIG. 1B schematically provides a combined electrostatic and steric mechanism and structure.

In the chemical systems at hand, the inventors have found that as the DIA molecules become associated with dispersant molecules enveloping the pigment particles, the DIA molecules are essentially removed from the solution. Thus, for systems in which the DIA concentration exceeds the CMC thereof, such association causes (by Le Chatelier's principle) DIA molecules incorporated in the micelle structures to disincorporate, and become dissolved in solution, thereby replenishing DIA availability.

Perhaps more significantly, the inventors have further discovered that the CMC of the DIA, and not (or more than) the overall DIA solubility, may strongly influence DIA efficacy. Without wishing to be limited by theory, the inventors believe that low values of CMC of the DIA, while not being directly related to the DIA-dispersant interactions (i.e., the micelles play no role, or no significant role, in this process), nevertheless manifest the low stability of the DIA in the solution, and typically, further manifest the relative affinity of the DIA to associate with the dispersant, as opposed to being dissolved as a molecule in the solution.

Surprisingly, molecules having a relatively high (overall) solubility may be poor DIAs, if their CMC is also high. In this case, the molecules may have a strong tendency to remain dissolved, individually, rather than associate with the dispersant molecules.

In seeking ways to reduce or inhibit gelation of pigment dispersions, the inventors introduced different DIAs into various pre-milling pigment formulations. While some anti-gelation behavior was observed, the inventors found that there may be a steep price to pay: the amount of dispersant required to attain a given size of milled product increased (by up to 300%). Without wishing to be limited by theory, the inventors believe that the DIAs may interact with the free dispersant, such that the free dispersant is deactivated or at least partially deactivated (electrostatically and/or sterically), reducing the amount of dispersant available to cover the surface of the pigment core particles. Moreover, the inventors further believe that during the milling process, as new, "bare" surface area of the pigment particles becomes exposed, the DIAs may compete with the dispersant for sites on the surface of the pigment particles, which may deleteriously affect the overall dispersability, relative to a pigment particle surface covered exclusively by the dispersant. Consequently, a larger quantity of dispersant must be introduced in order to promote dispersant availability.

FIG. 2A schematically illustrates a first arrangement of dispersant molecules 25, 27 and DIA molecules 30, 32, 34 on a pigment core particle 20, in accordance with the inventors' findings from introducing DIAs into various pigment formulations, prior to the milling stage, substantially as described hereinabove. It may be seen that various dispersant molecules 25 may be directly associated with pigment core particle 20. While in the exemplary arrangement shown in FIG. 2A, the non-polar ends of dispersant molecules 25 are adsorbed onto outer surface 22 of pigment core particle 20, it will be appreciated that other arrangements, including chemical bonding, may be possible, depending on the nature of outer surface 22 and the dispersant molecule.

In exemplary fashion, the non-polar end of dispersant molecule 27 may be associated with a non-end section of a particular dispersant molecule 25.

As shown, a tail (i.e., non-polar) end of a DIA molecule 32 may be associated with a non-end section of a particular dispersant molecule 25, in a largely non-polar fashion. In addition, a polar end of a DIA molecule 30 may be associated with a polar end of a particular dispersant molecule 25.

Significantly, several DIA molecules 34 may be directly associated with outer surface 22 of pigment core particle 20. Such DIA molecules 34 have successfully competed with the dispersant molecules for direct association with outer surface 22.

The inventors have discovered that such interactions may appreciably detract from the efficacy and stability of the aqueous dispersion. In an attempt to overcome such deleterious phenomena, it may be required to significantly increase the concentration of the dispersant and optionally, that of the DIA molecules, in order to attain the desired pigment target size. This may result in a high concentration of micelles that are devoid of a pigment core particle.

These particle-less micelles can be of three main types: a) dispersant micelles formed solely by free dispersant molecules 26: b) mixed micelles formed by a mixture of free dispersant molecules 26 and free DIA molecules 36; and c) DIA micelles formed solely by free DIA molecules 36. Although represented in afore-described sections (a) to (c) of FIG. 2A as globular micelles, wherein the polar moiety of the molecules faces the aqueous environment, different arrangements are possible. By way of a non-limiting example, panel (d) of the figure schematically shows a segment of a bilayer arrangement that may be formed by free dispersant molecules and DIA molecules.

While (in the interest of clarity) not shown in the figure, dispersant molecules 25 associated with a particular pigment core particle 20 may further interact (e.g., polar head to polar head) with free dispersant molecules 26, which may in turn further interact with additional free molecules to form a network of molecular associations extending from the core particle. Such networks, typically resulting from an excess of dispersant molecules, may ultimately bridge between core pigment particles, eventually leading to agglomeration and sedimentation of the particles and/or gelation (due to three-dimensional network formation) of the pigment:dispersant system.

Thus, notwithstanding the improved anti-gelation behavior observed using the above-described method of pre-milling addition of DIA, the inventors have found various distinct deficiencies with this method: a large "excess" of dispersant may be required to reduce the competition with the DIA during size reduction; some DIA may interact or associate directly with the outer surface of the pigment core particle; some "free" DIA may interact with "free" dispersant molecules (for example, to form mixed micelles (b) or (d) shown in FIG. 2A) so as to reduce or destroy the affinity of the dispersant for the outer surface of the pigment core particle, and require yet further excess of the dispersant; and the absolute viscosity of the dispersion may be disadvantageously elevated, due to the excess dispersant, the presence of the DIA, and the enhanced thermodynamics for forming a three-dimensional network, etc.

In seeking further ways to reduce or inhibit gelation of pigment dispersions, or to stabilize the viscosity of such pigment dispersions, the inventors introduced different DIAs—post-milling—into various pigment formulations. In accordance with the findings from this method, FIG. 2B illustrates a second arrangement of the dispersant molecules and DIA molecules on a pigment core particle. Since, during the milling stage, no DIA molecules were present, dispersant molecules 25 were initially able to associate with substantially all sites on outer surface 22 of pigment core particle 20. Subsequently, after the DIA was introduced to the post-milling formulations, virtually all of the direct associations with the outer surface 22 of the pigment core particle 20 remain with dispersant molecules 25. Statistically, however, a minute amount of DIA molecules may possibly achieve a direct association with outer surface 22, as schematically represented by DIA molecule 34. The dispersant molecules disposed in direct or indirect association with the outer surface 22 of a pigment core particle 20, illustrated by dispersant molecules 25 and 27, are said to form a dispersant envelope 40.

Moreover, the polar functional group or section of each DIA molecule 30 may be associated with a polar end or section of a particular dispersant molecule 25. This relatively common phenomenon may result in an effective spherical shell (a 3D annulus) of protection 55—surrounding pigment core particle 20—that is slightly larger, and perhaps more densely populated than the effective annulus of protection 55 produced using the pre-milling addition method associated with FIG. 2A.

It cannot be ruled out that despite the predominance of dispersant molecules in the dispersant envelope, other molecules may also be present. By way of non-limiting example, in a dispersion comprising DIA added post-milling, it may be possible that over time, an occasional DIA molecule 34 may diffuse through dispersant envelope 40 and directly associate with outer surface 22.

Such a post-milling phenomenon may be rather limited, such that a weight ratio of dispersant molecules to hydrophobic carbon chains of the DIA salt, that are directly associated with outer surface 22, may be at least 20, at least 30, at least 50, or at least 100.

The inventors have discovered that when DIA molecules are added after the dispersion of pigment:dispersant has reached the target particle size distribution, then the requisite amount of DIA additive may be significantly reduced. Furthermore, without wishing to be bound to a particular theory, it is believed that by selecting dispersants having a relatively higher affinity towards the pigment particles than towards other molecules of the dispersants and by employing DIA molecules having a higher affinity towards the dispersant molecules, than the dispersant molecules have towards other (identical) dispersant molecules, the arrangement of FIG. 2B can be favored.

For example, those of ordinary skill in the art know that for good adsorption onto iron oxides, hydroxyl, carbonyl and/or carboxyl groups are particularly suitable functional groups.

FIG. 3 provides a graphical representation of the nominal volume-specific surface area of pigment particles, in square meters per cubic centimeter, as a function of the nominal particle size ($D_{V50}$), in nanometers. For the purpose of this illustration, the pigment particles were assumed to be perfect spheres having an identical nominal diameter $D_{V50}$. To obtain the nominal weight-specific surface area of pigment particles, the nominal volume-specific surface area may be divided by the specific gravity of the pigment particles. Information concerning pigment density is readily available in the literature, and by way of example, PR 122 has a density of about 1.2 g/cm$^3$, PY95 of about 1.4 g/cm$^3$, PV23 of about 1.45 g/cm$^3$, PR185 and PB15:3 of about 1.5 g/cm$^3$, PBk7 of about 1.8 g/cm$^3$, PG7 of about 3.3 g/cm$^3$, and PW6 of about 4.2 g/cm$^3$.

As readily understood, and easily appreciated from FIG. 3, particles having a relatively small diameter exhibit a higher specific area (surface area per unit volume or weight) and a higher nominal volume-specific surface area as compared to larger particles. As it is established that dispersants stabilize particles by surrounding them and, in part, directly associating with the particle being dispersed, smaller particles having a higher specific area therefore require a higher amount of dispersant. Besides cost considerations, increasing the amount of dispersant may also increase the viscosity of the composition and the need for further stabilizing additives, which in turn may also complicate the preparation of pigment dispersions.

EXAMPLES

Preparation of Pigments

Pigments used in the examples described below are generally supplied with initial particle size of a few micrometers. Such pigments were ground to submicron range in presence of the dispersing agent, the two materials being fed to the milling device as an aqueous mixture. Unless stated otherwise, 30 g pigment were mixed with the weight amount of dispersant satisfying the weight ratio indicated in the following examples. Deionized water was added to a balance of 200 g. This liquid slurry was size-reduced in presence of 4500 g of chrome-steel beads (Glen Mills Inc., USA) having a diameter of 0.8 mm in an Attritor HDDM-01/HD-01 by Union Process for a duration of time and at an energy input sufficient to prepare millbase comprising pigment particles having a median diameter (as analyzed per volume of particles) of 100 nm or less ($D_{V50} \leq 100$ nm). Typically, the Attritor was operated at about 3000 rpm, for at least 48 hours, the milling duration also depending on the initial particle size.

Particle size and distribution thereof in the compositions so prepared was determined using DLS methodology (Malvern Zetasizer Nano ZS). Unless otherwise stated, an aliquot was removed from the compositions being considered, and if necessary diluted in double distilled water (DDW), so as to obtain samples having a solid concentration of about 1 wt. %. The liquid samples were briefly sonicated (about 7 sec in a Sonics Vibracell VCX 750 (750 watts) at 75% of max power) ahead of DLS measurement to ensure a proper dispersion of the pigment particles during assessment of particle size and distribution. Results were analyzed based on the volume of the particles.

Once the pigment-dispersant mixture reached desired particle size, 50 g water were added to the chamber of the milling device and the resulting diluted dispersion was extracted therefrom. The beads were separated by filtration of the diluted millbase through a suitable mesh. The pigment concentration at this stage was 12 wt. %.

The DIA under study was then added to the pigment-dispersant-containing millbase and water was added as needed to yield a composition having a pigment concentration of 10 wt. %. An otherwise identical composition lacking DIA served as reference for each study. The resulting samples were stirred for five minutes with a magnetic stirrer and their stability was assessed as described below.

The pigments listed in Table 1 at the end of the specification were employed in the examples described herein.

Dispersants

The following dispersants were used as indicated.

| Name | Manufacturer | Description |
| --- | --- | --- |
| Dispex ® Ultra PX 4585 (previously EFKA ® 4585) | BASF | Acrylic block copolymer dispersing agent suited for pigment stabilization, high MW |
| Disperbyk ® 190 | BYK Chemie | High MW block copolymer with pigment affinic groups |
| Tween ® 20 | Sigma Aldrich | Non-ionic polysorbate surfactant having chemical formula $C_{58}H_{114}O_2$ |
| Triton ® X-100 | DOW Chemical Co. (CAS 9002-93-1) | Non-ionic surfactant having chemical formula $C_{14}H_{22}O(C_2H_4O)$ (n = 9 – 10) |
| NAXAF ® HSP | NEASE Performance Chemicals | Low MW Anionic surfactant. Sodium salts of alkyl naphthalene sulfonic acid condensate $(C_{10}H_8O_3S \cdot CH_2O)_x \cdot xNa$ |

Tween® 20 was reported to have an average molecular weight of about 1,227 g/mol, a CMC value in water of $8.04 \times 10^{-5}$ M/l at 21° C. and an HLB value of 16.7. Triton®

X-100 was reported to have an average molecular weight of 625 g/mol, a CMC value of $2.2\text{-}2.4\times10^{-4}$ M/l and a calculated HLB value of 13.5.

Dispersant Improving Agents

DIAs and control additives, including those used in the following examples, are listed in Table 2 at the end of the specification. Materials marked by "(1)" were purchased from Haihang Industry Co., materials marked with "(2)" were purchased from Sigma Aldrich, materials marked with "(3)" were purchased from Tokyo Chemical Industry Co. and materials marked with "(4)" were purchased from Fluka. Unmarked materials are provided for reference. All tested materials were supplied at a purity grade of at least about 90%.

Viscosity Measurements

The viscosity of the pigment dispersions (with or without DIA) was measured using a Brookfield Viscometer DV II+ Pro and a spindle 18. The results were expressed in centipoise or mPa·s (1 cP=1 mPa·s). The viscometer was typically operated at a speed (rpm) that was inversely proportional to the viscosity of the liquid to be assessed, as known to persons skilled in the operation of such measuring equipment. Viscosity measurements were performed on samples having reached room temperature (circa 24° C.), even if previously incubated for the sake of the experiments at a different temperature.

In cases in which samples underwent gelation, preventing any actual measurement, the viscosity was arbitrarily set to be 10,000 mPa·s, for simplicity of calculation or comparison.

Preparation, Storage and Testing of Viscosity of Pigment Dispersions

As noted, the samples were prepared by diluting in water the millbase containing dispersed pigment and, where applicable, the DIA, so that the mixture contained 10 wt. % pigment. In cases where a DIA was also included, it was included at the indicated amount as a percentage of the weight of the pigment.

After manually mixing the samples, the viscosity was measured to establish baseline values. Samples were then stored, either at room temperature (R.T. ~23° C.) or at an elevated temperature of 60° C. or 70° C., in a fan convection oven (Carbolite, PF200), and the viscosity measured on the days indicated following incubation at the temperature indicated in the respective examples. Samples not containing DIA, but containing same amounts and proportions of pigments and dispersants, were used as references (Ref.).

Example 1—Magenta

Pigment (10 wt. %): Novoperm ® Red HF4C (Pigment Red 185)
Dispersant: Dispex ® Ultra PX 4585
Ratio pigment/dispersant by weight: 1:0.5

| | | Measured viscosity (mPa · s) | | | | | |
|---|---|---|---|---|---|---|---|
| Days after formation | | 0 | 1 | 2 | 6 | 14 | 36 |
| Temperature, ° C. | | R.T. | R.T. | R.T. | R.T. | R.T. | R.T. |
| % DIA | Ref. | 15.0 | 19.5 | 18.0 | 23.3 | 28.0 | 44.0 |
| Sodium Oleate | 2% | 13.6 | 16.0 | 16.0 | 18.8 | 22.0 | 28.4 |
| | 4% | 13.2 | 16.0 | 14.5 | 19.1 | 21.5 | 26.3 |
| | 7% | 14.5 | 17.2 | 16.0 | 20.9 | 25.0 | 27.1 |
| | 10% | 15.0 | 20.6 | 18.0 | 23.5 | 28.2 | 33.9 |
| | 15% | 15.6 | 26.6 | 22.0 | 28.0 | 32.7 | 33.8 |

-continued

Pigment (10 wt. %): Novoperm ® Red HF4C (Pigment Red 185)
Dispersant: Dispex ® Ultra PX 4585
Ratio pigment/dispersant by weight: 1:0.5

| | | Measured viscosity (mPa · s) | | | | | |
|---|---|---|---|---|---|---|---|
| Days after formation | | 0 | 1 | 2 | 6 | 14 | 36 |
| Temperature, ° C. | | R.T. | R.T. | R.T. | R.T. | R.T. | R.T. |
| Sodium Octanoate | 2% | 14.5 | 22.4 | 24.0 | 24.5 | 29.5 | 41.3 |
| | 4% | 14.6 | 22.6 | 21.5 | 27.0 | 29.0 | 36.0 |
| | 7% | 14.5 | 25.1 | 33.5 | 25.0 | 27.2 | 35.3 |
| | 10% | 15.1 | 24.0 | 31.0 | 25.5 | 27.9 | 38.0 |
| | 15% | 14.4 | 26.1 | 34.4 | 28.5 | 29.0 | 27.0 |
| Sodium Dodecyl Sulfate | 2% | 14.8 | 16.6 | 18.6 | 20.0 | 24.5 | 39.0 |
| | 4% | 15.0 | 16.8 | 17.7 | 21.0 | 22.0 | 33.3 |
| | 7% | 15.2 | 18.0 | 19.8 | 23.5 | 23.0 | 32.6 |
| | 10% | 15.5 | 18.3 | 19.2 | 25.0 | 24.5 | 38.0 |
| | 15% | 16.4 | 24.0 | 35.1 | 33.4 | 35.5 | 50.0 |
| Sodium Dodecyl Benzene Sulfonate | 2% | 15.4 | 20.1 | 21.9 | 23.0 | 29.0 | 39.5 |
| | 4% | 15.6 | 21.6 | 19.9 | 25.5 | 28.5 | 38.5 |
| | 7% | 16.5 | 27.2 | 27.0 | 28.7 | 30.0 | 42.1 |
| | 10% | 19.2 | 37.6 | 36.3 | 37.0 | 38.0 | 40.0 |
| | 15% | 22.5 | 56.0 | 58.1 | 44.0 | 49.0 | 52.0 |
| Sodium Dodecanoate | 2% | 14.1 | 15.8 | 27.2 | 19.1 | 19.0 | 19.0 |
| | 4% | 13.8 | 15.0 | 23.6 | 18.1 | 17.0 | 16.7 |
| | 7% | 13.4 | 15.5 | 15.6 | 18.0 | 18.6 | 17.2 |
| | 10% | 14.0 | 16.8 | 16.3 | 18.2 | 19.3 | 18.1 |
| | 15% | 15.7 | 19.5 | 19.5 | 21.0 | 22.0 | 21.2 |

Figure 4:
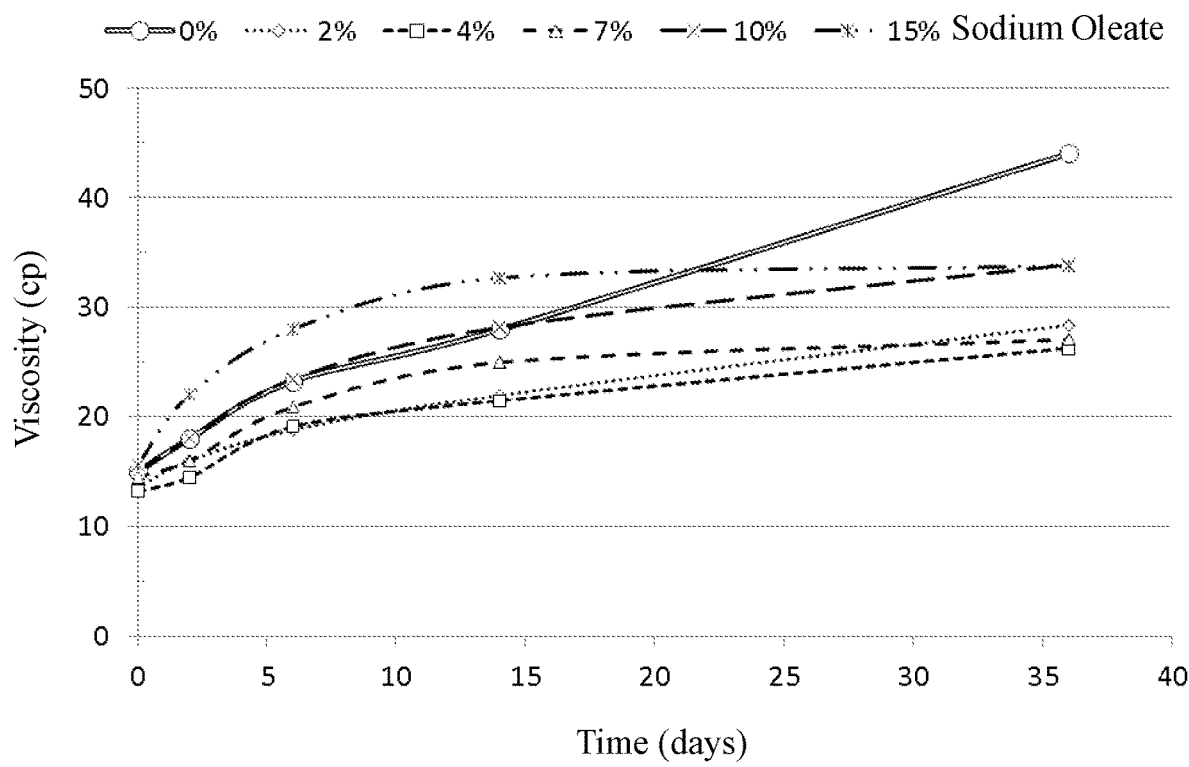
FIG. 4 shows a plot of viscosity (mPa·s) as a function of time (days) for dispersions of an exemplary pigment:dispersant combination having different concentrations of the same DIA.

Viscosity results obtained with various concentrations of sodium oleate in the pigment:dispersant system of the present example following incubation at ambient temperature are shown in FIG. 4. For clarity of illustration, not all time points were plotted on the graph. As can be seen, while the viscosity of all samples increased with time, the rate of such increase was more pronounced for the reference dispersion lacking the DIA than for the DIA-containing samples. The delayed or reduced increase in viscosity over time provided by sodium oleate in the illustrated example depends upon the concentration of the DIA. Such dependence, however, is not necessarily linear; 2%, 4% and 7% DIA per weight of pigment appear to be sufficient and possibly preferable to 10% and 15% DIA over the time period of the present study. For clarity of illustration, in this and the following figures, the effect of a given DIA on the dispersion under discussion is provided at a single concentration found to provide among the best outcomes in the set of concentrations tested. As illustrated in FIG. 1, such a selection (in the case of FIG. 4 is 4% DIA per weight of pigment) does not mean that other concentrations are not similarly efficient or suitable.

| | | Measured viscosity (mPa · s) | | | | | |
|---|---|---|---|---|---|---|---|
| Days after formation | | 0 | 1 | 2 | 6 | 14 | 36 |
| Temperature, ° C. | | R.T. | 60 | 60 | 60 | 60 | 60 |
| % DIA | Ref. | 15.0 | 58.0 | 36.0 | 42.0 | 38.0 | 42.0 |
| Sodium Oleate | 2% | 13.6 | 49.0 | 55.0 | 35.4 | 27.0 | 27.0 |
| | 4% | 13.2 | 37.3 | 43.0 | 29.5 | 25.0 | 25.0 |
| | 7% | 14.5 | 38.6 | 44.0 | 39.5 | 29.0 | 24.6 |
| | 10% | 15.0 | 38.4 | 47.0 | 39.0 | 35.0 | 35.0 |
| | 15% | 15.6 | 43.5 | 53.0 | 50.0 | 43.0 | 38.0 |
| Sodium Octanoate | 2% | 14.5 | 45.0 | 42.0 | 44.0 | 43.0 | 40.0 |
| | 4% | 14.6 | 38.0 | 38.0 | 38.3 | 36.0 | 36.7 |
| | 7% | 14.5 | 39.5 | 31.0 | 41.0 | 36.0 | 46.0 |
| | 10% | 15.1 | 35.3 | 75.3 | 43.5 | 36.0 | 33.8 |
| | 15% | 14.4 | 32.0 | 68.0 | 37.0 | 33.0 | 33.4 |

-continued

| | | Measured viscosity (mPa · s) | | | | | |
|---|---|---|---|---|---|---|---|
| Days after formation | | 0 | 1 | 2 | 6 | 14 | 36 |
| Temperature, ° C. | | R.T. | 60 | 60 | 60 | 60 | 60 |
| Sodium | 2% | 14.8 | 43.4 | 42.0 | 34.0 | 23.0 | 26.3 |
| Dodecyl | 4% | 15.0 | 41.0 | 35.0 | 24.5 | 21.0 | 23.7 |
| Sulfate | 7% | 15.2 | 35.0 | 33.0 | 23.5 | 19.0 | 23.5 |
| | 10% | 15.5 | 36.0 | 31.0 | 26.5 | 24.0 | 29.0 |
| | 15% | 16.4 | 37.0 | 33.0 | 36.0 | 35.0 | 38.0 |
| Sodium | 2% | 15.4 | 43.0 | 49.0 | 39.0 | 38.0 | 38.4 |
| Dodecyl | 4% | 15.6 | 42.0 | 43.0 | 36.0 | 35.0 | 40.0 |
| Benzene | 7% | 16.5 | 44.0 | 51.0 | 44.0 | 42.0 | 42.0 |
| Sulfonate | 10% | 19.2 | 46.0 | 44.9 | 47.0 | 42.0 | 49.0 |
| | 15% | 22.5 | 53.0 | 59.0 | 49.0 | 45.0 | 43.5 |
| Sodium | 2% | 14.1 | 40.0 | 48.0 | 34.0 | 21.0 | 22.0 |
| Dodecanoate | 4% | 13.8 | 32.0 | 34.0 | 22.8 | 15.4 | 14.5 |
| | 7% | 13.4 | 27.7 | 24.0 | 17.7 | 13.4 | 14.5 |
| | 10% | 14.0 | 25.3 | 21.0 | 16.9 | 13.7 | 13.5 |
| | 15% | 15.7 | 24.5 | 22.2 | 18.0 | 16.4 | 17.5 |

The above table corresponds to the previous one in this example, the samples having being incubated at 60° C. instead of ambient temperature. As expected, such conditions were more demanding for the dispersions, accelerating and/or accentuating previous observations. In subsequent examples presented below, some results may be provided solely for these more extreme temperature conditions.

Without wishing to be bound by any particular theory, the inventors believe that at such elevated temperatures, the three-dimensional gel network may be at least partially decomposed/dismantled, which allows the DIA molecules access to the dispersant molecules in the dispersant envelope surrounding the pigment core particle. The DIA molecules associate with these dispersant molecules, and inhibit the three-dimensional gel network from reforming as the aqueous dispersion cools back down to room temperature.

It should be noted that the samples containing sodium dodecyl benzene sulfonate were further tested after six months of incubation at 60° C. and found to have a viscosity after this extensive period of time of only 44 mPa·s (at 7% DIA per pigment weight). These results show that this DIA, seemingly less efficient than the alternatives tested in the present study over the first month of measurements, was nevertheless very potent in the long run. The viscosity of the reference could not be measured at this later time point, but based on extrapolation of existing results and assuming a linear progression was estimated to be at least about 80 mPa·s under same storage conditions.

In the next table, a different set of DIAs was tested at various concentrations with the same pigment:dispersant combination used in the previous two tables in this Example, but the viscosity measurements were collected at time points differing from the previous series.

| | | Measured viscosity (mPa · s) | | | | | | |
|---|---|---|---|---|---|---|---|---|
| Days after formation | | 0 | 1 | 2 | 13 | 20 | 26 | 41 |
| Temperature, ° C. | | R.T. | 60 | 60 | 60 | 60 | 60 | 60 |
| | Ref. | 14.5 | 81.5 | 74.0 | 30.0 | 52.0 | 42.0 | 40.9 |
| % DIA | | | | | | | | |
| Potassium | 2% | 14.7 | 70.0 | 69.0 | 21.0 | 19.2 | 16.9 | NA |
| Myristate | 4% | 14.3 | 58.0 | 52.0 | 19.3 | 16.0 | 14.1 | NA |
| | 7% | 15.3 | 46.0 | 43.0 | 19.0 | 16.2 | 13.9 | NA |
| | 10% | 16.2 | 45.0 | 44.0 | 20.0 | 17.0 | 18.0 | NA |
| | 15% | 16.0 | 50.0 | 51.0 | 23.9 | 45.0 | 49.0 | NA |

-continued

| | | Measured viscosity (mPa · s) | | | | | | |
|---|---|---|---|---|---|---|---|---|
| Days after formation | | 0 | 1 | 2 | 13 | 20 | 26 | 41 |
| Temperature, ° C. | | R.T. | 60 | 60 | 60 | 60 | 60 | 60 |
| Potassium | 2% | 13.9 | 70.0 | 66.0 | 28.0 | 26.4 | 25.0 | NA |
| Oleate | 4% | 14.0 | 60.0 | 58.0 | 23.0 | 21.8 | 19.5 | NA |
| | 7% | 15.2 | 55.0 | 56.0 | 26.0 | 26.0 | 30.2 | NA |
| | 10% | 15.1 | 52.0 | 62.0 | 29.0 | 30.3 | 28.0 | NA |
| | 15% | 16.4 | 55.0 | 59.0 | 35.0 | 43.0 | 44.0 | NA |
| Potassium | 2% | 13.8 | 58.0 | 57.0 | 22.0 | 20.8 | 19.5 | 17.3 |
| Dodecanoate | 4% | 13.5 | 49.0 | 45.0 | 19.8 | 15.8 | 14.1 | 13.5 |
| | 7% | 14.6 | 42.0 | 39.0 | 17.0 | 13.7 | 12.5 | 12.3 |
| | 10% | 14.0 | 37.0 | 30.0 | 17.0 | 17.0 | 16.0 | 15.0 |
| | 15% | 15.1 | 37.0 | 27.0 | 19.0 | 18.1 | 16.5 | 17.3 |

Figure 5:
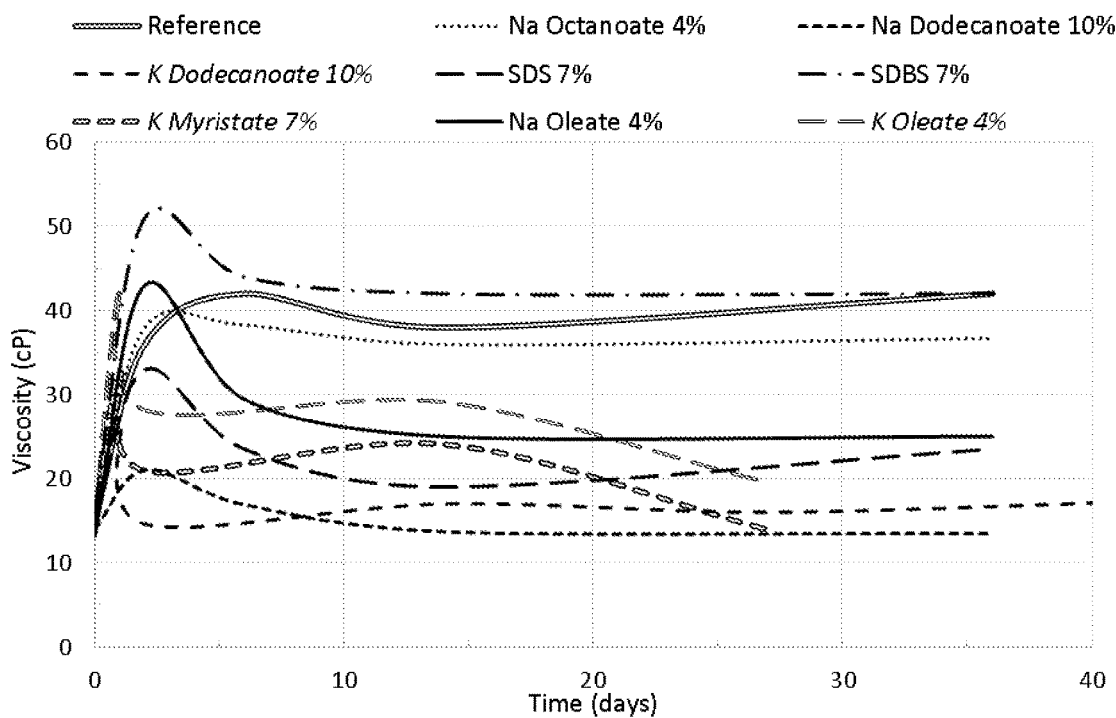
FIG. 5 shows a plot of viscosity (mPa·s) as a function of time (days) for dispersions of an exemplary pigment:dispersant combination having different DIAs.

Viscosity results obtained in the pigment:dispersant system of the present example when combined with various DIAs following incubation at 60° C. are shown in FIG. 5; for each DIA, a representative concentration was chosen. For clarity of illustration, not all time points were plotted on the graph and the results displayed in the preceding tables were in some cases normalized to the penultimate reference values; such results, indicated by a legend in italics, are therefore plotted for illustrative purposes only.

As can be seen, while the viscosity of most samples increased with time, the different DIAs, each at its respective concentration, reduced or delayed such increase in viscosity as compared to the reference dispersion lacking the DIA. While in a first period the viscosity often displayed a transient peak, the behavior of the viscosity following such initial phase of each dispersion can generally be viewed as substantially linear. If arbitrarily considering the period spanning from about the tenth day on, it can be seen that while the viscosity of the reference steadily increased, the samples containing the various DIAs remained relatively stable, their viscosity over a period of thirty days varying by less than 20%. In the present example, considering the post-aging period of the dispersion including sodium dodecanoate, it appears that over the duration of this study, this DIA substantially prevented the increase in viscosity displayed by the reference lacking any DIA.

Example 2—Magenta

Pigment (10 wt. %): Toner Magenta E02 (Pigment Red 122)
Dispersant: Dispex ® Ultra PX 4585
Ratio pigment/dispersant by weight: 1:0.5

| | | Measured viscosity (mPa · s) | | | | | | |
|---|---|---|---|---|---|---|---|---|
| Days after formation | | 0 | 1 | 6 | 28 | 1 | 6 | 28 |
| Temperature, ° C. | | R.T. | R.T. | R.T. | R.T. | 60 | 60 | 60 |
| | Ref. | 6.87 | 6.33 | 70 | 6.27 | 92.0 | 6.00 | Gel |
| % DIA | | | | | | | | |
| Sodium | 2% | 6.69 | 6.30 | 30.0 | 6.18 | 58.0 | 5.64 | 114 |
| Dodecanoate | 4% | 6.78 | 6.18 | 6.96 | 6.06 | 14.2 | 5.61 | 45.0 |
| | 7% | 6.90 | 6.36 | 5.88 | 6.24 | 7.17 | 5.79 | 19.2 |
| | 10% | 7.20 | 6.60 | 5.88 | 6.39 | 6.51 | 6.01 | 13.7 |
| | 15% | 7.62 | 7.05 | 6.12 | 6.87 | 6.81 | 6.36 | 14.1 |

Figure 6:
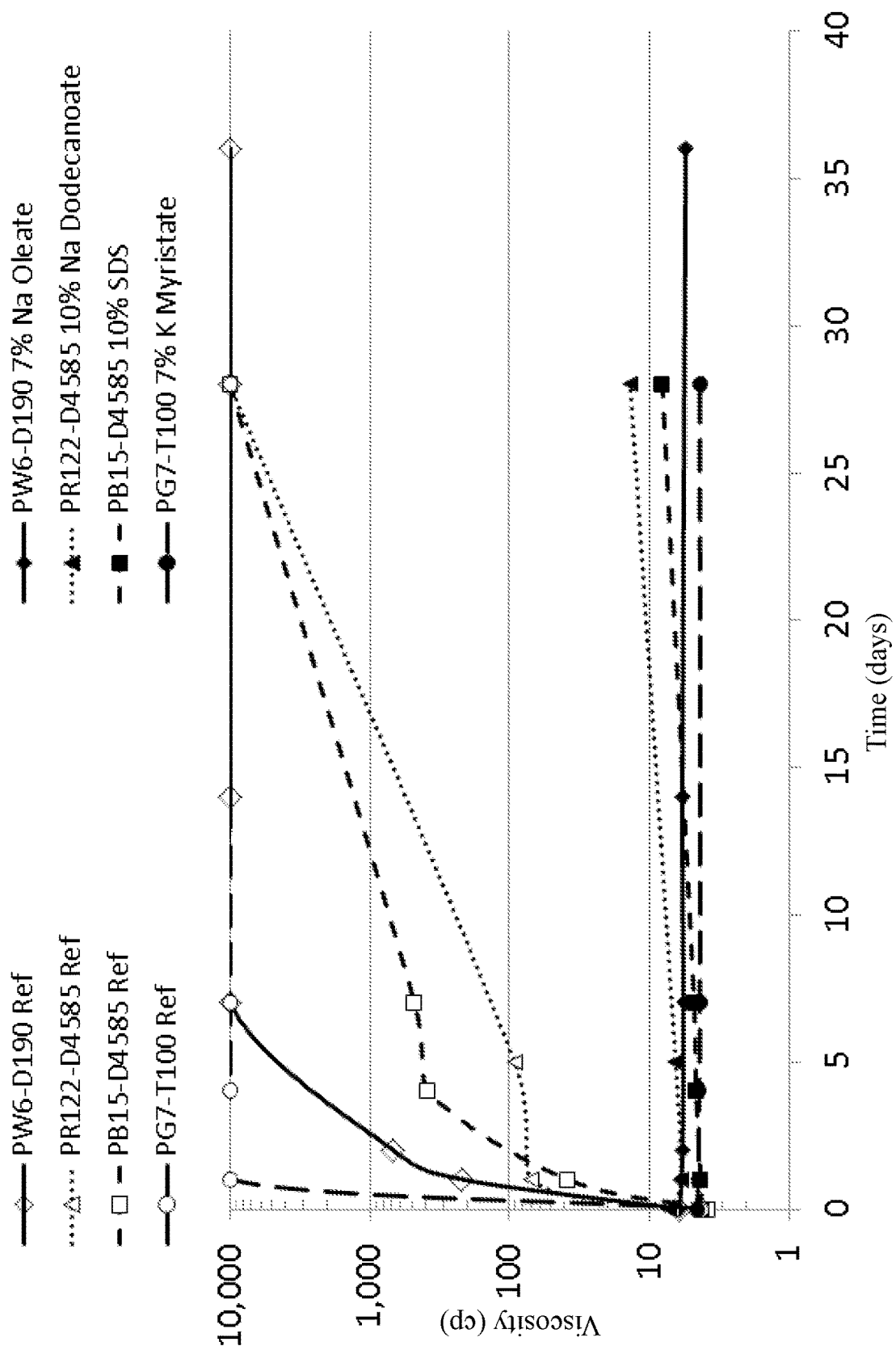
FIG. 6 shows a plot of viscosity (mPa·s) as a function of time (days) for dispersions having different DIAs with different exemplary pigment:dispersant combinations.

As can be seen from the above table, while the reference displayed a dramatic increase in viscosity resulting in gelation of the initial dispersion in about twenty-eight days at 60° C., sodium dodecanoate significantly reduced such effect at all concentrations tested. Considering for simplicity the results displayed for 10% sodium dodecanoate by weight of Pigment Red 122, it can be observed that this DIA succeeded to maintain a viscosity which, over the duration of the study, did not exceed about 14 mPa·s, which is at least two or even three orders of magnitude below reference values. FIG. 6 shows the viscosity plotted over time in a semi-logarithmic fashion for several samples, including the dispersion listed in the preceding table containing 10% sodium dodecanoate with (black triangles) as compared to a reference lacking it (white triangles). The plot in FIG. 6 also illustrates that a DIA or a DIA-Dispersant combination can be used for a variety of pigments.

Example 3—White

While in previous examples, the pigment particles were present in the tested dispersions at a concentration of 10 wt. %, in this example the concentration was raised to 50 wt. %. Such elevated concentration can be of relevance for concentrated coloring compositions being diluted ahead of use, by way of example for concentrated inks, and for compositions wherein the pigment is efficient at such concentrations. For instance, white pigment can be used in inks at concentrations of up to about 40 wt. %, for example if desired for opacity on transparent printing substrates.

Pigment (50 wt. %): Kronos ® 2310 (Pigment White 6 - TiO$_2$)
Dispersant: Disperbyk ® 190
Ratio pigment/dispersant by weight: 1:0.05

| | | Measured viscosity (mPa · s) | | | | | |
|---|---|---|---|---|---|---|---|
| Days after formation | | 0 | 1 | 2 | 7 | 14 | 36 |
| Temperature, ° C. | | R.T. | 60 | 60 | 60 | 60 | 60 |
| % DIA | Ref. | 6.06 | 220 | 680 | O.R. | O.R. | O.R. |
| Sodium | 2% | 6.06 | 85.0 | 490 | O.R. | O.R. | O.R. |
| Oleate | 4% | 6.06 | 6.27 | 7.19 | 11.6 | 21.0 | 122 |
| | 7% | 6.06 | 5.91 | 5.79 | 5.70 | 5.82 | 5.50 |
| | 10% | 6.06 | 7.50 | 7.38 | 7.20 | 7.26 | 7.35 |
| | 15% | 6.06 | 13.2 | 13.1 | 13.6 | 13.8 | 13.7 |
| | 20% | 6.06 | 25.0 | 26.1 | 80.0 | 42.0 | 49.0 |
| Potassium | 2% | 6.06 | 295 | 2750 | O.R. | O.R. | O.R. |
| Oleate | 4% | 6.06 | 6.66 | 8.07 | 27.8 | 51.0 | 280 |
| | 7% | 6.06 | 6.05 | 5.85 | 5.81 | 5.61 | 5.94 |
| | 10% | 6.06 | 7.60 | 7.41 | 7.10 | 7.20 | 7.08 |
| | 15% | 6.06 | 18.2 | 18.3 | 21.1 | 19.0 | 17.4 |
| | 20% | 6.06 | 39.0 | 57.0 | 98.2 | 90.0 | 124 |

O.R. = out of range, i.e. above 10,000 mPa · s using present measuring equipment.

As can be seen from the above table, while the reference displayed a dramatic increase in viscosity resulting in gelation of the initial dispersion in at most a week at 60° C., the two DIAs of the present study significantly prevented such deleterious effect at most concentrations tested. Considering for simplicity the results displayed by 5% sodium oleate and 7% potassium oleate, by weight of Pigment White 6, it can be observed that both succeeded to maintain a relatively stable viscosity over at least thirty-six days. Their viscosities, which over the duration of the study did not exceed about 6 mPa·s, is at least three orders of magnitude below reference values. FIG. 6, in which the viscosity is plotted over time in a semi-logarithmic fashion, illustrates graphically the behavior of a dispersion containing 7% sodium oleate (black diamonds) as compared to a reference lacking it (white diamonds). This example also illustrates that different salts of the same fatty acid can be used.

Example 4—Cyan

Pigment (10 wt. %): Heliogen ® Blue D7079 (Pigment Blue 15:3)
Dispersant: Dispex ® Ultra PX 4585
Ratio pigment/dispersant by weight: 1:0.6

| | | Measured viscosity (mPa · s) | | | | | |
|---|---|---|---|---|---|---|---|
| Days after formation | | 0 | 7 | 1 | 4 | 7 | 27 |
| Temperature, ° C. | | R.T. | R.T | 60 | 60 | 60 | 60 |
| % DIA | Ref. | 3.81 | 3.66 | 39 | 385 | 480 | Gel |
| Sodium | 2% | 3.90 | 3.87 | 4.60 | 13.1 | 200 | 2500 |
| Oleate | 4% | 3.93 | 3.96 | 4.23 | 5.73 | 9.51 | 1060 |
| | 7% | 4.02 | 4.08 | 4.30 | 4.71 | 5.43 | 130 |
| | 10% | 4.20 | 4.20 | 4.35 | 4.65 | 5.01 | 28 |
| | 15% | 4.95 | 4.44 | 4.56 | 4.65 | 4.86 | 16.4 |
| Sodium | 2% | 3.90 | 3.84 | 4.38 | 8.58 | 20.8 | 990 |
| Dodecyl | 4% | 4.01 | 3.90 | 4.26 | 5.34 | 6.69 | 150 |
| Sulfate | 7% | 4.02 | 4.05 | 4.20 | 4.80 | 5.10 | 10.5 |
| | 10% | 4.26 | 4.14 | 4.30 | 4.65 | 4.80 | 8.1 |
| | 15% | 4.38 | 4.41 | 4.62 | 4.80 | 5.01 | 7.02 |
| Sodium | 2% | 3.87 | 3.90 | 4.50 | 8.60 | 21.7 | Gel |
| Dodecanoate | 4% | 4.01 | 3.84 | 4.11 | 5.43 | 7.05 | 205 |
| | 7% | 4.17 | 4.02 | 4.14 | 4.59 | 5.19 | 14.1 |
| | 10% | 4.23 | 4.17 | 4.30 | 4.62 | 4.89 | 8.6 |
| | 15% | 4.60 | 4.50 | 4.47 | 4.86 | 4.95 | 6.5 |

As can be seen from the above table, while the reference displayed a dramatic increase in viscosity resulting in gelation of the initial dispersion in about twenty-seven days at 60° C., the three DIAs tested in the present study significantly reduced such effect at most concentrations tested. Considering for simplicity the results displayed by 15% sodium oleate, 10% sodium dodecyl sulfate and 15% sodium dodecanoate, by weight of Pigment Blue 15:3, it can be observed that all three DIAs succeeded to maintain a viscosity which over the duration of the study did not exceed about 16 mPa·s, being even below about 10 mPa·s for a few concentrations of SDS and sodium dodecanoate. Such results are at least two or even three orders of magnitude below reference values. FIG. 6 includes a plot showing the behavior of the dispersion including 10% SDS (black squares) as compared to a reference lacking it (white squares).

Example 5—Cyan

Pigment (10 wt. %): Heliogen ® Blue D7079 (Pigment Blue 15:3)
Dispersant: Disperbyk ® 190
Ratio pigment/dispersant by weight: 1:0.4

| | | Measured Viscosity (mPa · s) | | | | |
|---|---|---|---|---|---|---|
| Days after formation | | 0 | 1 | 2 | 5 | 33 |
| Temperature, ° C. | | R.T. | 60 | 60 | 60 | 60 |
| % DIA | Ref. | 7.23 | 50 | 40 | 40 | 45 |
| Sodium | 2% | 7.50 | 7.62 | 6.90 | 6.12 | 7.02 |
| Oleate | 4% | 7.86 | 5.43 | 5.07 | 4.26 | 4.35 |
| | 7% | 8.10 | 4.35 | 4.11 | 3.60 | 3.72 |
| | 10% | 8.46 | 3.75 | 3.57 | 3.54 | 3.96 |
| | 15% | 9.00 | 3.51 | 3.39 | 3.33 | 4.11 |
| | 20% | 8.34 | 3.45 | 3.30 | 3.36 | 3.87 |

-continued

Pigment (10 wt. %): Heliogen ® Blue D7079 (Pigment Blue 15:3)
Dispersant: Disperbyk ® 190
Ratio pigment/dispersant by weight: 1:0.4

| | | Measured Viscosity (mPa · s) | | | | |
|---|---|---|---|---|---|---|
| Days after formation | | 0 | 1 | 2 | 5 | 33 |
| Temperature, ° C. | | R.T. | 60 | 60 | 60 | 60 |
| Sodium | 2% | 7.59 | 5.91 | 5.13 | 4.35 | 4.01 |
| Dodecyl | 4% | 7.77 | 4.29 | 3.81 | 3.36 | 3.21 |
| Sulfate | 7% | 7.92 | 3.57 | 3.30 | 3.01 | 3.06 |
| | 10% | 8.01 | 3.42 | 3.18 | 2.88 | 3.12 |
| | 15% | 7.68 | 3.18 | 3.09 | 2.88 | 3.09 |
| | 20% | 7.56 | 3.24 | 3.09 | 2.91 | 3.30 |
| Sodium | 2% | 7.26 | 8.40 | 7.50 | 6.45 | 8.20 |
| Dodecanoate | 4% | 7.26 | 5.73 | 5.22 | 4.50 | 4.35 |
| | 7% | 7.59 | 4.65 | 4.11 | 3.51 | 3.45 |
| | 10% | 7.68 | 3.96 | 3.70 | 3.18 | 3.18 |
| | 15% | 7.98 | 3.60 | 3.45 | 3.06 | 3.30 |
| | 20% | 8.04 | 3.57 | 3.39 | 3.09 | 3.45 |

As can be seen from the above table, inclusion of the DIA in the compositions tested in the present study resulted in a relatively stable viscosity which over the thirty-three days duration of the study did not exceed about 8 mPa·s, while the samples were incubated at 60° C. This example further illustrates that a DIA or a DIA-Dispersant combination can be used for a variety of pigments.

The size distribution of the pigment particles following milling was assessed by DLS. The millbase dispersion was found to have a $D_{V10}$ of 32.4 nm, a $D_{V50}$ of 51.8 nm, and a $D_{V90}$ of 89.0 nm.

Example 6—Black

Pigment (10 wt. %): Mogul L (Pigment Black 7)
Dispersant: Dispex ® Ultra PX 4585
Ratio pigment/dispersant by weight: 1:0.5

| | | Measured Viscosity (mPa · s) | | | | |
|---|---|---|---|---|---|---|
| Days after formation | | 0 | 2 | 6 | 14 | 36 |
| Temperature, ° C. | | R.T. | 60 | 60 | 60 | 60 |
| | Ref. % DIA | 2.61 | 23.9 | 49 | 125 | 520 |
| Sodium | 2% | 2.70 | 5.97 | 17.2 | 60 | 500 |
| Oleate | 4% | 2.73 | 3.78 | 7.11 | 20.5 | 42.0 |
| | 7% | 2.76 | 3.09 | 3.99 | 6.84 | 36.0 |
| | 10% | 2.85 | 3.24 | 3.42 | 5.79 | 18.5 |
| | 15% | 2.97 | 3.33 | 3.45 | 4.80 | 8.30 |
| | 20% | 3.10 | 3.78 | 3.90 | 5.01 | 7.10 |
| Sodium | 2% | 2.70 | 5.34 | 15.3 | 44.5 | 250 |
| Dodecyl | 4% | 2.67 | 3.90 | 8.31 | 23.5 | 78.0 |
| Sulfate | 7% | 2.76 | 3.39 | 5.70 | 14.5 | 45.0 |
| | 10% | 2.76 | 3.51 | 5.73 | 13.5 | 44.0 |
| | 15% | 2.85 | 3.66 | 5.85 | 11.2 | 28.0 |
| | 20% | 3.03 | 3.90 | 6.21 | 12.0 | 29.0 |
| Sodium | 2% | 2.64 | 5.28 | 10.3 | 25.3 | 210 |
| Dodecanoate | 4% | 2.61 | 3.42 | 4.41 | 6.72 | 43.0 |
| | 7% | 2.73 | 2.91 | 3.30 | 4.17 | 11.2 |
| | 10% | 2.76 | 2.88 | 3.18 | 4.14 | 10.5 |
| | 15% | 2.91 | 3.03 | 3.39 | 4.05 | 8.15 |
| | 20% | 3.15 | 3.15 | 3.51 | 4.35 | 8.01 |

As can be seen from the above table, inclusion of the DIAs in the compositions tested in the present study resulted in a relatively stable viscosity which over the thirty-six days' duration of the study did not exceed about 30 mPa·s. In the case of sodium oleate and sodium dodecanoate at 20% of Pigment Black weight in which the samples were incubated at 60° C., the viscosity of the compositions did not exceed about 8 mPa·s. This example further illustrates that a DIA or a DIA-Dispersant combination can be used for a variety of pigments.

Example 7—Black

Pigment (10 wt. %): Monarch 900 (Pigment Black 7)
Dispersant: Dispex ® Ultra PX 4585
Ratio pigment/dispersant by weight: 1:0.6

| | | Measured viscosity (mPa · s) | | | | |
|---|---|---|---|---|---|---|
| Days after formation | | 0 | 6 | 1 | 6 | 12 |
| Temperature, ° C. | | R.T. | R.T | 60 | 60 | 60 |
| | Ref % DIA | 1.90 | 1.86 | 3.84 | 25 | 145 |
| Sodium Oleate | 2% | 1.95 | 3.87 | | 4.23 | 60.0 |
| | 4% | 1.98 | 3.96 | | 2.55 | 27.0 |
| | 7% | 2.10 | 4.08 | 2.13 | 2.40 | 5.16 |
| | 10% | 2.10 | 4.20 | | 2.67 | 30.3 |
| | 15% | 2.22 | 4.44 | 2.19 | 2.64 | 3.30 |
| Sodium | 2% | 1.98 | 3.84 | | 2.64 | 4.56 |
| Dodecyl | 4% | 1.95 | 3.90 | | 2.19 | 3.03 |
| Sulfate | 7% | 2.07 | 4.05 | 1.98 | 2.16 | 2.52 |
| | 10% | 2.13 | 4.14 | | 2.1 | 2.52 |
| | 15% | 2.28 | 4.41 | 2.10 | 2.16 | 2.43 |
| Sodium | 2% | 1.89 | 3.90 | | 2.91 | 23.5 |
| Dodecanoate | 4% | 1.95 | 3.84 | | 2.25 | 5.34 |
| | 7% | 2.07 | 4.02 | 1.98 | 2.04 | 2.75 |
| | 10% | 2.16 | 4.17 | | 2.07 | 2.46 |
| | 15% | 2.31 | 4.50 | 2.13 | 2.16 | 2.52 |

As can be seen from the above table, inclusion of DIA in the compositions tested in the present study resulted a relatively stable viscosity which over the twelve days' duration of the study with incubation at 60° C. did not exceed about 3 mPa·s. This example further illustrates that a DIA or a DIA-Dispersant combination can be used for a variety of pigments.

Example 8—Green

Pigment (10 wt. %): Heliogen Green D8730 (Pigment Green 7)
Dispersant: Triton ® X-100
Ratio pigment/dispersant by weight: 1:0.5

| | | Measured viscosity (mPa · s) | | | | |
|---|---|---|---|---|---|---|
| Days after formation | | 0 | 1 | 4 | 7 | 25 |
| Temperature, ° C. | | R.T. | 60 | 60 | 60 | 60 |
| Reference | | 4.26 | Gel | Gel | Gel | Gel |
| Potassium | 2% | 4.38 | 5.40 | 7.32 | 9.80 | 15.5 |
| Myristate | 4% | 4.44 | 4.47 | 4.53 | 4.65 | 5.04 |
| | 7% | 4.59 | 4.47 | 4.41 | 4.35 | 4.35 |
| | 10% | 4.62 | 4.44 | 4.41 | 4.29 | 4.27 |
| | 15% | 4.80 | 4.5 | 4.47 | 4.41 | 4.40 |
| | 20% | 4.89 | 4.71 | 4.56 | 4.53 | 4.53 |

As can be seen from the above table, the pigment-dispersant combination lacking the DIA readily underwent gelation within at most one day at 60° C. Inclusion of potassium myristate drastically reduced or prevented such deleterious phenomena at all concentrations tested, most compositions having a viscosity which over the twenty-five days' duration of the study did not exceed about 5 mPa·s. FIG. 6 includes a plot of the behavior of the dispersion including 7% potassium myristate (black circles) as compared to a reference lacking it (white circles). This example further illustrates that a DIA or a DIA-Dispersant combination can be used for a variety of pigment %.

In the following series, the non-ionic fatty acid DIA of previous series (i.e. potassium myristate, having a HLB of about 22 as calculated by the method of Davies) was replaced by a non-fatty acid non-ionic surfactant. The surfactant selected for comparison of efficiency using the same pigment-dispersant combination was an ethoxylated acetylenic diol, namely Surfynol® 465 (supplied by Evonik with a reported HLB of 13).

|  |  | Measured Viscosity (mPa · s) | | | |
|---|---|---|---|---|---|
| Days after formation | | 0 | 1 | 2 | 26 |
| Temperature, ° C. | | R.T. | 60 | 60 | 60 |
| Reference | | 3.48 | Gel | Gel | Gel |
| Surfynol® | 2% | 3.60 | Gel | Gel | Gel |
| 465 | 4% | 3.54 | Gel | Gel | Gel |
|  | 7% | 3.60 | Gel | Gel | Gel |
|  | 10% | 3.57 | Gel | Gel | Gel |
|  | 15% | 3.69 | Gel | Gel | Gel |
|  | 20% | 3.87 | Gel | Gel | Gel |

As can be seen from the above table, and as previously observed, the pigment-dispersant combination lacking the DIA readily underwent gelation within at most one day at 60° C. However, in clear contrast with the first series, where addition of potassium myristate to the Triton® X-100 dispersed green pigment drastically reduced or even prevented such dramatic viscosity increase, the non-fatty acid control surfactant failed to achieve any detectable effect.

The size distribution of the pigment particles following milling was assessed by DLS. The millbase dispersion was found to have a $D_{V10}$ of 31.5 nm, a $D_{V50}$ of 63.2 nm, and a $D_{V90}$ of 117 nm.

Example 9—Violet

| Pigment (10 wt. %): Chromophtal Violet D 5800 (Pigment Violet 23) | | | |
|---|---|---|---|
| Dispersant: Triton® X-100 | | | |
| Ratio pigment/dispersant (wt.): 1:0.5 | | | |
|  | Measured Viscosity (mPa · s) | | |
| Days after formation | 0 | 1 | 2 |
| Temperature, ° C. | R.T. | 60 | 60 |
| Reference | 25 | 200 | 140 |
| Sodium Myristate 10% | 25 | 6.54 | 5.19 |
| Sodium Dodecanoate 10% | 25 | 8.34 | 6.20 |

As can be seen from the preliminary results shown in the above table, inclusion of both DIAs in the compositions tested in the present study at least reduced the viscosity relative to a reference composition which lacked the DIAs. This example further illustrates that a DIA or a DIA-Dispersant combination can be used for a variety of pigments.

Example 10—Gelation Reversal

In the above-examples, the DIAs were added to the various dispersions following the milling of the pigments with the exemplary dispersants, before monitoring the impact over time of the inclusion of the DIAs on the stability of the resulting dispersions, as shown by viscosity measurements. As exemplified, some of the compositions including the DIAs exhibited a reduced increase in viscosity, or a delaying of such increase, and in particularly favorable cases a significant prevention of such increase typically observed in absence of a DIA.

In the present study, the DIA was added to a year old pre-formed gel that had been kept at ambient temperature. The gel was made of Heliogen® Blue D7079 previously dispersed with Naxaf® HSP at a 1:0.8 ratio. SDS was added to the gel so as to be at a concentration of 7% per weight of Pigment Blue 15:3. The gel, which had an initial viscosity out of measurable range (i.e. above 10,000 mPa·s), was stirred in the absence or presence of the DIA to facilitate the homogeneous penetration of DIA within the structure. The mechanically homogenized samples (now having an initial viscosity of about 100-200 mPa·s) were then incubated at 60° C. and their viscosity over time monitored as previously described. Whereas within ten days of incubation the sample lacking the DIA promptly re-gelified, this phenomenon was prevented by the added DIA which even provided for a reduction of the initial viscosity to be of only about 17 mPa·s at the end of the study period.

Example 11—Ink Composition

As explained, the pigment- or other particle-containing dispersions according to the present teachings can be used for the preparation of a variety of end products. In the present example, the preparation of an ink composition is described.

Heliogen® Blue D7079 was milled with Disperbyk® 190 in HDDM-01/HD-01 Attritor as previously described, the materials were mixed in the following proportion:

| Heliogen® Blue D7079 | 30 g |
|---|---|
| Disperbyk® 190 (40%) | 30 g |
| Water | 140 g |
| Total | 200 g |

The milled concentrate, now having a $D_{V50}$ of less than 100 nm, was further diluted with 50 g water and extracted from the milling device at 12 wt. % pigment concentration. The millbase concentrate was further processed as below described for the preparation of an ink composition In a first stage, 2.4 g of sodium dodecanoate were added to 200 g of the millbase concentrate to yield a DIA supplemented millbase at a ratio of 10 wt. % DIA per pigment weight. The mixture was stirred to homogeneity (5' magnetic stirrer at 50 rpm) and incubated at 60° C. for 1 day. The mixture was then left to cool down to ambient temperature.

In a second stage, ink ingredients were added to the DIA-supplemented millbase as follows:

| Millbase Concentrate + DIA (from stage 1) | 202.4 g |
|---|---|
| Joncryl® 538 (46.5%) | 154.8 g |
| BYK® 349 | 5 g |
| BYK® 333 | 2 g |
| Propylene Glycol | 240 g |
| Water | 595.8 g |
| Total | 1200 g |

The mixture was stirred for 30 minutes at ambient temperature resulting in an ink composition having a viscosity of less than 10 mPa·s.

It should be noted that the DIA can alternatively be added once the ink composition is formulated from the millbase, namely once the pigment is at a diluted concentration of 2 wt. % of the total composition.

All pigments exemplified thus far are suitable for the preparation of ink compositions according to similar principles as known to persons skilled in the art of ink formulation.

Example 12—Cosmetic Composition

As explained, the pigmented dispersions according to the present teachings can be used for the preparation of a variety of additional end products. In the present example, the preparation of a cosmetic composition is described.

Pigment White 6, in addition to its coloring effect (e.g., white inks, paints or coatings), can also be used as a UV blocker, as it is made of titanate which absorbs some deleterious ultra-violet radiation. A dispersion of Pigment White, dispersed with Disperbyk® 190 at a ratio of 1:0.05 and supplemented with 15% potassium oleate per pigment weight, was prepared as described in Example 3. The inventive dispersion was then incorporated at a concentration of 10% by weight of a commercially available body lotion (supplied by E.L. Erman Cosmetic Manufacturing Ltd., Israel). The resulting cosmetic formulation was monitored for up to a week at ambient temperature and found stable.

Example 13—Coating Composition 13.1. A dispersion of Pigment White, dispersed with Disperbyk® 190 at a ratio of 1:0.05 and supplemented with 15% potassium oleate per pigment weight, was prepared as described in Example 3. The resulting dispersion was then incorporated at a concentration of 10% by weight into a commercial water-based wood lacquer ("Hydro clear" wood lacquer manufactured by Zweihorn, Germany). The resulting coating formulation was monitored for up to a week at ambient temperature and found to be viscosity stable.

13.2. A dispersion of Pigment Blue 15:3, dispersed with Disperbyk® 190 at a ratio of 1:0.4 by weight and supplemented with 15% SDS per pigment weight, was prepared as described in Example 5. The resulting dispersion was then incorporated at a concentration of 10% by weight into a commercial water-based wood lacquer ("Hydro clear" wood lacquer manufactured by Zweihorn, Germany). The resulting coating formulation was monitored for up to a week at ambient temperature and found to be viscosity stable.

Example 14—Particle Size Stability

The compositions described in Example 1 were additionally monitored for particle size stability. The $D_{V50}$ of the pigment was measured upon completion of the milling and following six months of incubation at ambient temperature. These measurements were performed as previously described and it was found that the compositions containing the various DIAs maintained a relatively stable particle size, their $D_{V50}$ at the end of the study deviating by less than 10% from their $D_{V50}$ at the initiation of the study, when freshly prepared.

Example 15—Schematic Illustrations of DIA Activity

Figure 7:
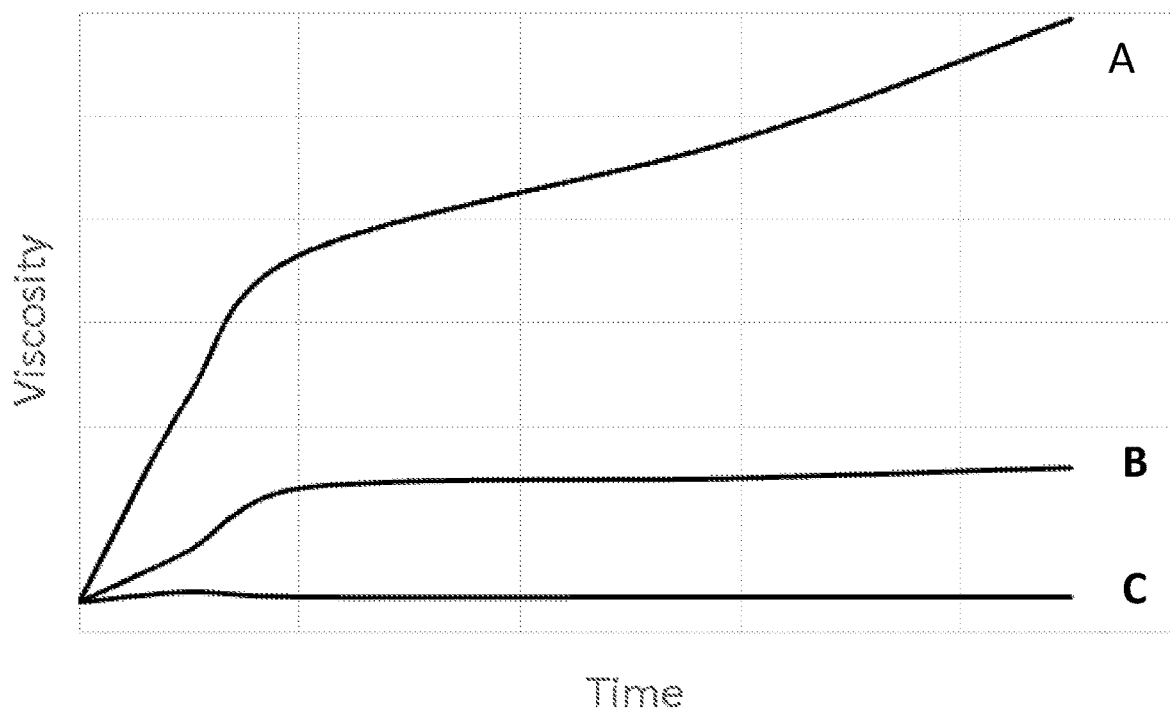
FIG. 7 shows a plot of viscosity as a function of time for three illustrative dispersions having the same pigment, dispersant and DIA, but in different ratios.

FIG. 7 illustrates schematically the influence of a DIA on a hypothetical dispersant composition; the graphs depicted, however, are based on observed behavior. Curve A illustrates the viscosity behavior over time of a first reference dispersion that contains pigment and dispersant in a weight ratio of 1:0.5, lacking DIA. As can be seen, this is an insufficient amount of dispersant, with the result that the viscosity of the dispersion significantly increases over time, so that the composition may ultimately gel. Curve B illustrates a composition containing the same ingredients, but in which the amount of dispersant has been increased, so that the weight ratio of pigment to dispersant is 1:1.6. This results in a lower and steadier viscosity as compared to Curve A. Curve C illustrates a composition identical to the one shown in Curve A, namely containing pigment and dispersant in a 1:0.5 weight ratio, except that DIA has been added in an amount which is 10% by weight of the pigment. In this case, not only is the viscosity stable over time, but it is significantly lower than the viscosity of the reference composition that contains more than 3 times as much dispersant.

Figure 8:
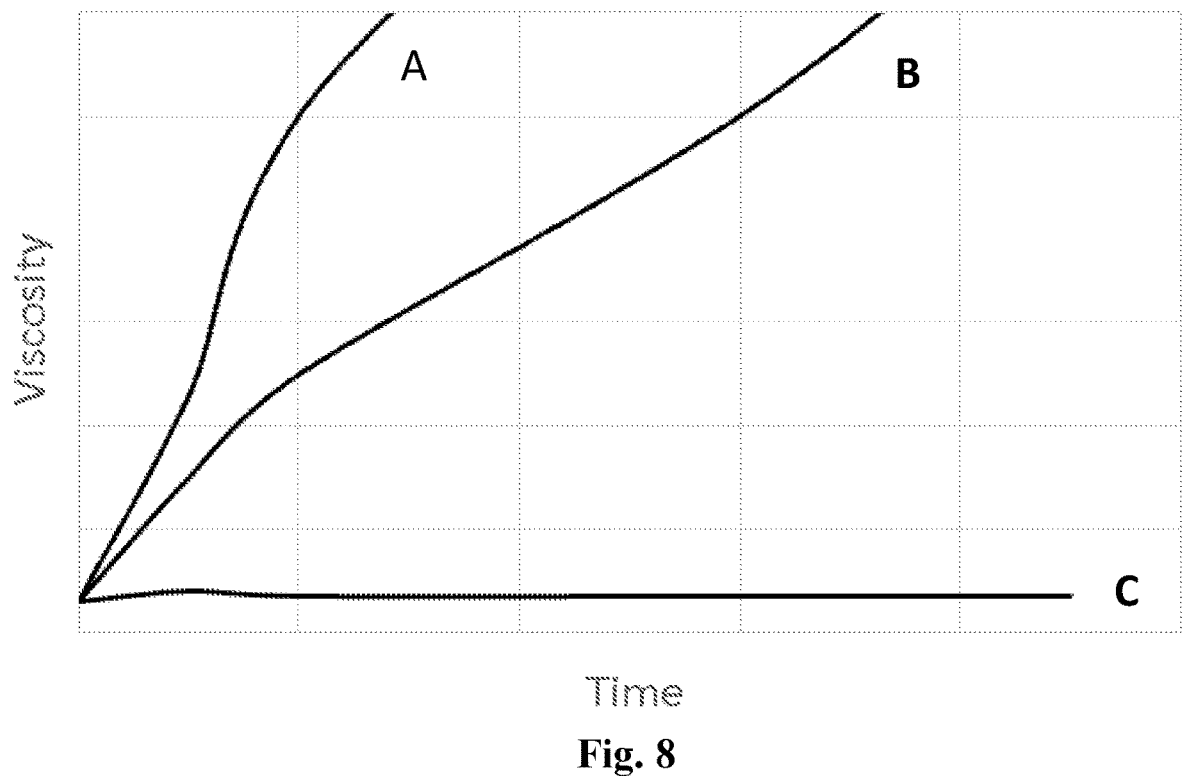
FIG. 8 shows a plot of viscosity as a function of time for three illustrative dispersions having the same pigment, dispersant and DIA, but in different ratios.

FIG. 8 illustrates schematically the influence of a DIA on another hypothetical dispersant composition: the graphs depicted, however, are based on observed behavior. Curve A illustrates the viscosity behavior over time of a reference composition that contains pigment and dispersant in a weight ratio of 1:0.5, lacking DIA. The viscosity of this composition rapidly increases, rendering the composition unsuitable for commercial use. Curve B illustrates a composition containing the same ingredients, but in which the amount of dispersant has been increased, so that the weight ratio of pigment to dispersant is 1:1.6. Although the viscosity of this composition increases at a lower rate than the viscosity of the reference composition shown in Curve A, the viscosity increase is still too great to enable the manufacture of a commercial product, i.e. the composition is still unstable. Curve C illustrates a composition containing pigment and dispersant in a 1:0.5 weight ratio, except that DIA has been added in an amount which is 10% by weight of the pigment. In this case, the viscosity is stable over time, and it is sufficiently low to facilitate manufacture of a commercial composition.

Example 16—Pigment Concentration

In the above-examples, unless otherwise stated, the DIAs were added following the milling of the pigments with the exemplary dispersants to dispersions having a pigment concentration of 10% by weight of the dispersion. Typically, for a given pigment particle size, the viscosity of pigment dispersions increases with the amount of pigment present in the dispersions, generally as a result of the quantity of the pigment as well of its dispersant. Moreover, for a given pigment concentration, the viscosity of pigment dispersions generally increases with the reduction in size of the pigment particles, as such size reduction increases the surface area of the pigment particles to be dispersed, typically requiring an increased amount of dispersant.

In this example, the effect of the DIA addition was tested on dispersions containing 0.5 wt. %, 1 wt. %, 3 wt. % and 5 wt. % pigment, respectively, the pigment in each dispersion having a substantially identical particle size distribution. The DIA was tested at concentrations of 2, 4, 7, 10, 15 and 20%, by weight of the pigment, in each of the aforesaid pigment dispersions. The samples were incubated at 60° C. and their viscosity, measured at room temperature (RT), was monitored over a period of four weeks. As little change was observed at the different time points monitored during this period, only the first and last measurements are reported. As the viscosity results obtained for a given pigment concentration and DIA were similar at all DIA per pigment weight per weight percentage, their average is reported in the below table. For convenience of comparison, the averages of the results at efficient DIA concentrations obtained after 25 days at 60° C. with dispersions containing 10 wt. % green pigment, as detailed in Example 8, or after 33 days at 60° C. with dispersions containing 10 wt. % blue pigment, as detailed in Example 5, or after 36 days at 60° C. with dispersions containing 50 wt. % white pigment, as detailed in Example 3, are also included in their respective tables.

The percentage of viscosity decrease (%ΔV) attained by the DIA at the final time point, at each pigment concentration, was calculated with respect to the relevant reference lacking the DIA. % ΔV=100®️ ($V_{R2}$-$V_2$)/$V_{R2}$, wherein $V_{R2}$ represents the viscosity of the reference composition lacking the DIA and $V_2$ the viscosity of the DIA-containing composition, both measured at time t2 which, in the present example, corresponds to 28 days (or any other time point above indicated for the examples providing the 10 wt. % pigment reference). A gel-like sample was assumed to have, for this illustrative purpose, a viscosity of 10,000 mPa·s.

Pigment: Heliogen Green D8730 (Pigment Green 7)
Dispersant: Triton ® X-100
Ratio pigment/dispersant by weight: 1:0.5

|  | Measured Viscosity (mPa · s) | | Percent |
| --- | --- | --- | --- |
| Days after formation | 0 | 28 | Viscosity |
| Temperature, ° C. | R.T. | 60 | Decrease |
| 0.5% Pigment Reference | 1.17 | 1.42 | NR |
| Potassium Myristate on 0.5% P. | 1.26 | 1.31 | 7.0% |
| 1% Pigment Reference | 1.38 | 1.50 | NR |
| Potassium Myristate on 1% P. | 1.35 | 1.34 | 10.7% |
| 3% Pigment Reference | 1.65 | 4.05 | NR |
| Potassium Myristate on 3% P. | 1.73 | 1.65 | 59.3% |
| 5% Pigment Reference | 2.07 | 16.4 | NR |
| Potassium Myristate on 5% P. | 2.25 | 2.16 | 86.8% |
| 10% Pigment Reference | 4.26 | Gel | NR |
| Potassium Myristate on 10% P. | 4.62 | 6.35 | 99.9% |

Pigment: Heliogen Blue D7079 (Pigment Blue 15:3)
Dispersant: Disperbyk ® 190
Ratio pigment/dispersant by weight: 1:0.4

|  | Measured Viscosity (mPa · s) | | Percent Viscosity Decrease |
| --- | --- | --- | --- |
| Days after formation | 0 | 28 | |
| Temperature, ° C. | R.T. | 60 | |
| 0.5% Pigment Reference | 1.41 | 1.48 | NR |
| Sodium Oleate on 0.5% P. | 1.49 | 1.37 | 7.4% |
| 1% Pigment Reference | 1.59 | 1.71 | NR |
| Sodium Oleate on 1% P. | 1.50 | 1.40 | 18.1% |
| 3% Pigment Reference | 1.83 | 1.98 | NR |
| Sodium Oleate on 3% P. | 1.88 | 1.64 | 17.2% |
| 5% Pigment Reference | 2.46 | 2.70 | NR |
| Sodium Oleate on 5% P. | 2.61 | 2.00 | 25.9% |
| 10% Pigment Reference | 7.23 | 45 | NR |
| Sodium Oleate on 10% P. | 8.21 | 4.51 | 90.0% |

Pigment: Heliogen Blue D7079 (Pigment Blue 15:3)
Dispersant: Disperbyk ® 190
Ratio pigment/dispersant by weight: 1:0.4

|  | Measured Viscosity (mPa · s) | | Percent Viscosity Decrease |
| --- | --- | --- | --- |
| Days after formation | 0 | 28 | |
| Temperature, ° C. | R.T. | 60 | |
| 0.5% Pigment Reference | 1.47 | 1.45 | NR |
| Sodium Dodecanoate on 0.5% P. | 1.47 | 1.36 | 6.2% |
| 1% Pigment Reference | 1.65 | 1.49 | NR |
| Sodium Dodecanoate on 1% P. | 1.53 | 1.44 | 3.4% |
| 3% Pigment Reference | 1.86 | 1.92 | NR |
| Sodium Dodecanoate on 3% P. | 1.85 | 1.64 | 14.6% |
| 5% Pigment Reference | 2.40 | 2.79 | NR |
| Sodium Dodecanoatee on 5% P. | 2.50 | 1.96 | 29.7% |
| 10% Pigment Reference | 7.23 | 45 | NR |
| Sodium Dodecanoate on 10% P. | 7.64 | 4.32 | 90.4% |

Pigment: Kronos 2310 (Pigment White 6)
Dispersant: Disperbyk ® 190
Ratio pigment/dispersant by weight: 1:0.05

|  | Measured Viscosity (mPa · s) | | Percent Viscosity Decrease |
| --- | --- | --- | --- |
| Days after formation | 0 | 28 | |
| Temperature, ° C. | R.T. | 60 | |
| 10% Pigment Reference | 1.55 | 2.88 | NR |
| Sodium Oleate on 10% P. | 1.62 | 1.57 | 45.4% |
| 20% Pigment Reference | 2.19 | 13.3 | NR |
| Sodium Oleate on 20% P. | 2.34 | 2.18 | 83.6% |
| 50% Pigment Reference | 6.06 | Gel | NR |
| Sodium Oleate on 50% P. | 6.06 | 39.5 | 99.6% |

This example shows that even in the range of relatively low viscosity, as observed with low pigment concentration, the addition of DIA following the milling of the pigment particles can be advantageous. While generally the viscosity of the pigment dispersions at pigment concentration as low as 0.5 wt. % increases, even if moderately, over time, the presence of a DIA at least reduced such increase, as observed for instance at 0.5 wt. % of pigment green: Triton® X-100. While the reference progressed from 1.17 mPa·s to 1.42 mPa·s, the sample that further included potassium myristate displayed a smaller increase in viscosity, from 1.26 mPa·s to 1.31 mPa·s. As the pigment concentration was augmented, the efficacy of the DIAs became more apparent, as illustrated by the raise in the calculated percent viscosity decrease.

Example 17—Timing of DIA Addition

In the above-examples, unless otherwise stated, the DIAs were added following the milling of the pigments with the exemplary dispersants. In Example 17, the effect of the timing of the DIA addition was assessed by comparing the viscosity performance of three kinds of preparations. The reference preparation or dispersion ("Type 1") contained only the pigment (10 wt. % of the dispersion) and the dispersant, which were co-milled as detailed above, until the pigment reached an average particle size $D_{V50}$ of about 50 nm. The second type of preparation or dispersion ("Type II") was obtained by adding the DIA (Potassium Myristate or Sodium Oleate at 10% by weight of the pigment), prior to milling, together with same pigment:dispersant as the reference, all being co-milled for the same duration of time as the previous preparation. These samples exemplify "pre-milling" timing, or "co-milling" of the constituents of the dispersion, whose viscosity performance is compared to the reference preparation, under similar conditions and duration of milling.

The third type of preparation or dispersion ("Type III") was prepared by adding the same amount of the DIA as in the Type II preparation, but after the milling of the pigment:dispersant, and further exemplifies the "post-milling" timing of DIA addition.

It should be noted that in control experiments attempting to mill the raw pigment only with the DIAs in absence of dispersant, the size reduction was deemed inappropriate. The pigment particles formed a highly heterogeneously sized population, which may be detrimental for most practical purposes and may also be prone to instability problems. Hence, it is believed that the direct association of a DIA to the pigment (as would occur during such co-milling in absence of dispersant competing for such attachment) is not sufficient to permit proper size reduction/dispersion of the pigment particles.

Pigment (10 wt. %): Heliogen Green D8730
(Pigment Green 7)
Dispersant: Triton ® X-100
Ratio pigment/dispersant by weight: 1:0.5

|  | Measured Viscosity (mPa · s) | | | | |
|---|---|---|---|---|---|
| Days after formation | 0 | 1 | 4 | 7 | 84 |
| Temperature, ° C. | R.T. | 60 | 60 | 60 | 60 |
| Reference (No DIA) | 4.4 | 53.0 | 72.0 | 75.0 | Gel |
| K-Myristate Pre-Milling | 4.0 | 7.9 | 18.3 | 26.9 | 81.8 |
| K-Myristate Post-Milling | 4.9 | 4.4 | 4.5 | 4.2 | 4.9 |
| Na-Oleate Pre-Milling | 4.0 | 15.3 | 53.0 | 88.3 | 217 |
| Na-Oleate Post-Milling | 5.0 | 4.6 | 4.4 | 4.3 | 4.4 |

Under the tested conditions, the addition of a DIA benefited the viscosity stability of the dispersions, whether added before or after milling, albeit to a different extent. This suggests different mechanisms of action for the pre-milling and post-milling DIA additions. While pre-milling addition only reduced the kinetics of viscosity increase, post-milling addition prevented it.

The size distributions of the pigment particles, as obtained in each of the above-detailed preparations, are provided below.

| Co-Milled Materials | Dv10 (nm) | Dv50 (nm) | Dv90 (nm) |
|---|---|---|---|
| Pigment + Dispersant | 28.4 | 47.4 | 120 |
| Pigment + Dispersant + Potassium Myristate | 39.5 | 68.1 | 216 |
| Pigment + K Myristate (No Dispersant) | 50.5 | 477 | 649 |
| Pigment + Dispersant + Sodium Oleate | 21.2 | 44.5 | 448 |
| Pigment + Sodium Oleate (No Dispersant) | 32.8 | 1000 | 1570 |

While some of the reported sizes at the high end may be more of qualitative than quantitative value, it is evident that the DIA molecules alone are unable to achieve a relatively homogenous population of particles (i.e. within a relatively narrow distribution). Pigment green milled solely with potassium myristate reached a median size ($D_{V50}$) of about 0.5 μm and of about 1 μm when milled solely with sodium oleate. Such values are at least 10-times larger than the size attained when the dispersant, Triton® X-100, is used alone ($D_{V50}$ of about 50 nm). When DIA was added post-milling (data not shown), the particle size distribution remained essentially unchanged as compared to the reference preparation, as would be expected.

When the DIA was added pre-milling, while the resulting $D_{V10}$ and $D_{V50}$ values are relatively similar to the reference lacking such added DIA, and below 100 nm, the $D_{V50}$ values are clearly distinct. For instance, while the reference displayed a $D_{V90}$ of 120 nm, the introduction of potassium myristate during milling led to a rise of 80% in this value up to 216 nm. The addition of sodium oleate during milling resulted in a more dramatic effect, the $D_{V90}$ produced in its presence being almost 4-times the reference value.

In other words, while pigment particles size reduced only with the dispersant displayed a relatively narrow distribution eighty percent of the particles (between $D_{V10}$ and $D_{V50}$) being in the range of about 30 nm to about 120 nm, with a $D_{V90}/D_{V10}$ ratio of approximately 4.2, the presence of a DIA during milling significantly affected such outcome. The $D_{V90}/D_{V10}$ ratio in presence of potassium myristate was of about 5.5 and in presence of sodium oleate of about 21.1, pointing to the dramatic broadening of the population size.

Example 18—Linear Saturated Fatty Acid Salts and Branched/Unsaturated Fatty Acid Salts In this example, a series of saturated fatty acid salt DIAs was tested at a single concentration (10 wt. % of the pigment), each DIA being added post-milling to two distinct pigment dispersions, each dispersion being incubated at a different temperature (60° C. or 70° C., as indicated in the tables). Sodium oleate, having an unsaturated bound, was included for comparison with its saturated counterpart, sodium stearate, having the same chain length. Finally, Dioctyl Sodium Sulfosuccinate (AOT) having 20 carbon atoms was tested to represent branched fatty acids. For comparison, the corresponding results of Example 5, in which a similar dispersion was incubated at 60° C. are included for convenience in the second table.

Pigment (10 wt. %): Heliogen Green D8730
(Pigment Green 7)
Dispersant: Triton ® X-100
Ratio pigment/dispersant by weight: 1:0.5

|  | Measured Viscosity (mPa · s) | | | | |
|---|---|---|---|---|---|
| Days after formation | 0 | 1 | 2 | 7 | 14 |
| Temperature, ° C. | R.T. | 60 | 60 | 60 | 60 |
| Reference (No DIA) | 5.19 | Gel | Gel | Gel | Gel |
| Sodium Octanoate (C8) | 5.58 | Gel | Gel | Gel | Gel |
| Sodium Dodecanoate (C12) | 5.87 | 5.73 | 5.70 | 6.09 | 6.67 |
| Sodium Myristate (C14) | 5.72 | 5.67 | 5.43 | 5.34 | 5.43 |
| Sodium Palmitate (C16) | 6.44 | 6.33 | 6.03 | 5.67 | 5.70 |
| Sodium Stearate (C18) | 5.92 | 20.2 | 23.5 | 26.1 | 14.6 |
| Sodium Oleate (C18) Unsat. | 5.88 | 5.61 | 5.46 | 5.34 | 5.43 |
| AOT (C20) Branched | 5.31 | 6.54 | 8.31 | 12.1 | 18.9 |

Pigment: Heliogen Blue D7079
(Pigment Blue 15:3)
Dispersant: Disperbyk ® 190
Ratio pigment/dispersant by weight: 1:0.4

| | Measured Viscosity (mPa · s) | | | | |
|---|---|---|---|---|---|
| Days after formation | 0 | 1 | 2 | 7 | 14 |
| Temperature, ° C. | R.T. | 70 | 70 | 70 | 70 |
| Reference (No DIA) | 10.2 | Gel | Gel | Gel | Gel |
| Sodium Octanoate (C8) | 10.6 | Gel | Gel | Gel | Gel |
| Sodium Dodecanoate (C12) | 8.97 | 3.96 | 3.78 | 3.81 | 4.35 |
| Sodium Myristate (C14) | 9.02 | 3.45 | 3.24 | 3.12 | 3.23 |
| Sodium Palmitate (C16) | 9.51 | 6.42 | 3.45 | 3.33 | 3.45 |
| Sodium Stearate (C18) | 9.39 | Gel | Gel | 23.9 | 5.79 |
| Sodium Oleate (C18) Unsat. | 9.99 | 4.36 | 4.14 | 3.96 | 4.05 |
| AOT (C20) Branched | 9.57 | 3.93 | 3.66 | 3.96 | 4.32 |
| Days after formation | 0 | 1 | 2 | 5 | 33 |
| Temperature, ° C. | R.T. | 60 | 60 | 60 | 60 |
| Reference (No DIA) | 7.23 | 50 | 40 | 40 | 45 |
| 10% Sodium Dodecanoate | 7.68 | 3.96 | 3.70 | 3.18 | 3.18 |

As can be seen from the above tables, in the present experimental set up the DIAs preventing gelation and even reducing viscosity had a carbon chain length of more than eight carbon atoms. DIAs having a chain length of eighteen carbons were more efficient when unsaturated. It is believed that the unsaturation of the hydrocarbon chain can promote the steric hindrance of the DIA, further increasing its benefit for the stabilization of pigment dispersions. A similar phenomenon may possibly increase the potency of fatty acid salts having shorter aliphatic chains, a palmitoleate chain being at least as suitable as a palmitate chain, and so on. Following the same steric rationale, AOT which represent a branched type of DIA having 20 carbon atoms was found more potent than a linear and saturated DIA having 18 carbon atoms, namely than sodium stearate.

It can be seen from the first table that, even after 14 days at 60° C., 10 wt. % sodium dodecanoate, sodium myristate, sodium palmitate and sodium oleate similarly prevented the increase in viscosity (gelation) observed with the reference and even maintained a relatively stable viscosity with respect to their respective baseline values. Sodium stearate and AOT also prevented gelation.

Moreover, considering the effect of temperature, it can be seen from the second table that while an increased temperature of 70° C. is more rapidly deleterious for a dispersion lacking a DIA, the reference forming a gel within one day from the milling of the pigment and its dispersant, the DIA seems as active at 70° C. as at 60° C. After 33 days at 60° C., 10 wt. % sodium dodecanoate prevented the increase in viscosity observed with the reference, and even decreased baseline viscosity by about 59% from 7.68 mPa·s to 3.18 mPa·s. After 14 days at 70° C., the same amount of sodium dodecanoate per pigment prevented the gelation of the reference, and even decreased viscosity by more than about 50% from 8.97 mPa·s to 4.35 mPa·s.

It is noted that the pH of the dispersions was measured at room temperature in the samples which were incubated 7 days and found to be in the same mildly basic range for all tested dispersions. The reference dispersion containing only pigment green dispersed with Triton® X-100 had a pH value of 9.33, the samples further containing DIA added post-milling had a pH of 9.41 for sodium octanoate, 9.68 for sodium dodecanoate, 9.52 for sodium myristate 9.25 for sodium palmitate 9.45 for sodium stearate and 9.15 for AOT. The reference dispersion containing only pigment blue dispersed with Disperbyk® 190 had a pH value of 8.55, the samples further containing DIA added post-milling had a pH of 8.75 for sodium octanoate, 9.25 for sodium dodecanoate, 9.25 for sodium myristate, 9.20 for sodium palmitate, 9.10 for sodium stearate and 8.50 for AOT.

Example 19—DIA Mixture

In the above-examples, unless otherwise stated, for a given dispersion, a single type of DIA was added following the milling of the pigment with the exemplary dispersant. In this example, the effect of a mixture of DIAs on the stability of a pigment dispersion was assessed in terms of viscosity. Sodium dodecanoate was mixed with sodium palmitate at a 1:1 weight ratio and the mixture was added to the pigment dispersion at a concentration of 10% per weight of the pigment, corresponding to the addition of 5 wt. % of each individual DIA.

For convenience of comparison, the results obtained with 10 wt. % of each DIA as reported in Example 18, are reproduced in the below tables.

Pigment (10 wt. %): Heliogen Green D8730
(Pigment Green 7)
Dispersant: Triton ® X-100
Ratio pigment/dispersant by weight: 1:0.5

| | Measured Viscosity (mPa · s) | | | | |
|---|---|---|---|---|---|
| Days after formation | 0 | 1 | 2 | 7 | 14 |
| Temperature, ° C. | R.T. | 60 | 60 | 60 | 60 |
| Reference (No DIA) | 5.19 | Gel | Gel | Gel | Gel |
| 10% Sodium Dodecanoate | 5.87 | 5.73 | 5.70 | 6.09 | 6.67 |
| 10% Sodium Palmitate | 6.40 | 6.33 | 6.03 | 5.67 | 5.70 |
| 10% Mixed DIAs | 5.87 | 5.64 | 5.52 | 5.46 | 5.61 |

Pigment: Heliogen Blue D7079
(Pigment Blue 15:3)
Dispersant: Disperbyk ® 190
Ratio pigment/dispersant by weight: 1:0.4

| | Measured Viscosity (mPa · s) | | | | |
|---|---|---|---|---|---|
| Days after formation | 0 | 1 | 2 | 7 | 14 |
| Temperature, ° C. | R.T. | 70 | 70 | 70 | 70 |
| Reference (No DIA) | 10.2 | Gel | Gel | Gel | Gel |
| 10% Sodium Dodecanoate | 8.97 | 3.96 | 3.78 | 3.81 | 4.35 |
| 10% Sodium Palmitate | 9.51 | 6.42 | 3.45 | 3.33 | 3.45 |
| 10% Mixed DIAs | 9.35 | 3.66 | 3.51 | 3.30 | 3.60 |

As can be seen from the above tables, a mixture of DIAs is at least as efficient as its individual DIA acting separately, all dramatically preventing the gelation of the pigment dispersions, both at 60° C. and at 70° C., and even reduced viscosity as compared to baseline post-milling value, at which time the DIAs were added. After 14 days at 60° C., sodium dodecanoate alone maintained an almost stable viscosity, with an increase with respect to baseline of about 13.6% from 5.87 mPa·s to 6.67 mPa·s, sodium palmitate alone mildly decreased viscosity by about 10.9% from 6.40 mPa·s to 5.70 mPa·s, and their mixture maintained a relatively stable viscosity, displaying a minor decrease of about 4.4% from 5.87 mPa·s to 5.61 mPa·s.

At 70° C. the effect of the DIAs, alone or mixed was even more dramatic. After 14 days, sodium dodecanoate alone decreased viscosity by about 51.5% from 8.97 mPa·s to 4.35 mPa·s, sodium palmitate alone decreased viscosity by about 63.7% from 9.51 mPa·s to 3.45 mPa·s, and their mixture decreased viscosity by about 61.5% from 9.35 mPa·s to 3.60 mPa·s.

It is noted that the pH of the dispersions was measured at room temperature in the samples which were incubated 7 days and found to be in the same mildly basic range for all tested dispersions. The reference dispersion containing only pigment green dispersed with Triton® X-100 had a pH value of 9.33, the samples further containing DIA added post-milling had a pH of 9.68 for sodium dodecanoate, 9.25 for sodium palmitate, and 9.20 for their mixture. The reference dispersion containing only pigment blue dispersed with Disperbyk® 190 had a pH value of 8.55, the samples further containing DIA added post-milling had a pH of 9.25 for sodium dodecanoate, 9.20 for sodium palmitate, and 9.20 for their mixture.

Example 20—Salts of Anionic Sulfate and Sulfonate Surfactants

In the above-examples, the potency of sodium salts and potassium salts of various DIAs, mainly in the carboxylate series of fatty acid anionic surfactants, has been established. In this example, an additional cation, namely ammonium, was tested and compared to the corresponding sodium salt of a DIA of the sulfate type. Moreover, a linear sulfonate DIA was tested. All DIAs were added to distinct dispersions post-milling at a single concentration of 10 wt. % of the pigment weight. Each pigment dispersion was incubated at a different temperature (60° C. or 70° C., as indicated in the tables). For comparison, the corresponding results of Example 5, in which a similar dispersion was incubated at 60° C., are included for convenience in the second table.

| Pigment (10 wt. %): Heliogen Green D8730 (Pigment Green 7) Dispersant: Triton ® X-100 Ratio pigment/dispersant by weight: 1:0.5 | | | | | |
|---|---|---|---|---|---|
| | Measured Viscosity (mPa · s) | | | | |
| Days after formation | 0 | 1 | 2 | 7 | 14 |
| Temperature, ° C. | R.T. | 60 | 60 | 60 | 60 |
| Reference (No DIA) | 5.19 | Gel | Gel | Gel | Gel |
| Ammonium Dodecyl Sulfate | 5.85 | 5.91 | 5.82 | 6.12 | 6.39 |
| Sodium Dodecyl Sulfate | 5.82 | 5.76 | 5.61 | 5.55 | 5.76 |
| Sodium 1-Hexadecanesulfonate | 6.40 | 6.03 | 5.82 | 5.79 | 5.82 |

| Pigment: Heliogen Blue D7079 (Pigment Blue 15:3) Dispersant: Disperbyk ® 190 Ratio pigment/dispersant by weight: 1:0.4 | | | | | |
|---|---|---|---|---|---|
| | Measured Viscosity (mPa · s) | | | | |
| Days after formation | 0 | 1 | 2 | 7 | 14 |
| Temperature, ° C. | R.T. | 70 | 70 | 70 | 70 |
| Reference (No DIA) | 10.2 | Gel | Gel | Gel | Gel |
| Ammonium Dodecyl Sulfate | 9.12 | 3.36 | 3.30 | 3.45 | 4.71 |
| Sodium Dodecyl Sulfate | 8.97 | 3.27 | 3.06 | 3.01 | 3.21 |
| Sodium 1-Hexadecanesulfonate | 8.95 | 3.40 | 3.60 | 3.60 | 3.60 |

| Pigment: Heliogen Blue D7079 (Pigment Blue 15:3) Dispersant: Disperbyk ® 190 Ratio pigment/dispersant by weight: 1:0.4 | | | | | |
|---|---|---|---|---|---|
| | Measured Viscosity (mPa · s) | | | | |
| Days after formation | 0 | 1 | 2 | 5 | 33 |
| Temperature, ° C. | R.T. | 60 | 60 | 60 | 60 |
| Reference (No DIA) | 7.23 | 50 | 40 | 40 | 45 |
| Sodium Dodecyl Sulfate | 8.01 | 3.42 | 3.18 | 2.88 | 3.12 |

As can be seen from the above tables, ammonium dodecyl sulfate is as efficient as sodium dodecyl sulfate in preventing the rapid gelation of the pigment dispersions, both even decreasing viscosity as compared to baseline values at 70° C. It is therefore believed that ammonium may satisfactorily replace sodium as cation salt for DIAs according to the present teachings. Sodium 1-hexadecanesulfonate was comparably potent, supporting the suitability of linear fatty acids of the sulfonate type.

Moreover, considering the effect of temperature, it can be seen from the second table that while an increased temperature of 70° C. is more rapidly deleterious for a dispersion lacking a DIA, the DIA seems at least as active at 70° C. as at 60° C. As can be observed, while at 60° C., the presently tested DIAs generally maintained baseline viscosity over at least 14 days, at 70° C. the presence of the same DIAs added post-milling yielded a decrease in viscosity. In Example 5, after 33 days at 60° C., 10 wt. % sodium dodecyl sulfate prevented the increase in viscosity observed with the reference, and even decreased baseline viscosity by about 61% from 8.01 mPa·s to 3.12 mPa·s. In the present example, after 14 days at 70° C., the same amount of sodium dodecyl sulfate per pigment prevented the gelation of the reference, and even decreased viscosity by about 64% from 8.97 mPa·s to 3.21 mPa·s.

It is noted that the pH of the dispersions was measured at room temperature in the samples which were incubated 7 days and found to be in the same mildly basic range for all tested dispersions. The reference dispersion containing only pigment green dispersed with Triton® X-100 had a pH value of 9.33, the samples further containing DIA added post-milling had a pH of 8.60 for ammonium dodecyl sulfate, 9.40 for sodium dodecyl sulfate, and 9.30 for sodium 1-hexadecanesulfonate. The reference dispersion containing only pigment blue dispersed with Disperbyk® 190 had a pH value of 8.55, the samples further containing DIA added post-milling had a pH of 8.30 for ammonium dodecyl sulfate, 8.70 for sodium dodecyl sulfate, and 8.95 for sodium 1-hexadecanesulfonate.

Example 21—Polysorbate-Type Non-Ionic Dispersant

In the above-examples, the pigments were milled with exemplary representatives of a variety of dispersants. All enabled the successful size reduction of the pigments from at least micronic size down to sub-micronic size, all enabling the preparation of dispersions of nanoparticles of pigments (e.g., having at least one of $D_{V50}$ and $D_{V90}$ no greater than 100 nm).

In this example, an additional commonly used non-ionic surfactant of the polysorbate type was tested, namely polyoxyethylene (20) sorbitan monolaurate, often referred to as Tween® 20. Two dispersions were prepared, each with 10 wt. % of a different pigment and a different ratio of dispersant to pigment. Both ratio of Tween® 20 provided satisfactory size reduction of their respective pigment ($D_{V50}$<100 nm). A single DIA, potassium myristate, was added post-milling at 10% by weight of the pigment. Samples were incubated either at 60° C. or at 70° C. and their viscosity over time monitored on the days indicated in the tables, the measurements being made on samples having reached room temperature. Their viscosity was compared to a reference dispersion incubated under same conditions, but lacking the DIA.

Pigment (10 wt. %): Heliogen Green D8730
(Pigment Green 7)
Dispersant: Tween® 20
Ratio pigment/dispersant by weight: 1:0.5

| | Measured Viscosity (mPa · s) | | | | |
|---|---|---|---|---|---|
| Days after formation | 0 | 1 | 2 | 7 | 14 |
| Temperature, ° C. | R.T. | 60 | 60 | 60 | 60 |
| Reference (No DIA) | 2.76 | Gel | Gel | Gel | Gel |
| Potassium Myristate | 3.12 | 2.79 | 2.88 | 2.82 | 2.88 |

Pigment: Heliogen Blue D7079
(Pigment Blue 15:3)
Dispersant: Tween® 20
Ratio pigment/dispersant by weight: 1:0.4

| | Measured Viscosity (mPa · s) | | | | |
|---|---|---|---|---|---|
| Days after formation | 0 | 1 | 2 | 7 | 14 |
| Temperature, ° C. | R.T. | 70 | 70 | 70 | 70 |
| Reference (No DIA) | 3.35 | 2.55 | 2.61 | Gel | Gel |
| Potassium Myristate | 2.58 | 2.64 | 3.03 | 3.03 | 3.30 |

As can be seen from the above tables, each dispersion displayed a different tendency to form a gel in absence of DIA. The dispersion containing 10 wt. % pigment green and 5 wt. % Tween® 20 per weight of the total composition was highly unstable and formed a gel within a day or less at 60° C. The dispersion containing 10 wt. % pigment blue and 4 wt. % Tween® 20 was slightly more stable and formed a gel after at least two days at 70° C. In both cases, potassium myristate (at 10% per weight of pigment, hence 1 wt. % of the total composition) completely prevented the gelation and fully stabilized the viscosity. These results further support that the introduction of a DIA post-milling may suitably stabilize pigment dispersions, namely by preventing or reducing deleterious changes in viscosity, in a variety of pigment:dispersant systems.

For the dispersion of pigment blue size reduced at 1:0.4 weight ratio with Tween® 20, the particle size distribution of the pigment particles following milling, assessed by DLS, was as follows: $D_{V10}$: 29.1 nm, $D_{V50}$: 47.3 nm, and $D_{V90}$: 99.4 nm.

For the dispersion of pigment green size reduced at 1:0.5 weight ratio with Tween® 20, the particle size distribution of the pigment particles following milling, assessed by DLS, was as follows: $D_{V10}$: 42.3 nm, $D_{V50}$: 65.8 nm, and $D_{V90}$: 130 nm.

Example 22—Control Additives

In the above-examples, the potency of DIAs was compared for various salts, the cation being either ammonium, sodium or potassium, and for various anionic moieties of the hydrocarbon chains, of carboxylate, sulfate, or sulfonate type (the aliphatic chain being either saturated or unsaturated). In this example, the polar group of the fatty acids was either substituted by chlorine or simply replaced by a hydroxyl group, yielding control molecules. The control additives, namely, palmitoyl chloride, oleoyl chloride, 1-hexadecanol and 1-octadecanol, were each added to distinct dispersions post-milling at a single concentration of 10 wt. % of the pigment weight. The effect of these control additives was compared to DIAs having the same chain length and saturation, namely to sodium palmitate, sodium oleate, and sodium stearate, all tested under same conditions.

Each pigment dispersion (containing control additives or corresponding exemplary DIAs) was incubated at a different temperature (60° C. or 70° C., as indicated in the tables). For comparison, the corresponding results of Example 5, in which a similar dispersion was incubated at 60° C., are included for reference in the second table.

Pigment (10 wt. %): Heliogen Green D8730
(Pigment Green 7)
Dispersant: Triton® X-100
Ratio pigment/dispersant by weight: 1:0.5

| | Measured Viscosity (mPa · s) | | | | |
|---|---|---|---|---|---|
| Days after formation | 0 | 1 | 2 | 7 | 14 |
| Temperature, ° C. | R.T. | 60 | 60 | 60 | 60 |
| Reference (No DIA) | 5.19 | Gel | Gel | Gel | Gel |
| Palmitoyl Chloride | 5.88 | Gel | Gel | Gel | Gel |
| 1-Hexadecanol | 5.90 | Gel | Gel | Gel | Gel |
| Sodium Palmitate | 6.40 | 6.33 | 6.03 | 5.67 | 5.70 |
| Oleoyl Chloride | 6.03 | Gel | Gel | Gel | Gel |
| Sodium Oleate | 5.88 | 5.61 | 5.46 | 5.34 | 5.43 |
| 1-Octadecanol | 5.91 | Gel | Gel | Gel | Gel |
| Sodium Stearate | 5.92 | 20.2 | 23.5 | 26.1 | 14.6 |

Pigment: Heliogen Blue D7079
(Pigment Blue 15:3)
Dispersant: Disperbyk® 190
Ratio pigment/dispersant by weight: 1:0.4

| | Measured Viscosity (mPa · s) | | | | |
|---|---|---|---|---|---|
| Days after formation | 0 | 1 | 2 | 7 | 14 |
| Temperature, ° C. | R.T. | 70 | 70 | 70 | 70 |
| Reference (No DIA) | 10.2 | Gel | Gel | Gel | Gel |
| Palmitoyl Chloride | 10.2 | Gel | Gel | Gel | Gel |
| 1-Hexadecanol | 9.30 | Gel | Gel | Gel | Gel |
| Sodium Palmitate | 9.51 | 6.42 | 3.45 | 3.33 | 3.45 |
| Oleoyl Chloride | 17.6 | Gel | Gel | Gel | Gel |
| Sodium Oleate | 9.99 | 4.36 | 4.14 | 3.96 | 4.05 |
| 1-Octadecanol | 9.40 | Gel | Gel | Gel | Gel |
| Sodium Stearate | 9.39 | Gel | Gel | 23.9 | 5.79 |
| Days after formation | 0 | 1 | 2 | 5 | 33 |
| Temperature, ° C. | R.T. | 60 | 60 | 60 | 60 |
| Reference (No DIA) | 7.23 | 50 | 40 | 40 | 45 |
| Sodium Oleate | 8.46 | 3.75 | 3.57 | 3.54 | 3.96 |

As can be seen from the above tables, the ionic heads of the DIAs apparently significantly contribute to DIA activity, as implied from the lack of potency of the control additives in which the carboxylate group of exemplary DIAs was modified or replaced by a non-ionic moiety. None of the tested control additives was able to prevent the rapid gelation of the pigment dispersions, in clear contrast with the dramatic effects of the corresponding DIAs.

Moreover, considering the effect of temperature, it can be seen from the second table that while an increased temperature of 70° C. is rapidly deleterious for a dispersion lacking a DIA, the reference forming a gel within one day from the milling of the pigment and its dispersant, the DIA seems as active as at 60° C. In Example 5, after 33 days at 60° C., 10 wt. % sodium oleate prevented the increase in viscosity observed with the reference, and even decreased viscosity by about 53.2% from 8.46 mPa·s to 3.96 mPa·s. In the present example, after 14 days at 70° C., the same amount of sodium oleate per pigment prevented the gelation of the reference, and even decreased viscosity by about 59.5% from 9.99 mPa·s to 4.05 mPa·s.

It is noted that the pH of the dispersions was measured at room temperature in the samples which were incubated 7 days and found to be in the same mildly basic range for all tested dispersions, with the notable exception of those containing palmitoyl chloride and oleoyl chloride, which were acidic. The reference dispersion containing only pigment green dispersed with Triton® X-100 had a pH value of 9.33, the samples further containing control molecules added post-milling had a pH of 1.90 for palmitoyl chloride, 9.31 for 1-hexadecanol, 9.25 for sodium palmitate, for oleoyl chloride, 8.81 for sodium oleate and 9.26 for 1-octadecanol. The reference dispersion containing only pigment blue dispersed with Disperbyk® 190 had a pH value of 8.55, the samples further containing control molecules added post-milling had a pH of 5.20 for palmitoyl chloride, 8.81 for 1-hexadecanol, 9.20 for sodium palmitate, 5.65 for oleoyl chloride, 8.80 for sodium oleate and 8.86 for 1-octadecanol.

Example 23—DIA CMC, HLB and Theoretical Considerations

The DIAs as used according to the present teachings can form micelles when dispersed in water or aqueous dispersions. In the present example, the DIAs were dispersed at room temperature (circa 23° C.) in deionized water at about 10% molar above their Critical Micelle Concentration (CMC) as reported in literature. In absence of such data, the CMC of a surfactant can be determined by standard methods using routine experimentation, for instance according to ISO 4311:1979. The DIAs were dispersed using a sonicator (Model D150H by MRC) for 10 minutes. The size of the resulting micelles and the zeta potential of the dispersions so obtained were measured using Zetasizer Model Zen 3600 by Malvern.

The Acid Number of the fatty acids from which some of the listed salts are derived, were retrieved from literature. The acid value is the mass of potassium hydroxide (KOH) in milligrams that is required to neutralize one gram of chemical substance. It has been reported that caprylic acid (C8) has an Acid Number of about 383-390 mg KOH/g, capric acid (C10) has an Acid Number of about 321-329 mg KOH/g, lauric acid (C12) has an Acid Number of about 278-282 mg KOH/g, myristic acid (C14) has an Acid Number of about 244-248 mg KOH/g, palmitic acid (C16) has an Acid Number of about 217-220 mg KOH/g, stearic acid (C18) has an Acid Number of about 195-199 mg KOH/g and its unsaturated counterpart oleic acid has an Acid Number of about 198.6 mg KOH/g. These values are reported in the below table at the first occurrence of a salt derived from such a fatty acid, for instance the reported acid value range of caprylic acid is indicated next to potassium octanoate.

The Hydrophilic-Lipophilic Balance (HLB) values of the DIAs according to the present teachings and of control compounds provided for reference were estimated according to the two prevailing methods of Griffin (1949 and 1954) and Davies (1957). Both results are indicated in the below table in the Estimated HLB (Est. HLB) column, the results according to Davies (D-HLB values) appearing on the upper line and those according to Griffin (G-HLB values) on the lower line. The values obtained by the method of Griffin are on a scale from 0 to 20, respectively for completely hydrophobic molecules to completely hydrophilic molecules, permit a preliminary classification of surfactant molecules. Griffin calculated HLB values between about 3 and about 8 are generally associated with W/O (water in oil) emulsifiers, while values between about 8 to about 16 indicate O/W (oil in water) emulsifiers. Bridging HLB values between about 7 and about 9 typically correspond to wetting and spreading agents. Generally surfactants having an HLB value of about 6 or more are considered water dispersible, an HLB value of 10 or more indicating improved water solubility. As shown in the below table, the HLB values estimated according to the method of Davies tend to be higher than those assessed according to Griffin. Generally, however, the HLB ranking amongst different compounds is similar for the two methods.

Results are reported in the following table, wherein exemplary non-ionic surfactants including fatty alcohols, control molecules and fatty acids DIAs are ordered by increasing size of the aliphatic hydrocarbon chain. NA indicates that a value or result is not available.

| Name Chemical Formula | MW | Est. HLB Davies Griffin | Literature CMC (moles/L) | Dv50 (nm) | Zeta Potential (eV) | Acid Number (mg KOH/g) |
|---|---|---|---|---|---|---|
| Potassium Octanoate $C_8H_{15}KO_2$ | 182.30 | 24.77 9.11 | $3.6 \times 10^{-1}$ M | NA | NA | 383-390 |
| Sodium Octanoate $C_8H_{15}NaO_2$ | 166.19 | 22.77 8.06 | $3.4 \times 10^{-1}$ M | 285 | −20.9 | Idem |
| Potassium Decanoate $C_{10}H_{19}KO_2$ | 210.36 | 23.82 7.90 | $1.0 \times 10^{-1}$ M | NA | NA | 321-329 |
| Sodium Decanoate $C_{10}H_{19}NaO_2$ | 194.25 | 21.82 6.89 | $9.4 \times 10^{-2}$ M | NA | NA | Idem |
| Sodium Decyl Sulfonate $C_{10}H_{21}NaO_3S$ | 244.33 | 13.23 8.43 | $4.4 \times 10^{-2}$ M | NA | NA | NA |
| Ammonium Dodecyl Sulfate $C_{12}H_{29}NO_4S$ | 288.43 | NA 7.14 | $6.2 \times 10^{-3}$ M | 3 | −26.4 | NA |
| Sodium Dodecyl Sulfate $C_{12}H_{25}NaO_4S$ | 288.38 | 40.00 7.14 | $8.2 \times 10^{-3}$ M | 3 | −34.1 | NA |
| Sodium Dodecyl Sulfonate $C_{12}H_{25}NaO_3S$ | 272.38 | 12.30 7.56 | $9.8 \times 10^{-3}$ M | NA | NA | NA |
| Sodium Dodecylbenzene Sulfonate $C_{18}H_{29}NaO_3S$ | 348.48 | 10.64 5.91 | $1.2 \times 10^{-3}$ M | 1.32 | −40.4 | NA |

-continued

| Name Chemical Formula | MW | Est. HLB Davies Griffin | Literature CMC (moles/L) | Dv50 (nm) | Zeta Potential (eV) | Acid Number (mg KOH/g) |
|---|---|---|---|---|---|---|
| Potassium Dodecanoate $C_{12}H_{23}KO_2$ | 238.41 | 22.87 6.97 | $2.0 \times 10^{-2}$ M | NA | NA | 278-282 |
| Sodium Dodecanoate $C_{12}H_{23}NaO_2$ | 222.30 | 20.87 6.02 | $2.6 \times 10^{-2}$ M | 442 | −51.2 | Idem |
| Potassium Myristate $C_{14}H_{27}KO_2$ | 266.46 | 21.92 6.23 | $7.5 \times 10^{-3}$ M | 683 | −85.2 | 244-248 |
| Sodium Myristate $C_{14}H_{27}NaO_2$ | 250.35 | 19.92 5.35 | $6.9 \times 10^{-3}$ M | 151 | −52.6 | Idem |
| Sodium Myristyl Sulfonate $C_{14}H_{29}NaO_3S$ | 300.43 | 11.35 6.85 | $2.3 \times 10^{-3}$ M | NA | NA | NA |
| 1-Hexadecanol $C_{16}H_{34}O$ | 242.45 | 1.3 NA | NA | NA | NA | NA |
| Palmitoyl Chloride $C_{16}H_{31}ClO$ | 274.87 | NA 4.61 | NA | NA | NA | NA |
| Potassium Palmitate $C_{16}H_{31}KO_2$ | 310.40 | 20.97 5.35 | $1.8 \times 10^{-3}$ M | NA | NA | 217-220 |
| Sodium Palmitate $C_{16}H_{31}NaO_2$ | 278.41 | 18.97 5.96 | $2.1 \times 10^{-3}$ M | 822 | −66.2 | Idem |
| Sodium 1-Hexadecane Sulfonate $C_{16}H_{33}NaO_3S$ | 328.49 | 10.40 6.27 | $1.1 \times 10^{-3}$ M | 396 | −50.8 | NA |
| 1-Octadecanol $C_{18}H_{38}O$ | 270.5 | 0.35 NA | NA | NA | NA | NA |
| Oleoyl Chloride $C_{18}H_{33}ClO$ | 300.91 | NA 4.21 | NA | NA | NA | NA |
| Potassium Stearate $C_{18}H_{35}KO_2$ | 322.57 | 20.02 NA | $4.5 \times 10^{-4}$ M | NA | NA | 195-199 |
| Sodium Stearate $C_{18}H_{35}NaO_2$ | 306.47 | 18.02 NA | $1.8 \times 10^{-3}$ M | 830 | −64.3 | Idem |
| Potassium Oleate $C_{18}H_{33}KO_2$ | 320.55 | 20.02 5.18 | $0.8 \times 10^{-3}$ M | 14 | −49.4 | ~199 |
| Sodium Oleate $C_{18}H_{33}NaO_2$ | 304.44 | 18.02 4.40 | $2.1 \times 10^{-3}$ M | 25 | −46.1 | Idem |
| Dioctyl Sodium Sulfosuccinate (AOT) $C_{20}H_{37}NaO_7S$ | 444.56 | 14.25 8.70 | $6.8 \times 10^{-4}$ M | 2 | −33.2 | NA |

Example 24—FTIR Analysis

In this example, an exemplary dispersant (Triton® X100) and two DIAs (Potassium Myristate and Sodium Oleate) were each analyzed by Fourier Transform Infrared (FTIR) Spectroscopy, and their chemical properties were compared to a mix of the individual constituents (i.e., the dispersant with each of the DIAs).

Triton® X100 was tested at a concentration of 100%. The mixtures were prepared by adding 10 wt. % of either Potassium Myristate or Sodium Oleate per weight of the dispersant and by mixing by vortex for about 5 minutes. Analysis was performed using a Thermo Nicolet™ 6700 FTIR (Thermo Electron Corporation) with Smart Orbit (Diamond Single Bounce ATR accessory).

As no new peaks appeared in the scan of the mixtures as compared to the spectra of their relevant constituting ingredients, it is believed that the interaction between the DIA molecules and the Dispersant molecules is a non-covalent interaction.

Example 25—Calculation of Specific DIA and Dispersant Content as a Function of Pigment Surface Area Using the surface area vs. particle size calculations plotted in FIG. 3, and knowing the specific gravity of the pigment and its $D_{V50}$, as well as the weight ratio of the pigment:dispersant:DIA in the dispersion being considered, the DIA and dispersant contents per pigment surface area may be calculated.

A typical pigment dispersion of the present invention had a weight ratio of 1.0:0.50:0.10 (pigment:dispersant:DIA), and the pigment had a specific gravity of about 1.6. After milling, the $D_{V50}$ was about 47 nm, corresponding to a nominal specific surface area of about 125 m$^2$/cm$^3$, or about 78 m$^2$/g. Thus, 1000 m$^2$ of particle surface area corresponds to about 12.8 grams of pigment (and 6.4 grams dispersant and 1.28 grams DIA), yielding a DIA content of 1.28 grams/1000 m$^2$ pigment and a dispersant content of 6.4 grams/1000 m$^2$ pigment.

By contrast, a pigment dispersion formulated using the above-described co-milling method, using the identical pigment, had a weight ratio of 1.0:0.40:0.25 (pigment:dispersant:DIA). After milling, the $D_{V50}$ was about 87 nm, corresponding to a nominal specific surface area of about 70 m$^2$/cm$^3$, or about 44 m$^2$/g. Thus, 1000 m$^2$ of particle surface area corresponds to about 22.9 grams of pigment (and 9.1 grams dispersant and 5.7 grams DIA), yielding an elevated DIA content of 5.7 grams/1000 m$^2$ pigment and an elevated dispersant content of 9.1 grams/1000 m$^2$ pigment. This estimation technique may typically be accurate within several percent.

As used herein in the specification and in the claims section that follows, the term "fatty acid" refers to a carboxylic acid having a branched or unbranched carbon chain of at least 6 carbon (C) atoms, including the carbon of the carboxyl group. The carbon chain may be saturated or unsaturated. In some embodiments, there are one, two, three, four, five or six double bonds in the carbon chain. It will be appreciated that a fatty acid may be a diacid having two carboxyl groups, typically one at either terminus of the carbon chain. "Substituted fatty acid", or "moiety-substituted fatty acid", refers to a fatty acid in which at least one hydrogen (H) atom of the carbon chain is replaced with alkyl, alkoxyalkyl, hydroxyl-lower-alkyl, phenyl, heteroaryl, hydroxy, lower-alkoxy, amino, alkylamino, aryl, benzyl, heterocyclyl, phenoxy, benzyloxy and/or heteroaryloxy moieties; in the present application, "alkyl" is understood to include cycloalkyl. "Substituted fatty acid" also includes the case (also termed "functionally-substituted fatty acid") in which the carboxyl group is replaced by a member of the group consisting of —CH$_2$SO$_3$H, —CH$_2$OSO$_3$H, -phenyl-SO$_3$H and -phenyl-OSO$_3$H; a fatty acid in which the carboxyl group is so substituted may also be referred to as a "functionally substituted fatty acid". The term "lower alkyl", alone or in combination, refers to an acyclic alkyl moiety containing from 1 to 6 carbon atoms. Examples of such radicals include methyl, ethyl, n-propyl, isopropyl, n-butyl, isobutyl, sec-butyl, tert-butyl, pentyl, iso-amyl, and hexyl.

As used herein in the specification and in the claims section that follows, the term "nominal surface area", typically with respect to pigment core particles, assumes that all particles are perfectly smooth spheres having the nominal diameter of $D_{V50}$.

In the description and claims of the present disclosure, each of the verbs, "comprise" "include" and "have", and conjugates thereof, are used to indicate that the object or objects of the verb are not necessarily a complete listing of members, components, elements, steps or parts of the subject or subjects of the verb. These terms encompass the terms "consisting of" and "consisting essentially of".

TABLE 1

| Pigment Name (Color) | Commercial Name (Supplier) | Pigment MW CAS No. | Chemical Family | Molecular Formula, Name | Structure |
|---|---|---|---|---|---|
| Pigment Red 185 (Magenta) | Novoperm carmine HF4C (BASF) | 560.63 51920-12-8 | Benzimid-Azolone | $C_{27}H_{24}N_6O_6S$ 3-hydroxy-4-[[2-methoxy-5-methyl-4-(methylsulfamoyl) phenyl]diazinyl]-N-(2-oxo-1,3-dihydrobenzimidazol-5-yl)-naphthalene-2-carboxamide | |
| Pigment Red 122 (Magenta) | Toner Magenta E02 (Clariant) | 340.37 16043-40-6 | Quinacridone | $C_{22}H_{16}N_2O_2$ 2,9-Dimethylquinacridone | |
| Pigment Blue 15:3 (Cyan) | Heliogen ® Blue D7090 (BASF) | 576.07 147-14-8 | Phthalo-cyanine | $C_{32}H_{16}CuN_8$ C.I. Pigment Blue 15 | |
| Pigment Black 7 (Black) | Monarch ® 800 (Cabot) | 12 1333-86-4 | Carbon | C | |
| Pigment Black 7 (Black) | Mogul ® L (Cabot) | 12 1333-86-4 | Carbon | C | |
| Pigment Green 7 (Green) | Heliogen ® Green D8730 (BASF) | 1030-1130 1328-53-6 | Phthalo-cyanine | $C_{32}H_3Cl_{15}CuN_8$ C.I. Pigment Green 7 | |

TABLE 1-continued

| Pigment Name (Color) | Commercial Name (Supplier) | Pigment MW CAS No. | Chemical Family | Molecular Formula, Name | Structure |
|---|---|---|---|---|---|
| Pigment Yellow 95 (Yellow) | Cromophtal ® Yellow D1500 (BASF) | 916.63 5580-80-8 | Diaso Condensation | $C_{44}H_{38}Cl_4N_8O_6$ 3,3'-((2,5-Dimethyl-1,4-phenylene)bis[imino(1,3-dioxo-2,1-butandiyl)-2,1-diazenediyl])bis(4-chloro-N-(5-chloro-2-methylphenyl)-benzamide) | 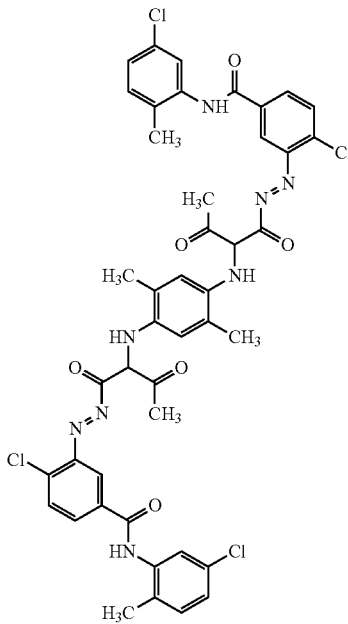 |
| Pigment White 6 (White) | Kronos ® 2310 (Kronos International) | 79.866 13463-67-7 | | $TiO_2$ | |

TABLE 2

| $C_n$ | Name (supplier No.) | MW | CAS No. | Chemical Formula | Structure |
|---|---|---|---|---|---|
| C8 | Potassium Octanoate (2) | 161.24 | 5972-76-9 | $C_8H_{15}KO_2$ | 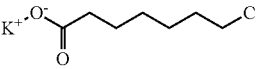 |
| C8 | Sodium Octanoate (2) | 166.19 | 1984-06-1 | $C_8H_{15}NaO_2$ | 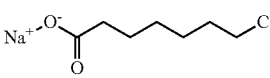 |
| C10 | Potassium Decanoate | 189.29 | 16530-70-4 | $C_{10}H_{19}KO_2$ | 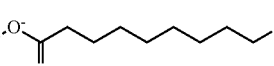 |
| C10 | Sodium Decanoate | 194.25 | 1002-62-6 | $C_{10}H_{19}NaO_2$ | 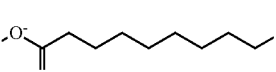 |
| C10 | Sodium Decyl Sulfonate | 244.33 | 13419-61-9 | $C_{10}H_{21}NaO_3S$ | 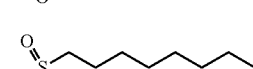 |
| C12 | Ammonium Dodecyl Sulfate (2) | 283.43 | 2235-54-3 | $C_{12}H_{29}NO_4S$ |  |
| C12 | Sodium Dodecyl Sulfate (2) | 288.38 | 151-21-3 | $C_{12}H_{25}NaO_4S$ | 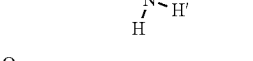 |

TABLE 2-continued

| $C_n$ | Name (supplier No.) | MW | CAS No. | Chemical Formula | Structure |
|---|---|---|---|---|---|
| C12 | Sodium Dodecyl Sulfonate | 272.38 | 2386-53-0 | $C_{12}H_{25}NaO_3S$ | |
| C12 | Potassium Dodecanoate [1] | 238.41 | 10124-65-9 | $C_{12}H_{23}KO_2$ | |
| C12 | Sodium Dodecanoate [2] | 222.30 | 629-25-4 | $C_{12}H_{23}NaO_2$ | |
| C14 | Potassium Myristate [1] | 266.46 | 13429-27-1 | $C_{14}H_{27}KO_2$ | |
| C14 | Sodium Myristate [1] | 250.35 | 822-12-8 | $C_{14}H_{27}NaO_2$ | |
| C16 | 1-Hexadecanol [2] | 242.45 | 29354-98-1 | $C_{16}H_{34}O$ | |
| C16 | Potassium Palmitate | 294.51 | 2624-31-9 | $C_{16}H_{31}KO_2$ | |
| C16 | Sodium Palmitate [1] | 278.41 | 408-35-5 | $C_{16}H_{31}NaO_2$ | |
| C16 | Palmitoyl Chloride [3] | 274.87 | 112-67-4 | $C_{16}H_{31}ClO$ | |
| C16 | Sodium 1-Hexadecane Sulfonate [3] | 328.49 | 15015-81-3 | $C_{16}H_{33}NaO_3S$ | |
| C18 | 1-Octadecanol [4] | 270.50 | 112-92-5 | $C_{18}H_{38}O$ | |
| C18 | Sodium Stearate [2] | 306.47 | 822-16-2 | $C_{18}H_{35}NaO_2$ | |
| C18 | Potassium Oleate [1] | 320.55 | 143-18-0 | $C_{18}H_{33}KO_2$ | |
| C18 | Sodium Oleate [1] | 304.44 | 143-19-1 | $C_{18}H_{33}NaO_2$ | |

TABLE 2-continued

| $C_n$ | Name (supplier No.) | MW | CAS No. | Chemical Formula | Structure |
|---|---|---|---|---|---|
| C18 | Oleoyl Chloride [2] | 300.91 | 112-77-6 | $C_{18}H_{33}ClO$ | |
| C20 | Dioctyl Sodium Sulfosuccinate (AOT) [2] | 444.56 | 577-11-7 | $C_{20}H_{37}NaO_7S$ | |

As used herein in the specification and in the claims section that follows, the term "fatty acid" refers to a carboxylic acid having a branched or unbranched carbon chain of at least 6 carbon (C) atoms, including the carbon of the carboxyl group. The carbon chain may be saturated or unsaturated. In some embodiments, there are one, two, three, four, five or six double bonds in the carbon chain. It will be appreciated that a fatty acid may be a diacid having two carboxyl groups, typically one at either terminus of the carbon chain. "Substituted fatty acid", or "moiety-substituted fatty acid", refers to a fatty acid in which at least one hydrogen (H) atom of the carbon chain is replaced with alkyl, alkoxyalkyl, hydroxyl-lower-alkyl, phenyl, heteroaryl, hydroxy, lower-alkoxy, amino, alkylamino, aryl, benzyl, heterocyclyl, phenoxy, benzyloxy and/or heteroaryloxy moieties; in the present application, "alkyl" is understood to include cycloalkyl. "Substituted fatty acid" also includes the case (also termed "functionally-substituted fatty acid") in which the carboxyl group is replaced by a member of the group consisting of —$CH_2SO_3H$, —$CH_2OSO_3H$, -phenyl-$SO_3H$ and -phenyl-$OSO_3H$; a fatty acid in which the carboxyl group is so substituted may also be referred to as a "functionally substituted fatty acid". The term "lower alkyl", alone or in combination, refers to an acyclic alkyl moiety containing from 1 to 6 carbon atoms. Examples of such radicals include methyl, ethyl, n-propyl, isopropyl, n-butyl, isobutyl, sec-butyl, tert-butyl, pentyl, iso-amyl, and hexyl.

As used herein in the specification and in the claims section that follows, the term "nominal surface area", typically with respect to pigment core particles, assumes that all particles are perfectly smooth spheres having the nominal diameter of $D_{V50}$.

In the description and claims of the present disclosure, each of the verbs, "comprise" "include" and "have", and conjugates thereof, are used to indicate that the object or objects of the verb are not necessarily a complete listing of members, components, elements, steps or parts of the subject or subjects of the verb. These terms encompass the terms "consisting of" and "consisting essentially of".

As used herein, the singular form "a", "an" and "the" include plural references and mean "at least one" or "one or more" unless the context clearly dictates otherwise.

Unless otherwise stated, the use of the expression "and/or" between the last two members of a list of options for selection indicates that a selection of one or more of the listed options is appropriate and may be made.

In the disclosure, unless otherwise stated, adjectives such as "substantially" and "about" that modify a condition or relationship characteristic of a feature or features of an embodiment of the present technology, are to be understood to mean that the condition or characteristic is defined to within tolerances that are acceptable for operation of the embodiment for an application for which it is intended, or within variations expected from the measurement being performed and/or from the measuring instrument being used. When used with a specific value, it should also be considered as disclosing that value.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination. All possible combinations of the features and embodiments described herein are explicitly envisaged and should be considered part of the invention, unless such features and embodiments are manifestly uncombinable.

While this disclosure has been described in terms of certain embodiments and generally associated methods, alterations and permutations of the embodiments and methods will be apparent to those skilled in the art. The present disclosure is to be understood as not limited by the specific examples described herein.

To the extent necessary to understand or complete the disclosure of the present disclosure, all publications, patents, and patent applications mentioned herein, including in particular the priority applications of the Applicant, are expressly incorporated by reference in their entirety by reference as is fully set forth herein.

The invention claimed is:

1. A method of forming an aqueous dispersion containing dispersant-laden particles, the method comprising:
   (a) providing a raw aqueous composition containing a first plurality of pigment core particles having a first median size within a range of 18 nm to 390 nm, on a volume basis ($D_{V50}$), an outer surface of said pigment core particles being enveloped by, and associated with, dispersant molecules of a dispersant, to form a dispersant envelope;
   (b) introducing a dispersant-improving-agent (DIA) to said raw aqueous composition to produce an intermediate aqueous composition, said DIA being a salt of at least one of a fatty acid or a substituted fatty acid, each nominal unit of said salt having a cation and a hydrophobic carbon chain having an anionic moiety associated therewith;

said salt having at least one of the following structural features:
   (i) a Griffin hydrophilic-lipophilic balance (G-HLB) number of at least 3.8;
   (ii) a Davies hydrophilic-lipophilic balance (D-HLB) number of at least 9.5;

said salt having at least one of the following additional structural features:
   (I) a standard critical micelle concentration (CMC) at 25° C. and at a pH of 7 is at most 500 millimoles/liter (mM/l);
   (II) a pH dependent CMC at 25° C. and at a pH of the aqueous dispersion of at most 500 mM/l; and
   (c) treating said intermediate aqueous composition to produce the aqueous dispersion, said treating including agitating said intermediate aqueous composition,
wherein a second median size on a volume basis ($D_{V50}$) of the dispersant-laden within the aqueous dispersion is within a range of 20 nm to 400 nm.

2. The method of claim 1, wherein said providing a raw aqueous composition includes milling an initial plurality of crude pigment particles, in a presence of said dispersant, to produce said first plurality of pigment particles.

3. The method of claim 1, said treating further including heating said intermediate aqueous composition to a temperature within a range of 40-90° C. for at least 15 minutes.

4. The method of claim 1, said treating further including maturing said intermediate aqueous composition by heating said intermediate aqueous composition for at least 8 hours at a temperature within a range of 40-80° C.

5. The method of claim 1, wherein said first median size exceeds said second median size by at most 30 nm.

6. The method of claim 1, wherein a ratio of said salt to a nominal surface area of said pigment core particles is at most 3.0 g per 1000 m².

7. The method of claim 1, wherein said pigment core particles constitute 2 to 60% by weight, of the aqueous dispersion.

8. The method of claim 1, wherein after aging said intermediate aqueous composition between a first time $t_1$ and a second time $t_2$ which is at least 30 days after $t_1$, at a temperature $T_A$ which is not greater than 80° C., at least one of the following (a), (b), (c), (d-i) and (d-ii) is true:
   (a) at a temperature $T_V$ which is in the range of 20° C. to 25° C. inclusive, the relationship between a viscosity $V_1$ of said intermediate aqueous composition, measured at time $t_1$, and a viscosity $V_2$ of said intermediate aqueous composition, measured at time $t_2$ is such that $0.8V_1 \leq V_2 \leq 1.2V_1$;
   (b) at a temperature $T_V$ which is in the range of 20° C. to 25° C. inclusive, said viscosities $V_1$ and $V_2$ are at most 30 mPa·s;
   (c) at a temperature $T_{PS}$ which is in the range of 20° C. to 25° C. inclusive, the relationship between the median particle size at time $t_1$, $D_{50\text{-}t1}$, and the median particle size at time $t_2$, $D_{50\text{-}t2}$, is such that $0.8\, D_{50\text{-}t1} \leq D_{50\text{-}t2} \leq 1.2\, D_{50\text{-}t1}$; and
   (d) when compared to a reference composition that is devoid of the dispersant improving agent but otherwise identical to the composition that contains the DIA and which has been maintained under the same conditions, at least one of (i) and (ii) is true:
      (i) at a temperature $T_V$ which is in the range of 20° C. to 25° C. inclusive, the relationship between a viscosity $V_R$ measured at time $t_2$ for the reference composition and a viscosity $V_2$ of the DIA-containing composition measured at time $t_2$ is such that $V_2 \leq 0.8V_R$; and
      (ii) at a temperature $T_{PS}$ which is in the range of 20° C. to 25° C. inclusive, the relationship between the quantities $D_{50\text{-}t1}$, $D_{50\text{-}t2}$, $D_{50\text{-}t1\text{-}Ref}$, $D_{50\text{-}t2\text{-}Ref}$, is such that $D_{50\text{-}t1} \approx D_{50\text{-}t1\text{-}Ref} \leq D_{50\text{-}t2} < D_{50\text{-}t2\text{-}Ref}$
         wherein $D_{50\text{-}t1}$ is the median particle size at time $t_1$ of particles of the composition, $D_{50\text{-}t2}$ is the median particle size at time $t_2$ of particles of the composition $D_{50\text{-}t2}$, $D_{50\text{-}t1\text{-}Ref}$ is the median particle size at time $t_1$ of particles of the reference composition, and $D_{50\text{-}t1\text{-}Ref}$ is the median particle size at time $t_2$ of particles of the reference composition.

9. The method of claim 1, wherein said DIA is present in an amount sufficient to achieve at least one of the following: (a) increase a viscosity stability of the aqueous dispersion relative to the aqueous dispersion without said DIA; and (b) decrease an amount of dispersant necessary to form said aqueous dispersion relative to said aqueous dispersion without the DIA.

* * * * *